(12) United States Patent
Jansen et al.

(10) Patent No.: US 10,138,332 B2
(45) Date of Patent: Nov. 27, 2018

(54) METHODS FOR TREATING LIGNOCELLULOSIC MATERIALS

(71) Applicants: Virdia, Inc., Raceland, LA (US); Susan Lawson, Bethel, ME (US)

(72) Inventors: Robert Jansen, Collinsville, IL (US); Philip Travisano, Danville, VA (US); Lee Madsen, Danville, VA (US); Neta Matis, Hod Hasharon (IL); Rotem Perry, Bazra (IL); James Allen Lawson, Ellsworth, ME (US); Noa Lapidot, Mevaseret Zion (IL); Timothy Allen Bauer, Belleville, IL (US); Bassem Hallac, Jerusalem (IL); Michael Zviely, Haifa (IL)

(73) Assignee: VIRDIA, INC., Raceland, LA (US)

( * ) Notice: Subject to any disclaimer, the term of this patent is extended or adjusted under 35 U.S.C. 154(b) by 0 days.

(21) Appl. No.: 15/487,271

(22) Filed: Apr. 13, 2017

(65) Prior Publication Data

US 2017/0313826 A1    Nov. 2, 2017

Related U.S. Application Data

(62) Division of application No. 14/787,755, filed as application No. PCT/US2013/068824 on Nov. 6, 2013, now Pat. No. 9,657,146.

(60) Provisional application No. 61/839,780, filed on Jun. 26, 2013.

(30) Foreign Application Priority Data

May 3, 2013   (WO) ................ PCT/US2013/039585

(51) Int. Cl.
| | | |
|---|---|---|
| C08H 7/00 | (2011.01) | |
| C08B 37/00 | (2006.01) | |
| C08H 8/00 | (2010.01) | |
| C08L 1/02 | (2006.01) | |
| C08L 33/20 | (2006.01) | |
| C08L 63/00 | (2006.01) | |
| C08L 67/00 | (2006.01) | |
| C08L 97/00 | (2006.01) | |
| C08L 97/02 | (2006.01) | |
| D21H 17/23 | (2006.01) | |
| C10L 1/02 | (2006.01) | |
| C10G 3/00 | (2006.01) | |
| C08L 77/00 | (2006.01) | |
| D01F 6/54 | (2006.01) | |
| D01F 9/00 | (2006.01) | |
| D01F 9/17 | (2006.01) | |
| C08L 95/00 | (2006.01) | |

(52) U.S. Cl.
CPC ........... *C08H 6/00* (2013.01); *C08B 37/0003* (2013.01); *C08B 37/0057* (2013.01); *C08H 8/00* (2013.01); *C08L 1/02* (2013.01); *C08L 33/20* (2013.01); *C08L 63/00* (2013.01); *C08L 67/00* (2013.01); *C08L 77/00* (2013.01); *C08L 97/005* (2013.01); *C08L 97/02* (2013.01); *C10G 3/00* (2013.01); *C10L 1/026* (2013.01); *D01F 6/54* (2013.01); *D01F 9/00* (2013.01); *D01F 9/17* (2013.01); *D21H 17/23* (2013.01); *C08L 95/00* (2013.01); *C10G 2400/30* (2013.01); *Y02E 50/13* (2013.01); *Y02P 30/20* (2015.11); *Y02T 50/678* (2013.01)

(58) Field of Classification Search
CPC combination set(s) only.
See application file for complete search history.

(56) References Cited

U.S. PATENT DOCUMENTS

| | | |
|---|---|---|
| 2,380,448 A | 7/1945 | Katzen |
| 2,772,965 A | 12/1956 | Gray et al. |
| 3,808,192 A | 4/1974 | Dimitri |
| 4,111,928 A | 9/1978 | Holsopple et al. |
| 4,237,110 A | 12/1980 | Forster et al. |
| 4,277,626 A | 7/1981 | Forss et al. |
| 4,470,851 A | 9/1984 | Paszner et al. |
| 4,520,105 A | 5/1985 | Sinner et al. |
| 4,740,591 A | 4/1988 | Dilling et al. |
| 4,797,457 A | 1/1989 | Guiver et al. |
| 4,946,946 A | 8/1990 | Fields et al. |
| 4,966,650 A | 10/1990 | Delong et al. |
| 5,730,837 A | 3/1998 | Black et al. |
| 5,865,948 A | 2/1999 | Lora et al. |
| 5,968,417 A | 10/1999 | Viswanathan |
| 6,022,419 A | 2/2000 | Torget et al. |

(Continued)

FOREIGN PATENT DOCUMENTS

| | | |
|---|---|---|
| CA | 2812685 A1 | 3/2012 |
| CN | 101143881 A | 3/2008 |

(Continued)

OTHER PUBLICATIONS

Abacherli, et al. Lignin Analytical Cluster, "Towards Standardisation of Methods". Rome, Forum 8, May 10-12, 2007.
Acevedo, et al. Surface Activity of Lignin Fractions isolated by Organic Solvents. Powerpoint. 2005.
Asikkala, et. al. Accurate and reproducible determination of lignin molar mass by acetobromination. Journal of agricultural and food chemistry. 2012; 60:3968-3973.
Baker. Utilization of Sustainable Resources for Materials for Production of Carbon Fiber Structural and Energy Efficiency Applications. Oak Ridge National Laboratory, Tennessee, USA. Nordic Wood Biorefinery Conference, Stockholm, Sweden, Mar. 22-24, 2011.

(Continued)

*Primary Examiner* — Rei Tsang Shiao
(74) *Attorney, Agent, or Firm* — Wilson Sonsini Goodrich & Rosati

(57) ABSTRACT

The present invention relates to methods of processing lignocellulosic material to obtain hemicellulose sugars, cellulose sugars, lignin, cellulose and other high-value products such as asphalt and bio oils. Also provided are hemicellulose sugars, cellulose sugars, lignin, cellulose, and other high-value products such as asphalt and bio oils.

20 Claims, 20 Drawing Sheets

(56) References Cited

U.S. PATENT DOCUMENTS

| | | | |
|---|---|---|---|
| 6,620,292 | B2 | 9/2003 | Wingerson |
| 7,465,791 | B1 | 12/2008 | Hallberg et al. |
| 7,649,086 | B2 | 1/2010 | Belanger et al. |
| 7,678,358 | B2 | 3/2010 | Eckert et al. |
| 7,699,958 | B2 | 4/2010 | Griffith et al. |
| 7,794,824 | B2 | 9/2010 | Eckert et al. |
| 9,139,681 | B2 * | 9/2015 | Fitchett ............... C08G 4/00 |
| 9,657,146 | B2 | 5/2017 | Jansen et al. |
| 9,683,005 | B2 | 6/2017 | Jansen et al. |
| 2003/0156970 | A1 | 8/2003 | Oberkofler et al. |
| 2003/0221804 | A1 | 12/2003 | Lightner |
| 2004/0060673 | A1 | 4/2004 | Phillips et al. |
| 2004/0101459 | A1 | 5/2004 | Schur |
| 2004/0108085 | A1 | 6/2004 | Kettenbach et al. |
| 2004/0244925 | A1 | 12/2004 | Tarasenko |
| 2007/0160926 | A1 | 7/2007 | Ayaki et al. |
| 2008/0032344 | A1 | 2/2008 | Fallavollita |
| 2008/0057555 | A1 | 3/2008 | Nguyen |
| 2008/0202504 | A1 | 8/2008 | Hilst |
| 2008/0317661 | A1 | 12/2008 | Eckert et al. |
| 2008/0318043 | A1 | 12/2008 | Eckert et al. |
| 2009/0062516 | A1 | 3/2009 | Belanger et al. |
| 2009/0069550 | A1 | 3/2009 | Belanger et al. |
| 2009/0176286 | A1 | 7/2009 | O'Connor et al. |
| 2009/0229599 | A1 | 9/2009 | Zhang et al. |
| 2010/0159518 | A1 | 6/2010 | Diner et al. |
| 2010/0159519 | A1 | 6/2010 | Diner et al. |
| 2010/0269990 | A1 | 10/2010 | Dottori et al. |
| 2010/0279361 | A1 | 11/2010 | South et al. |
| 2010/0279372 | A1 | 11/2010 | Cho et al. |
| 2010/0305241 | A1 | 12/2010 | Balakshin et al. |
| 2011/0073805 | A1 | 3/2011 | Dibble et al. |
| 2011/0274612 | A1 | 11/2011 | Wohlmann et al. |
| 2011/0294991 | A1 | 12/2011 | Lake et al. |
| 2011/0297340 | A1 | 12/2011 | Kouisni et al. |
| 2012/0116063 | A1 | 5/2012 | Jansen et al. |
| 2012/0167874 | A1 | 7/2012 | Jansen et al. |
| 2012/0226029 | A1 | 9/2012 | Dodd |
| 2012/0289692 | A1 | 11/2012 | Gray et al. |
| 2013/0183227 | A1 | 7/2013 | Wohlmann et al. |
| 2014/0171379 | A1 | 6/2014 | Jansen et al. |
| 2014/0227161 | A1 | 8/2014 | Manesh et al. |
| 2014/0242867 | A1 | 8/2014 | Jansen et al. |
| 2015/0141628 | A1 | 5/2015 | Jansen et al. |
| 2017/0130398 | A1 | 5/2017 | Jansen et al. |

FOREIGN PATENT DOCUMENTS

| | | |
|---|---|---|
| CN | 102027021 A | 4/2011 |
| CN | 102361914 A | 2/2012 |
| EP | 0224721 A1 | 6/1987 |
| EP | 0224721 B1 | 6/1991 |
| EP | 0446556 B1 | 8/1995 |
| EP | 1272433 B1 | 1/2004 |
| GB | 1525508 A | 9/1978 |
| JP | 2011256380 A | 12/2011 |
| WO | WO-9641052 A1 | 12/1996 |
| WO | WO-0132715 A1 | 5/2001 |
| WO | WO-0202826 A1 | 1/2002 |
| WO | WO-2006086861 A2 | 8/2006 |
| WO | WO-2006086861 A3 | 10/2006 |
| WO | WO-2007019505 A2 | 2/2007 |
| WO | WO-2007019505 A3 | 6/2007 |
| WO | WO-2008079072 A1 | 7/2008 |
| WO | WO-2008144903 A1 | 12/2008 |
| WO | WO-2009002785 A1 | 12/2008 |
| WO | WO-2009021733 A2 | 2/2009 |
| WO | WO-2009028969 A1 | 3/2009 |
| WO | WO-2009021733 A3 | 6/2009 |
| WO | WO-2009068711 A1 | 6/2009 |
| WO | WO-2009104995 A1 | 8/2009 |
| WO | WO-2010043424 A1 | 4/2010 |
| WO | WO-2010045576 A2 | 4/2010 |
| WO | WO-2010060183 A1 | 6/2010 |
| WO | WO-2010045576 A3 | 7/2010 |
| WO | WO-2010081231 A1 | 7/2010 |
| WO | WO-2010146331 A2 | 12/2010 |
| WO | WO-2011007369 A1 | 1/2011 |
| WO | WO-2011037967 A2 | 3/2011 |
| WO | WO-2011097721 A1 | 8/2011 |
| WO | WO-2011151823 A1 | 12/2011 |
| WO | WO-2012120184 A2 | 9/2012 |
| WO | WO2012138801 * | 10/2012 |
| WO | WO-2012138801 A2 | 10/2012 |
| WO | WO-2012138802 A1 | 10/2012 |
| WO | WO-2012151524 A2 | 11/2012 |
| WO | WO-2013083876 A2 | 6/2013 |
| WO | WO-2013166469 A2 | 11/2013 |
| WO | WO-2014046826 A1 | 3/2014 |
| WO | WO-2014076612 A1 | 5/2014 |
| WO | WO-2014078120 A1 | 5/2014 |
| WO | WO-2014116173 A1 | 7/2014 |
| WO | WO-2014178911 A1 | 11/2014 |
| WO | WO-2014179777 A1 | 11/2014 |
| WO | WO-2016007550 A1 | 1/2016 |

OTHER PUBLICATIONS

Brauns et al. Studies on Lignin and Related Compounds: XII. Methanol Lignin. Canadian Journal of Research 13b(1):28-34 (1935).

Brauns, Friedrich Emil. The Chemistry of Lignin. Academic Press. 1952. pp. 66, 67, and 127.

Bridgwater. Review of fast pyrolysis of biomass and product upgrading. Biomass and Bioenergy. 2012; 38:68-94.

Bulushev, et al. Catalysis for conversion of biomass to fuels via pyrolysis and gasification: A review. Catalysts Today. 2001; 171: 1-13.

Chaow-U-Thai et al. Removal of ash from sugarcane leaves and tops. International Journal of Biosciences.2012; 2(5): 12-17.

Chatterjee, et al. Lignin-Derived Advanced Carbon Materials. ChemSusChem. Dec. 2015;8(23):3941-58. doi: 10.1002/cssc. 201500692. Epub Nov. 16, 2015.

Compere, et al. Evaluation of Lignin from Alkaline-Pulped Hardwood Black Liquor. Oak Ridge National Laboratory, US Department of Energy, under contract DE-AC05-000R22725, ORNLITM-2005/88. May 2005.

Compere, et al. Improving the fundamental properties of lignin-based carbon fiber for transportation application. Oak Ridge National Lab. 2009.

Compere, et al. Low cost carbon fiber from renewable resources. Carbon. 1998; 36(7-8):1119-1124.

Constantinescu, et al. Lignin hydrophobization by different esterification reactions. ILI—Forum 8 , May 10-12, 2007.

Co-pending U.S. Appl. No. 15/593,752, filed May 12, 2017.

Cui, et al. Toward thermoplastic lignin polymers; part II: thermal & polymer characteristics of kraft lignin & derivatives. BioResources 8.1 (2013): 864-886.

Economy, et al. Activated carbon fibers—past, present, and future. 1996; 321-358.

European search report and opinion dated Mar. 24, 2016 for EP Application No. 13883539.

Finney, et al. Fuel Pelletization with a Binder: Part I—Identification of a Suitable Binder for Spent Mushroom Compost-Coal Tailing Pellets. Energy & Fuels, 2009, 23 (6), pp. 3195-3202.

Gabilondo, et al. Lignin low molar mass fractions involvement in the synthesis of PF matrices. 2007.

Glasser. Lignin retrospect and prospect. 2010.

Gosselik et al. Lignin as a renewable aromatic resource for the chemical industry. PhD Thesis; Wageningen University, Wageningen, NL; 2011.

Gosselink, et al. Analysis of isolated lignin samples using organic and alkaline SEC and MALDI-TOF-MS. Agrotechnology & Food Sciences Group. 2006.

Gosselink, et al. Analytical protocols for characterisation of sulphur-free lignin. Industrial Crops and Products. 2004; 19:271-281.

Gosselink, et al. Co-ordination network for lignin—standardisation, production and applications adapted to market requirements (EUROLIGNIN). Industrial Crops and Products 2004; 20:121-129.

Gosselink, et al. Lignin depolymerization under supercritical process conditions. Agrotechnology & Food Sciences Group. 2008.

(56) References Cited

OTHER PUBLICATIONS

Gosselink, et al. Valorization of lignin resulting from biorefineries. Jun. 4, 2008, RRB4 Rotterdam.

Griffith, et al. Low cost carbon fiber for transportation application. USDE. 2003.

Guerra, et al. Comparative evaluation of three lignin isolation protocols for various wood species. J Agric Food Chem. Dec. 27, 2006;54(26):9696-705.

Guerra, et al. On the Propensity of Lignins to Associate. Organic Chemistry of Wood Components Laboratory Department of Forest Biomaterials Science & Engineering North carolina State Raleigh, North Carolina USA. 2007.

Guerra, et al. Toward a better understanding of the lignin isolation process from wood. J Agric Food Chem. Aug. 9, 2006;54(16):5939-47.

Hage, et al. Effects of process severity on the chemical structure of Miscanthus ethanol organosolv lignin. Polymer Degradation and Stability. 2010; 95:997-1003.

Hagglund. Hydrochloric acid lignin (preliminary communication). Berichte der Deutschen Chemischen Gesellschaft [Abteilung] B: Abhandlungen (1923), 56B 1866-8. CODEN: BDCBAD ISSN: 0365-9488. Abstract only.

Hallac, et al. Biomass Characterization and Organosolv Pretreatment of Buddleja davidii. School of Chemistry and Biochemistry, Institute of Paper Science and Technology, Georgia Institute of Technology, Atlanta, GA. 2009.

Hallac, et al. Biomass Characterization of Buddleja davidii: A Potential Feedstock for Biofuel Production. J. Agric. Food Chem. 2009; 57(4):1275-1281.

Hallac, et al. Chemical Transformations of Buddleja davidii Lignin during Ethanol Organosolv Pretreatment. Energy Fuels. 2010; 24:2723-2732.

Hallac. Fundamental understanding of the biochemical conversion of buddleja davidii to fermentable sugars. Georgia Institute of Technology. May 2011.

Harris. Derived products and chemical utilization of wood waste. Forest Products Laboratory; Forest Service US Department of Agriculture; Rept. No. R1666-10. Jun. 1949.

Holladay, et al. Top Value-Added Chemicals from Biomass vol. II—Results of Screening for Potential Candidates from Biorefinery Lignin. Pacific Northwest National Laboratory, Prepared for the U.S. Department of Energy. Oct. 2007.

Hu, Thomas Q. Recent Advances in the Isolation and Analysis of Lignins and Lignin—Carbohydrate Complexes. Characterization of Lignocellulosic Materials. Copyright © 2008 Blackwell Publishing Ltd. Published Online: Mar. 3, 2009. pp. 148-170. DOI: 10.1002/9781444305425.ch9.

Ibarra, et al. Isolation of high-purity residual lignins from eucalypt paper pulps by cellulase and proteinase treatments followed by solvent extraction. Enzyme and Microbial Technology. 2004; 35:173-181.

International search report and written opinion dated Jul. 17, 2014 for PCT/US2013/068824.

Kadla, et al. Lignin-based carbon fibers for composite fiber applications. Carbon. 2002; 40:2913-2920.

Khunsupat, et al. Molecular Weight Distribution of Lignin. Presentation; Georgia Institute of Technology. 2014.

Koullas, et al. Analytical methods for lignin characterization—differential scanning calorimetry. Cellulose Chem. Technol. 2006; 40(9-10):719-725.

Kubo, et al. Lignin-based Carbon Fibers: Effect of Synthetic Polymer Blending on Fiber Properties. Journal of Polymers and the Environment. Apr. 2005; 13(2):97-105.

Kubo, et al. Poly(Ethylene Oxide)/Organosolv Lignin Blends: Relationship between Thermal Properties, Chemical Structure, and Blend Behavior. Macromolecules. 2004; 37:6904-6911.

Kubo, et al. Preparation of carbon fibers from softwood lignin by atmospheric acetic acid pulping. Carbon. 1998; 36(7-8):1119-1124.

Kubo, et al. Surface Porosity of Lignin/PP Blend Carbon Fibers. Journal of Wood Chemistry and Technology. 2007; 27: 257-271.

Kubo, et al. Thermal Decomposition Study of Isolated Lignin Using Temperature Modulated TGA. Journal of Wood Chemistry and Technology. 2008; 28(2):106-121.

Kudahettige-Nilsson, et al. Biobutonal production by clostridium acetobutylicum using xylose recovered from birch kraft black liquor. Bioresource Technology. 2015; 176:71-79.

Lange, et al. On the implications of calibration techniques and detector systems on GPC-based analyses of lignin. Cost action FP 0901 (presentation), 2013.

Li, et al. Interaction of Supercritical Fluids with Lignocellulosic Materials. Ind. Eng. Chem. Res. 1988; 27:1301-1312.

Liitia, et al. Application of Solid-State $^{13}$C NMR Spectroscopy and Dipolar Dephasing Technique to Determine the Extent of Condensation in Technical Lignins. Solid State Nuclear Magnetic Resonance. 2002; 21:171-186.

Lin and Dence (Eds), Methods in lignin chemistry. Springer Berlin Heidelberg, 1992, p. 208.

Lora, et al. Recent Industrial Applications of Lignin: A Sustainable Alternative to Nonrenewable Materials. Journal of Polymers and the Environment, Apr. 2002; 10(1-2):39-48.

Lora, et al. Use of sulfur-free lignin in wood adhesives: Industrial experiences and environmental impacts. 2005; 8-14.

Lora. Lignin recovery technology transfer: first industrial implementation of the LPS process in India. 2005.

Marcano, et al. Surface activity of lignin fractions obtained at different pH values. 2005.

Nguyen, et al. Is gel permeation chromatography applicable to lignin? 2007.

Nguyen, et al. Molecular weight and functional group analysis of a Soda lignin fractionated by ultrafiltration and selective dissolution. 2008.

Nguyen, et al. Molecular weight in LignoAnalyse 1, "Is GPC applicable to lignin?". Rome, Forum 8, May 10-12, 2007.

Notice of Allowance dated Jan. 18, 2017 for U.S. Appl. No. 14/787,755.

Office Action dated Aug. 15, 2016 for U.S. Appl. No. 14/787,755.

Pakarinen, et al. Evaluation of preservation methods for improving biogas production and enzymatic conversion yields of annual crops. Biotechnol Biofuels. Jul. 19, 2011;4(1):20. doi: 10.1186/1754-6834-4-20.

Pepper, et al. The effect of initial acid concentration on the lignin isolated by the acidolysis of aspen wood. Can J. Chem. 1961; 39:1454-1461.

Ragauskas, et al. From wood to fuels Integrating biofuels and pulp production. Industrial biotechnology. 2006; 2(1):55-65.

Ragauskas. Rediscovering the Future of Lignin Chemistry. 2003.

Reinhold. SEC of lignins. Mainz, Germany. 2007.

Sadeghifar, et al. Macroscopic Behavior of Kraft Lignin Fractions: Melt Stability Considerations for Lignin—Polyethylene Blends. ACS Sustainable Chem. Eng., 2016, 4 (10), pp. 5160-5166. DOI: 10.1021/acssuschemeng.6b00636.

Sadeghifar, et al. Toward Carbon Fibers from Single Component Kraft Lignin Systems: Optimization of Chain Extension Chemistry. ACS Sustainable Chem. Eng., 2016, 4 (10), pp. 5230-5237. DOI: 10.1021/acssuschemeng.6b00848.

Sadeghifar, et al. Toward thermoplastic lignin polymers. Part 1. Selective masking of phenolic hydroxyl groups in kraft lignins via methylation and oxypropylation chemistries. Industrial & Engineering Chemistry Research 51.51 (2012):16713-16720.

Sadeghifar, et al. Understanding the Variables that Define Tg for Kraft Lignin and Procedure for its Determination. Departments of Chemistry and Forest Biomaterials. North Carolina State University. Raleigh , NC USA. 2012.

Saito, et al. Methanol fractionation of softwood Kraft lignin: impact on the lignin properties. ChemSusChem. Jan. 2014;7(1):221-8. doi: 10.1002/cssc.201300509. Epub Nov. 4, 2013.

Samuel, et al. Structural Characterization and Comparison of Switchgrass Ball-milled Lignin Before and alter Dilute Acid Pretreatment. Appli. Micr. BioTech. 2010, 162:62-74.

Sannigrahi, et al. Lignin structural modifications resulting from ethanol organosolv treatment of loblolly pine. Energy Fuel 2010; 24(1): 683-689.

(56) References Cited

OTHER PUBLICATIONS

Shen, et al. Lignin-Based Activated Carbon Fibers and Controllable Pore Size and Properties. Journal of Applied Polymer Science. 2011; 121:989-994.
Strassbreger, et al. The pros and cons of lignin valorisation in an integrated biorefinery. RSC Advances 4.48 (2014): 25310-25318.
Sudo, et al. A New Modification Method of Exploded Lignin for the Preparation of a Carbon Fiber Precursor. Journal of Applied Polymer Science. 1993; 48:1485-1491.
Svensson. Minimizing the sulfur content in Kraft lignin. Degree Project, ECTS 30.0, At STFI-Packforsk, Stockholm, 2008.
Toledano, et al. Characterization of key functional groups of lignin. 5th Italian meeting on lignocellulosic chemistry. Sep. 1-4, 2009—Villa Monastero Varenna (Lecco) Italy.
Toledano, et al. Study of fractionation of lignin by ultrafiltration and selective recipitation. 2009.
Uraki, et al. Preparation of activated carbon fibers with large specific surface area from softwood acetic acid lignin. J Wood Sci. 2001; 47:465-469.
Velez, et al. Temperature effects on molecular properties of liquid lignin recovered from kraft black liquor. ACS Sustainable Chem. Eng. 2015; 3:1032-1038.
Wang, et al. Molecular Characteristics of Kraft-AQ Pulping Lignin Fractionated by Sequential Organic Solvent Extraction. Int. J. Mol. Sci. 2010; 11:2988-3001.
Warren. Future Lower Cost Carbon Fiber for Autos: International Scale-up & What is Needed. Oak Ridge National Laboratory, Tennessee, USA. 2007.
Yang, et al. Alcohol adsorption on softwood lignin from aqueous solutions. Biotechnol Bioeng. Feb. 5, 1990;35(3):268-78.
Zhao, et al., Organosolv pretreatment of lignocellulosic biomass for enzymatic hydrolysis, Appl Microbiol Biotechnol (2009) 82:815-827.
Zoia, et al. Microwave-assisted lignin isolation using the enzymatic mild acidolysis (EMAL) protocol. J Agric Food Chem. Nov. 12, 2008;56(21):10115-22. doi: 10.1021/jf801955b. Epub Oct. 15, 2008.
Nanayakkar et al. Understanding the Degree of Condensation of Phenolic and Etherified C-9 Units of in Situ Lignins. Journal of Agricultural and Food Chemistry. vol. 59. 12514-12519.
Pinoresinol compound information, SciFinder Scholar, downloaded Sep. 29, 2017, 3 pages.
Roy et al. Short and Stereoselective Total Synthesis of Furano Lignans (±)-Dihydrosesamin, (±)-Lariciresinol Dimethyl Ether, (±)-Acuminatin Methyl Ether, (±)-Sanshodiol Methyl Ether, (±)-Lariciresinol, (±)-Acuminatin, and (±)-Lariciresinol Monomethyl Ether and Furofuran Lignans (±)-Sesamin, (±)-Eudesmin, (±)-Piperitol Methyl Ether, (±)-Pinoresinol, (±)-Piperitol, and (±)-Pinoresinol Monomethyl Ether by Radical Cyclization of Epoxides Using a Transition-Metal Radical Source. J. Org. Chem., 2002, 67 (10), pp. 3242-3248.
Yamauchi et al. Effect of the benzylic structure of lignan on antioxidant activity. Biosci Biotechnol Biochem. Sep. 2007;71(9):2283-90.
Saake et al. A comparison of lignin polymer models (DHPs) and lignins by 31P NMR spectroscopy. Phytochemistry. vol. 43, Issue 2, Sep. 1996, pp. 499-507.
Co-pending U.S. Appl. No. 15/965,639, filed Apr. 27, 2018.

\* cited by examiner

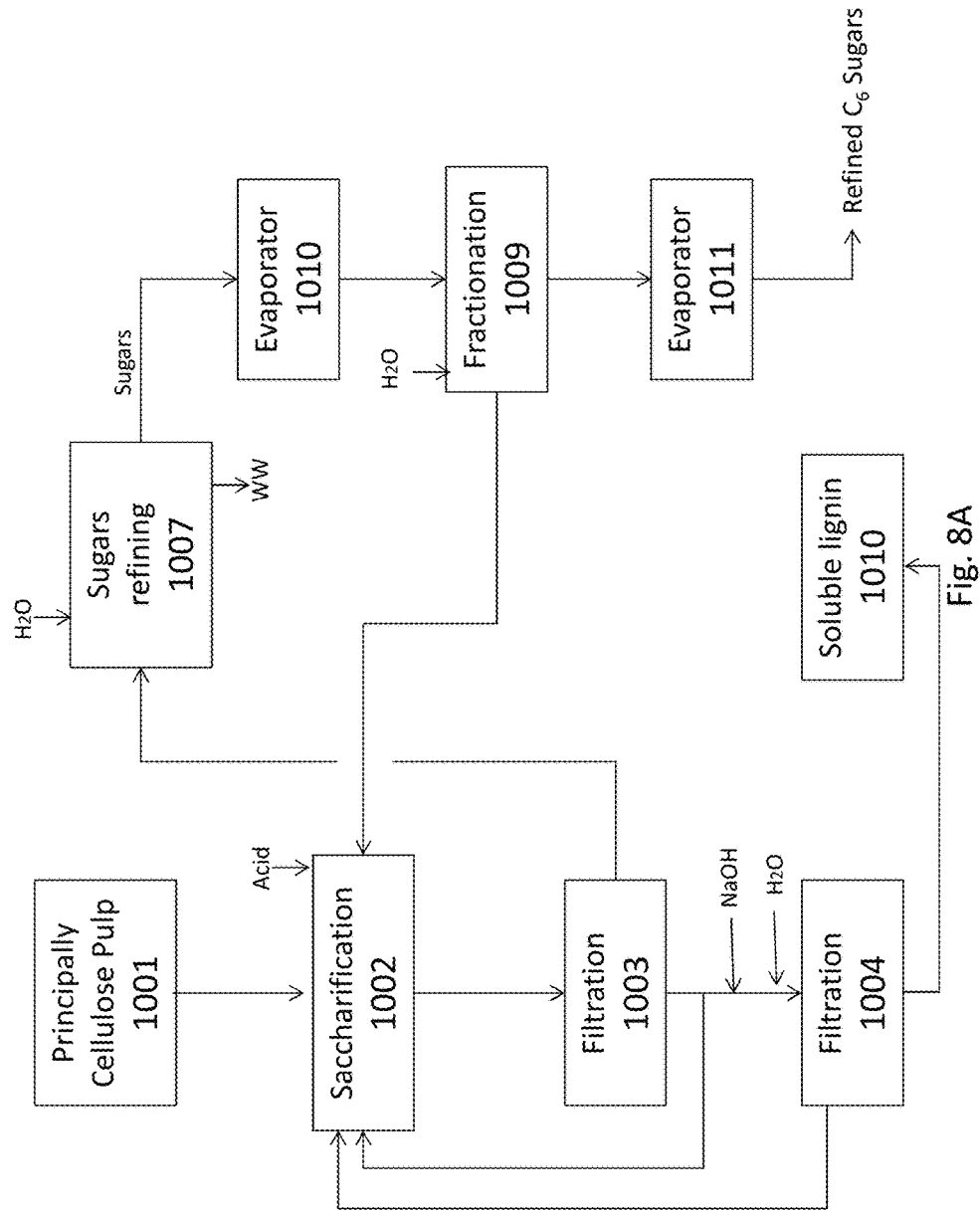

METHODS FOR TREATING LIGNOCELLULOSIC MATERIALS

CROSS-REFERENCE

This application is a Divisional Application of U.S. application Ser. No. 14/787,755, filed Oct. 28, 2015, which is a 371 National Stage Entry of PCT Application No. PCT/US2013/068824, filed Nov. 6, 2013, which claims the benefit of PCT Application No. PCT/US2013/039585, filed May 3, 2013 and U.S. Provisional Application No. 61/839,780, filed on Jun. 26, 2013, each incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The invention relates to processing of lignocellulosic biomass materials containing lignin, cellulose and hemicellulose polymers.

BACKGROUND OF THE INVENTION

Lignocellulosic biomass materials are renewable sources for production of amino acids for feed and food supplements, monomers and polymers for the plastic industry, and renewable sources for different types of fuels, polyol sugar substitutes (xylitol, sorbitol, manitols and the likes), and numerous other chemicals that can be synthesized from C5 and C6 sugars. Nonetheless, efficient and cost effective processes to extract C5 and C6 sugars from the biomass are still a challenge. A further challenge is to extract and separate not only the hemicellulose fraction of biomass, but to devise an effective process to also extract and separate the lignin fraction and the cellulose fraction. It is realized that an economically viable biorefinary needs to be able to extract and valorize all 3 major components of biomass, i.e. hemicellulose, lignin and cellulose.

SUMMARY OF THE INVENTION

The invention provides a lignin composition. The lignin composition is characterized by at least one, two, three, four, five, six, seven, eight, nine, ten, eleven, twelve, or thirteen characteristic(s) selected from the group consisting of: (i) lignin aliphatic hydroxyl group in an amount up to 2 mmole/g; (ii) at least 2.5 mmole/g lignin phenolic hydroxyl group; (iii) less than 0.40 mmole/g lignin carboxylic hydroxyl group; (iv) sulfur in an amount up to 1% weight/weight; (v) nitrogen in an amount up to 0.5% weight/weight; (vi) 5% degradation temperature higher than 220° C.; (vii) 10% degradation temperature higher than 260° C.; (viii) less than 1% ash weight/weight; (ix) a formula of CaHbOc; wherein a is 9, b is less than 12 and c is less than 3.5; (x) a degree of condensation of less than 0.9; (xi) a methoxyl content of at least 0.8; (xii) an O/C weight ratio of less than 0.4; and (xiii) a glass transition elevation between first and second heat cycle as measured by differential scanning calorimetry according to DIN 53765 in the range of 10 to 30° C. Optionally, the composition is characterized by at least two of said characteristics from said group. Optionally, the composition is characterized by at least three of said characteristics from said group. Optionally, the composition is characterized by at least four of said characteristics from said group. Optionally, the composition is characterized by at least five of said characteristics from said group. Optionally, the lignin composition is further characterized by one, two, three, four, five or six, seven, eight, nine, or ten of additional characteristic(s) selected from the group consisting of: (i) less than 1% carbohydrate weight/weight; (ii) solubility in DMSO is >100 g/L; (iii) solubility in THF is >35 g/L; (iv) solubility in 0.1 N NaOH aqueous solution is >8 g/L; (v) less than 1% water by weight; (vi) less than 1% volatile components at 200° C. by weight; (vii) a sulfur concentration of less than 0.1% weight/weight; (viii) soluble sugar content of less than 1% by weight/weight; (ix) a phosphorus concentration of less than 100 PPM; and (x) less than 0.1 times the amount of volatile sulfur compounds found in Kraft lignin. Optionally, the lignin is characterized by at least three of said additional characteristics from said group. Optionally, the composition prepared from a substrate comprising hardwood. Optionally, the composition is prepared from a substrate comprising softwood. Optionally, the composition is prepared from a substrate comprising bagasse. Optionally, the composition comprising the lignin and an organic solvent, for example an alcohol, a ketone, an aldehyde, an alkane, an organic acid and a furan of 6 carbons or less. Optionally, the organic solvent is methyl ethyl ketone. Optionally, the composition further comprises less than 20% cellulose weight/weight. Optionally, the composition comprises less than 15% cellulose weight/weight. Optionally, the composition comprises less than 5% cellulose weight/weight. Optionally, the composition comprises less than 1% cellulose weight/weight. Optionally, the composition comprises ash at a concentration of less than 0.5% weight/weight. Optionally, the composition is provided as fibers. Optionally, the fibers are characterized by lengthwise tubules with a transverse cross-sectional dimension of at least 5 microns. Optionally, the transverse cross-sectional dimension is less than 20 microns. Optionally, the tubules are characterized by an aspect ratio of transverse cross-sectional dimension to length less than 0.1. Optionally, the aspect ratio is less than 0.025. Further described, is a product that comprises the lignin composition described herein and one or more other ingredients. Optionally, the product is selected from the group consisting of: carbon fibers, protective coatings, lignosulfonates, pharmaceuticals, dispersants, emulsifiers, complexants, flocculants, agglomerants, pelletizing additives, resins, adhesives, binders, absorbents, toxin binders, films, rubbers, elastomers, sequestrants, solid fuels, paints, dyes, plastics, wet spun fibers, melt spun fibers and flame retardants. Optionally, the product is selected from the group consisting of: a non woven fabric, a woven fabric, insulation material, sports equipment, automotive parts, airplane or helicopter parts, boat hulls or portions thereof and loudspeakers. Further described is a composite material comprising a polymer and one or more materials selected from the group consisting of epoxy resin, polyester, polyvinyl ester and nylon, said polymer reinforced with fibers described herein.

The invention further provides processes of producing high purity lignin from a biomass. The method involves (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent; and further comprising one, two, three or four additional step(s): (iv) distilling or flash evaporating the lignin extract thereby removing the bulk of the limited-solubility solvent from the lignin extract to obtain a solid lignin; (v) heating the solid lignin thereby removing trace limited-solubility solvent or water from the solid lignin; (vi) applying a vacuum to the solid lignin thereby removing trace limited-solubility solvent or water from the solid lignin; and (vii) dissolving the solid lignin with an organic solvent to form a resulting solution and separating the resulting solution from insoluble remainder. Optionally, the removal of the hemicellulose sugars does not remove a substantial amount of the cellulosic sugars. Optionally, the limited-solubility solvent and the water in the lignin extraction solution is in a ratio of about 1:1. Optionally, the method comprises contacting the lignin extract with a strong acid cation exchanger in the $H^+$ form to remove residual cations thereby obtaining a purified lignin extract.

The invention further provides a lignin composition produced by a process of producing high purity lignin from a biomass. The process comprises (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent. Optionally, the lignin composition is produced by a process that further comprises one, two, three, four, or five additional step(s): (iv) contacting the lignin extract with a strong acid cation exchanger to remove residual cations thereby obtaining a purified lignin extract (v) distilling or flash evaporating the lignin extract thereby removing the bulk of the limited-solubility solvent from the lignin extract to obtain solid lignin; (vi) heating the solid lignin thereby removing trace limited-solubility solvent or water from the solid lignin; (vii) applying a vacuum to the solid lignin thereby removing trace limited-solubility solvent or water from the solid lignin; and (viii) dissolving the solid lignin with an organic solvent to form a resulting solution and separating the resulting solution from insoluble remainder. Optionally, the lignin composition is characterized by at least one, two, three, four, five, six, seven, eight, nine, ten, eleven, twelve, thirteen, fourteen, fifteen, sixteen, seventeen, eighteen, or nineteen characteristics selected from the group consisting of: (i) lignin aliphatic hydroxyl group in an amount up to 2 mmole/g; (ii) at least 2.5 mmole/g lignin phenolic hydroxyl group; (iii) less than 0.40 mmole/g lignin carboxylic OH group; (iv) sulfur in an amount up to 1% weight/weight; (v) nitrogen in an amount up to 0.5% weight/weight; (vi) 5% degradation temperature higher than 220° C.; (vii) 10% degradation temperature higher than 260° C.; (viii) less than 1% ash weight/weight; (ix) a formula of $C_aH_bO_c$; wherein a is 9, b is less than 12 and c is less than 3.5; (x) a degree of condensation of less than 0.9; (xi) a methoxyl content of at least 0.8; (xii) an O/C weight ratio of less than 0.4; (xiii) a glass transition elevation between first and second heat cycle according to DIN 53765 in the range of 10 to 30° C.; (xiv) less than 1% carbohydrate weight/weight; (xv) solubility in DMSO is >100 g/L; (xvi) solubility in THF is >35 g/L; (xvii) solubility in 0.1 N NaOH aqueous solution is >8 g/L; (xviii) less than 1% water by weight; and (xix) less than 1% volatile components at 200° C. by weight. The invention further provides a spinning method. The method involves (a) providing the lignin composition described herein; (b) spinning said lignin to produce fibers; and (c) de-solventizing said fibers. Optionally, the method further comprises contacting said composition with an anti-solvent. Optionally, the method further comprises mixing said composition with a synthetic polymeric material. Optionally, the synthetic polymeric material comprises polyacrylonitrile. Optionally, a ratio of lignin:synthetic polymer is ≥1:10. Optionally, a ratio of lignin:synthetic polymer is ≤10:1.

Optionally, the method further comprises carbonizing said fibers to produce carbon fibers.

The invention further provides a fiber produced by a method described herein. For instance, a product comprising a fiber described herein. Further provided is a method comprising: (i) providing a lignin composition described herein and (ii) converting at least a portion of lignin in the composition to a conversion product. Optionally, the converting comprises treating with hydrogen. Optionally, the converting comprises treating with a hydrogen donor. Optionally, the hydrogen donor is selected form formic acid, formate salt, an alcohol. Optionally, the alcohol is isopropanol. Optionally, the method further comprises producing hydrogen from lignin. Optionally, the conversion product comprises at least one item selected from the group consisting of bio-oil, carboxylic and fatty acids, dicarboxylic acids, hydroxyl-carboxylic, hydroxyl di-carboxylic acids and hydroxyl-fatty acids, methylglyoxal, mono-, di- or poly-alcohols, alkanes, alkenes, aromatics, aldehydes, ketones, esters, phenols, benzene, toluenes, and xylenes. Optionally, conversion product comprises a fuel or a fuel ingredient. Optionally, the conversion product comprises para-xylene.

Further described are consumer products produced according to the methods described herein, a consumer product produced from the conversion product or a consumer product containing the conversion product as an ingredient or component. Optionally, the product comprises at least one chemical selected from the group consisting of lignosulfonates, bio-oil, carboxylic and fatty acids, dicarboxylic acids, hydroxyl-carboxylic, hydroxyl di-carboxylic acids and hydroxyl-fatty acids, methylglyoxal, mono-, di- or poly-alcohols, alkanes, alkenes, aromatics, aldehydes, ketones, esters, biopolymers, proteins, peptides, amino acids, vitamins, antibiotics, paraxylene and pharmaceuticals. Optionally, the product comprises para-xylene. Optionally, the product is selected from the group consisting of dispersants, emulsifiers, complexants, flocculants, agglomerants, pelletizing additives, resins, carbon fibers, active carbon, antioxidants, flame retardant, liquid fuel, aromatic chemicals, vanillin, adhesives, binders, absorbents, toxin binders, foams, coatings, films, rubbers and elastomers, sequestrants, fuels, and expanders. Optionally, the product is used in an area selected from the group consisting of food, feed, materials, agriculture, transportation and construction. Optionally, the product has a ratio of carbon-14 to carbon-12 of about $2.0 \times 10^{-13}$ or greater. Optionally, the product further comprises an ingredient produced from a raw material other than lignocellulosic material. Optionally, the ingredient from the product described herein and the ingredient produced from a raw material other than lignocellulosic material are essentially of the same chemical composition. Optionally, the product comprises a marker molecule at a concentration of at least 100 ppb. Optionally, the marker molecule is selected from the group consisting of furfural and hydroxy-methyl furfural, 2,3,5 trimethyl furan, products of their condensation, color compounds, acetic acid, p-hydroxyphenoxyacetic acid, 4-hydroxy-3,5-dimethoxyphenyl) acetic acid, methylethyl ketone, Methylpropenyl ketone, 3-(2-furyl)-3-penten-2-one, 3-methyl-2-penten-4-one, 3,4-dimethyl-4-hexene-one, 5-ethyl-5-hexene-3-one, 5-methyl-4-heptene-3-one, o-hydroxyanisole, 3-ethyl-4-methyl-3-penten-2-one, 3,4,4-trimethyl-2-cyclohexene-1-one, 2'-hydroxy-4',5'-dimethylacetophenone, 1-(4-hydroxy-3-methoxyphenyl)propane methanol, galacturonic acid, dihydroabietic acid, glycerol, fatty acids and resin acids.

The invention further provides a method of producing cellulose from a biomass. The method comprises: (i) removing hemicellulose sugars from the biomass thereby obtaining a lignocellulosic remainder; wherein the lignocellulosic remainder comprises lignin and cellulose; (ii) contacting the lignocellulosic remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; (iii) separating the lignin extract from the cellulosic remainder; wherein the lignin extract comprises lignin dissolved in the limited-solubility solvent; and (iv) obtaining cellulosic remainder pulp. Optionally, the cellulosic remainder pulp is converted to a conversion product using a chemical process. Optionally, the conversion product comprises at least one member selected from the group consisting of halomethylfurfural, hydroxymethylfurfural, furfural, para-xylene, or any combination thereof. Optionally, the cellulosic remainder pulp is used to produce a texturizer, an anti-caking agent, a fat substitute, an emulsifier, an extender, or a bulking agent.

The invention further provides a cellulose composition. The cellulose composition comprises one or more, two or more, three or more, or four or more of the following characteristics: (i) cellulose to solid ratio of >85% weight/weight; (ii) crystalline cellulose to solid ratio of >50% weight/weight; (iii) lignin to solid ratio up to <10% weight/weight; and (iv) hemicellulose carbohydrate to solid ratio up to <4% weight/weight. Optionally, the composition comprises cellulose at more than 90% weight/weight. Optionally, the composition further comprises one or more, two or more, three or more, four or more, five or more, or six or more of the following characteristics: (i) C6 sugars to solid ratio of >70% weight/weight; (ii) glucose to solid ratio of >70% weight/weight; (iii) C5 sugars to solid ratio up to <5% weight/weight; (iv) total sugars to solid ratio of >75% weight/weight; (v) trace Mg, Mn, Na, Zn <10 ppm; and (vi) trace Cu, Fe, K, Al, Cr, <200 ppm. Optionally, the composition further comprises one or more, two or more, three or more, four or more, five or more, or six or more, seven or more, eight or more, nine or more, ten or more, eleven or more, or twelve or more of the following characteristics: (i) a loss of drying from 2.0-5.0%; (ii) bulk density of 0.29-0.36 g/cc; (iii) passes microcrystalline cellulose identification tests A and B in the Food Chemical Codex (FCC) ($5^{th}$ Ed. 2004), wherein test A) a white opaque, bubble-free dispersion which does not form a supernatant liquid at the surface is obtained after 100 mL of a dispersion 45 g of cellulose in 255 mL water is mixed for 5 minutes in a high-speed power blender (18,000 rpm) is left standing in a 100-mL graduate for 3 hours, and wherein test B) 20 mL of the dispersion is mixed with a few drops of iodine TS and no purplish to blue or blue color is produced; (iv) degree of polymerization is of no more than 350 units; (v) pH of 5.5-7.0; (vi) conductivity is not more than 75 µS/cm; (vii) residue on ignition is not more than 0.05% weight/weight; (viii) water soluble substances are not more than 12.5 mg/5 g; (viii) ether soluble substances are not more than 5.0 mg/10 g; (ix) heavy metals are not more than 0.001% weight/weight; (x) soluble in copper tetrammine hydroxide; (xi) particle size under 250 microns is not less than 10% weight/weight; and (xii) particle size under 150 microns is not less than 50% weight/weight. Further provided is a method of producing a conversion product, wherein the conversion product is a texturizer, an anti-caking agent, a fat substitute, an emulsifier, an extender, thin layer chromatography stationary phase, filler in a drug tablet, a bulking agent in food production, plaque assay kit, or surfactant made from the cellulose composition described herein. Optionally, the conversion product has a ratio of carbon-14 to carbon-12 of about $2.0 \times 10^{-13}$ or greater.

The invention further provides methods of producing bio oil from a biomass, comprising: (i) removing ash from the biomass in an ash removal process; (ii) removing hemicellulose sugars from the biomass thereby obtaining a lignocellulosic remainder; wherein the lignocellulosic remainder comprises lignin and cellulose; and (iii) producing bio-oil by thermal or hydrothermal conversion of the lignocellulosic remainder. Further provided is the bio-oil produced from the method described herein.

The invention further provides a method to improve properties of an asphalt composition by compounding the asphalt compound with a least 2% wt/wt solid lignin made using the method described herein, where improved properties are selected from one or two or three of the following characteristics: (i) stability against oxidation; (ii) stability against UV radiation; (iii) having a renewable carbon component.

Further provided is an annual crop lignocellulosic composition comprising less than 4% ash following an ash removal process, wherein said annual crop lignocellulosic comprises more than 8% ash at harvest or before ash removal process. Optionally, the annual crop lignocellulosic comprises less than 3% ash following an ash removal process.

DESCRIPTION OF THE FIGURES

FIG. 8A is a simplified flow schemes of method for treating cellulose pulp and residual lignin according to some embodiments of the invention.

DETAILED DESCRIPTION OF THE INVENTION

Introduction

The present invention relates to lignocellulosic biomass processing and refining to produce hemicellulose sugars, cellulose sugars, lignin, cellulose and other high-value products.

Figure 1:
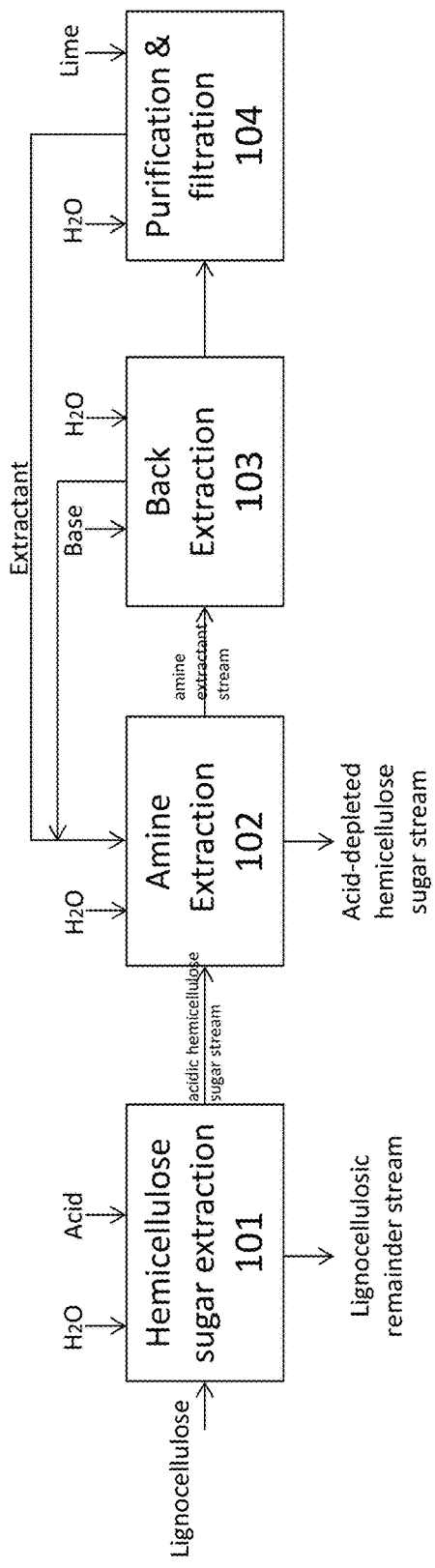
FIGS. 1-4 are simplified flow schemes of methods for treating lignocellulose material according to some embodiments of the invention.
Figure 2:
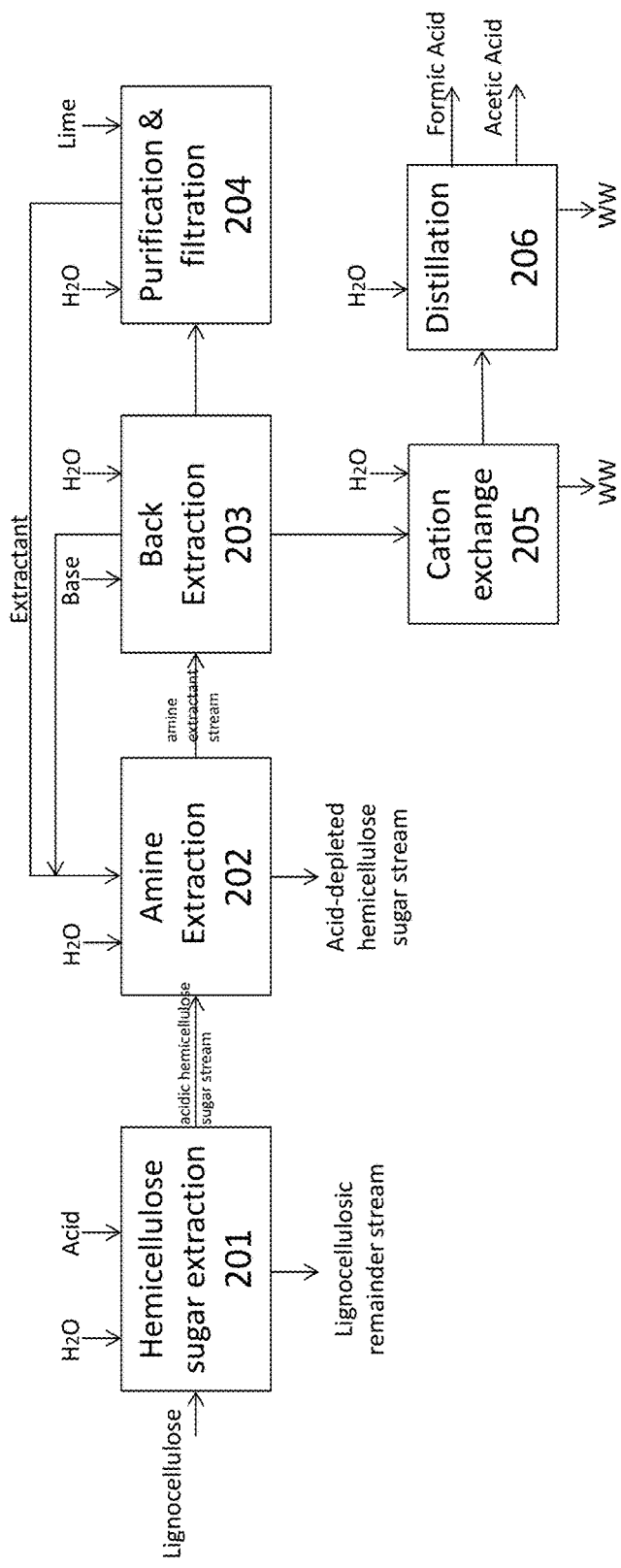
Figure 3:
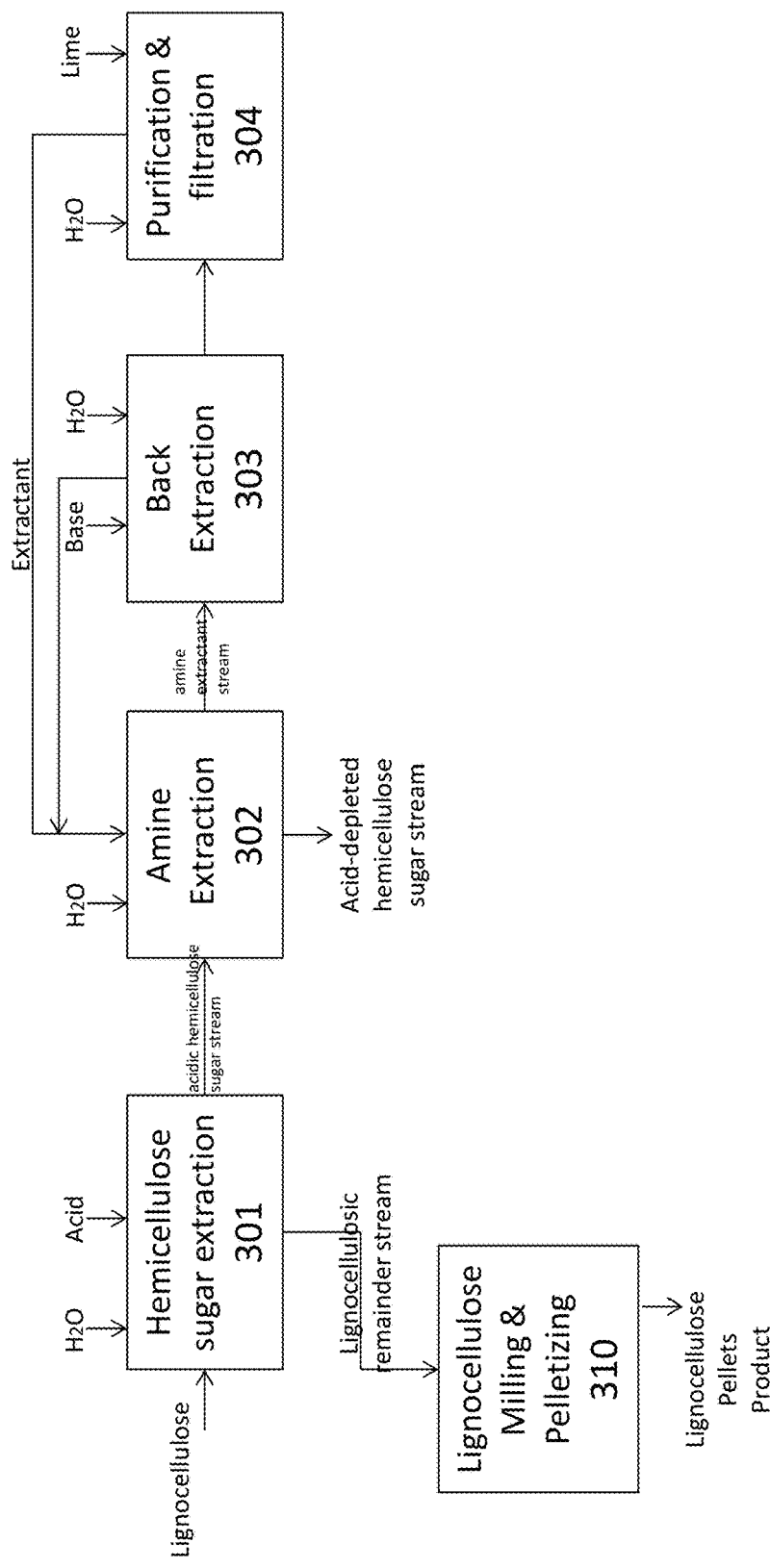
Figure 4:
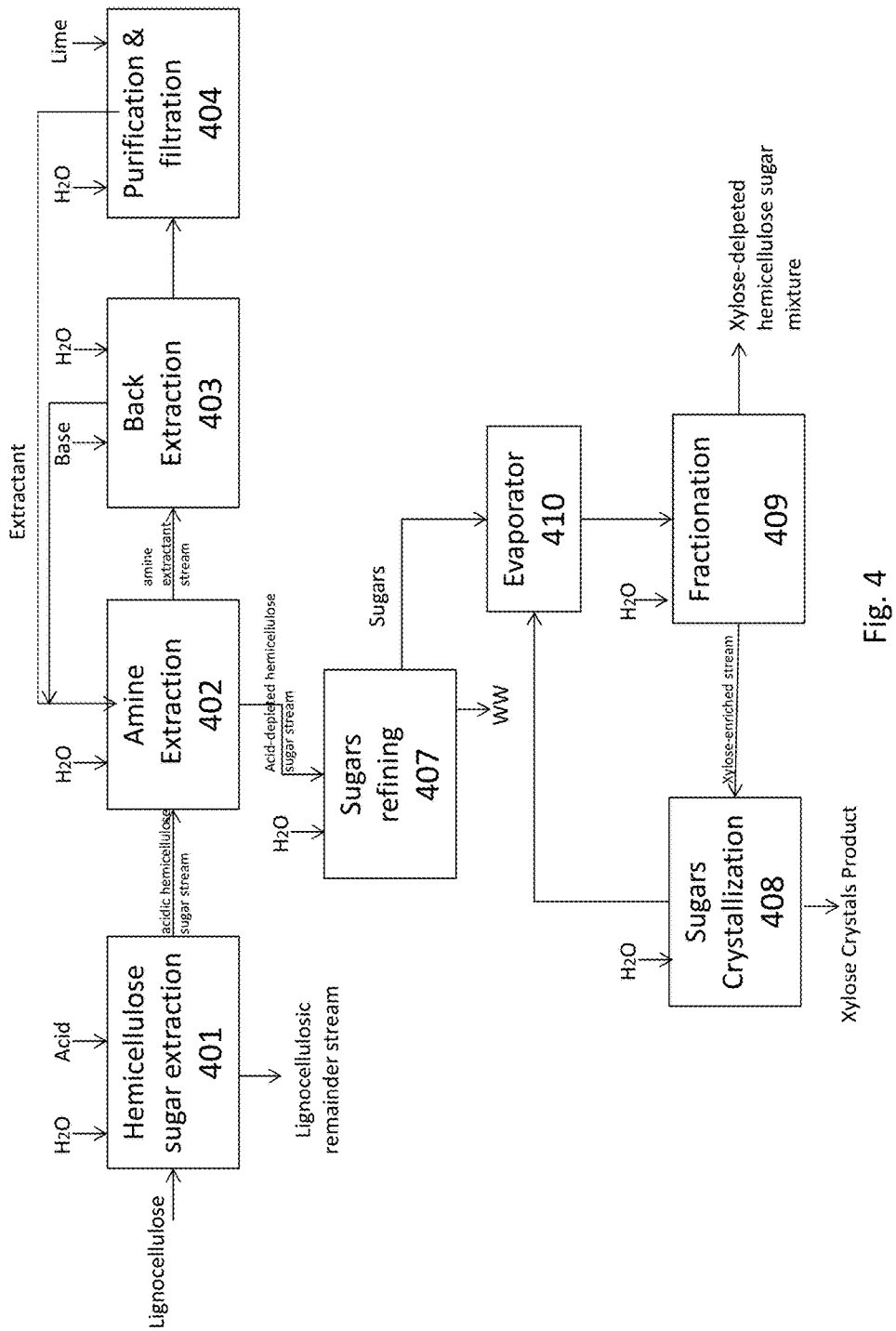
Figure 5:
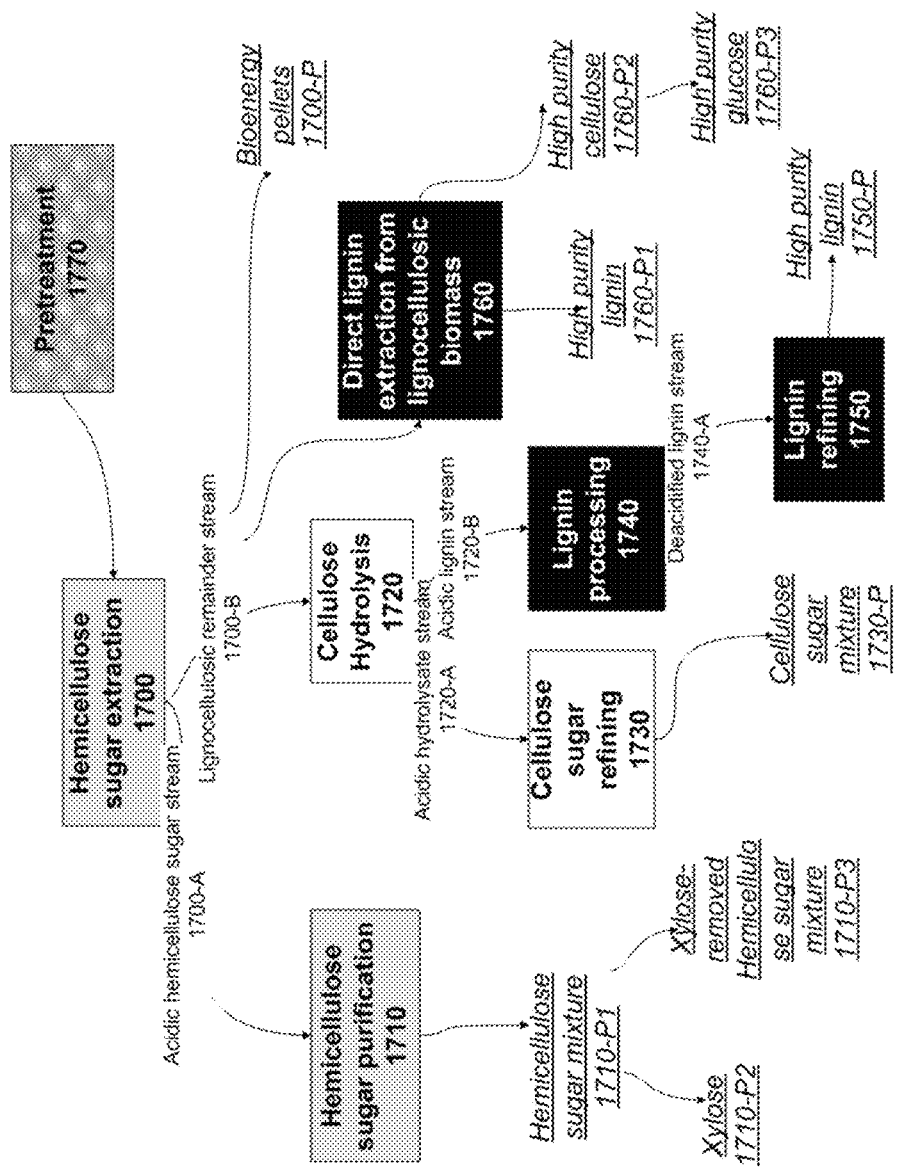
FIG. 5 is a schematic representation of an exemplary method of treating lignocellulosic biomass material according to some embodiments of the present invention.
Figure 6:
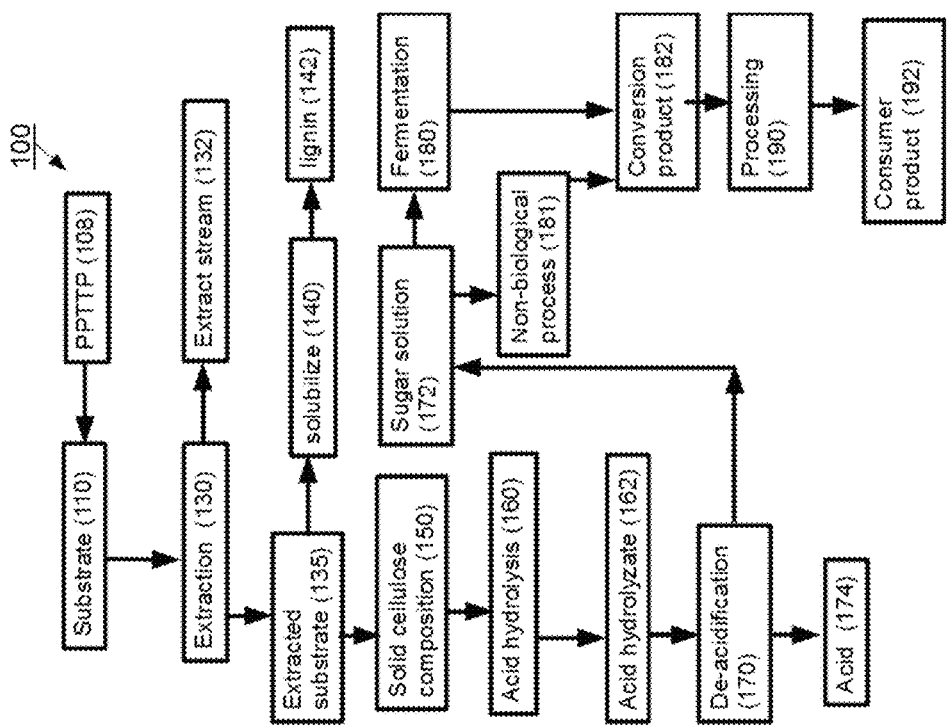
FIG. 6 is a simplified flow scheme of a method according to alternative lignin solubilization embodiments of the invention. PPTTP stands for "predetermined pressure-temperature-time profile."

An overview of the lignocellulosic biomass processing and refining according to embodiments disclosed herein is provided in FIG. 5. In general, the lignocellulosic biomass processing and refining processes include: (1) pretreatment 1770; (2) hemicellulose sugar extraction 1700 and purification 1710; and (3) direct lignin extraction 1760.

Various products can be made using these processes. For example, hemicellulose sugar extraction 1700 produces an aqueous stream of hemicelluloses 1700-A and a lignocellulose remainder product 1700-P1. Purification 1710 produce a hemicellulose sugar mixture, xylose, and a xylose-removed hemicellulose sugar mixture, as well as bioenergy pellets. Direct lignin extraction 1760 process produces a high purity lignin. The lignocellulose remainder 1770-P1 can be pelletized as is to make bioenergy pellet 1700-P2, or can be the substrate for thermal or hydrothermal conversion to bio oil and aromatics. Direct lignin extraction 1760 process produces a high purity lignin and cellulose. This remaining cellulose pulp may be used in any application known of microcrystalline cellulose, including but not limited to a texturizer, an anti-caking agent, a fat substitute, an emulsifier, an extender, thin layer chromatography stationary phase, filler in a drug tablet, a bulking agent in food production, plaque assay kit, or surfactant. This cellulose may be hydrolyzed 1820 to high purity glucose, or may be partially hydrolyzed by selectively hydrolyzing only amorphous cellulose to obtain crystalline cellulose and high purity glucose. Alternatively the cellulose may be converted to substituted furans by any process known to convert cellulose to substituted furans; these substituted furans may be further converted to para xylene.

The lignocellulosic biomass processing and refining begins with pretreatment 1770, during which the lignocellulosic biomass can be, for example, debarked, chipped, shredded, dried, or grinded to particles.

During hemicellulose sugar extraction 1700, the hemicellulose sugars are extracted from the lignocellulosic biomass, forming an acidic hemicellulose sugar stream 1700A and a lignocellulosic remainder stream 1700B. The lignocellulosic remainder stream 1700B consists of mostly cellulose and lignin. Hemicellulose sugars can be effectively extracted and converted into monomeric sugars (e.g., >90% of the total sugar) by treating biomass under mild conditions, e.g., with an acid in low concentrations, heat, and optionally pressure.

The acidic hemicellulose sugar stream 1700-A is purified in hemicellulose sugar purification 1710, acids and impurities co-extracted with hemicellulose sugars can be easily removed from the hemicellulose sugar stream by solvent extraction. Once acids and impurities are removed from the hemicellulose sugar stream, the stream is neutralized and optionally evaporated to a higher concentration. A high purity hemicellulose sugar mixture 1710-P1 is obtained, which can be fractionated to obtain xylose and xylose-removed hemicellulose sugar mixture 1710-P3. Xylose is then crystallized to obtain xylose 1710-P2.

The lignocellulosic remainder 1700-B contains mostly cellulose and lignin. In some methods, the lignocellulosic remainder 1700-B can be processed to make bioenergy pellets 1700-P, which can be burnt as fuels.

In some methods, the lignocellulosic remainder 1700-P1 can be directly processed to bio-oil by any suitable process selected from pyrolysis, fast pyrolysis, catalytic pyrolysis, hydrothermal pyrolysis, supercritical or sub-supercritical pyrolysis. Bio-oil has the advantage over bio energy pellets of being a liquid phase fuel, and it allows further upgrading by hydrogenation processes to higher quality fuel. Alternatively, some thermal and/or hydrothermal processes utilizing catalyst(s) may produce directly upgraded fuels. In some methods, the lignocellulosic remainder 1700-P1 is catalytically converted to biofuel, aromatic, and olefin compounds.

Any process that can covert biomass to fuel benefits from using the lignocellulosic remainder as feedstock since hemicelluloses sugar extraction process 1700 removes not only cellulose from the biomass but also a significant part of ash elements present in the feedstock, hence making it a higher grade starting material for said conversion processes.

In some methods, the lignocellulosic remainder 1700-P1 can be directly processed to extract lignin. This process produces a high purity lignin 1760-P1 and a high purity cellulose 1760-P2. The novel lignin purification process of the invention utilizes a limited-solubility solvent, and can produce a lignin having a purity greater than 99%.

The cellulose product 1760-P2 comprises low levels of lignin, typically less than 10%, 8%, 5% wt/wt, and low levels of hemicelluloses, typically less than 8%, 5%, 2.5% wt/wt. It may be used in any application that requires microcrystalline cellulose.

Figure 10A:
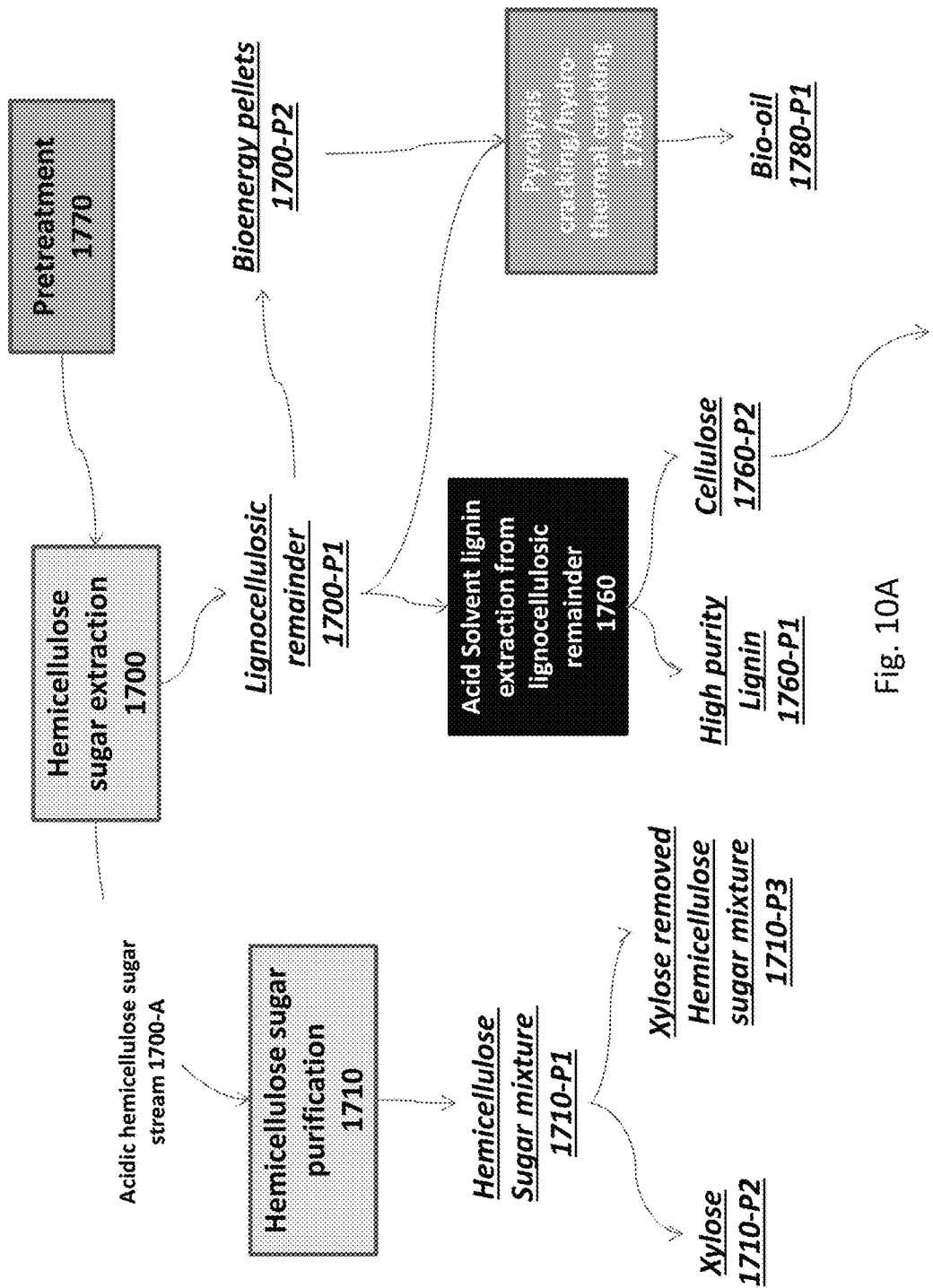
FIG. 10A and FIG. 10B are a schematic representation of an exemplary method of treating lignocellulosic biomass material according to some embodiments of the present invention.
Figure 10B:
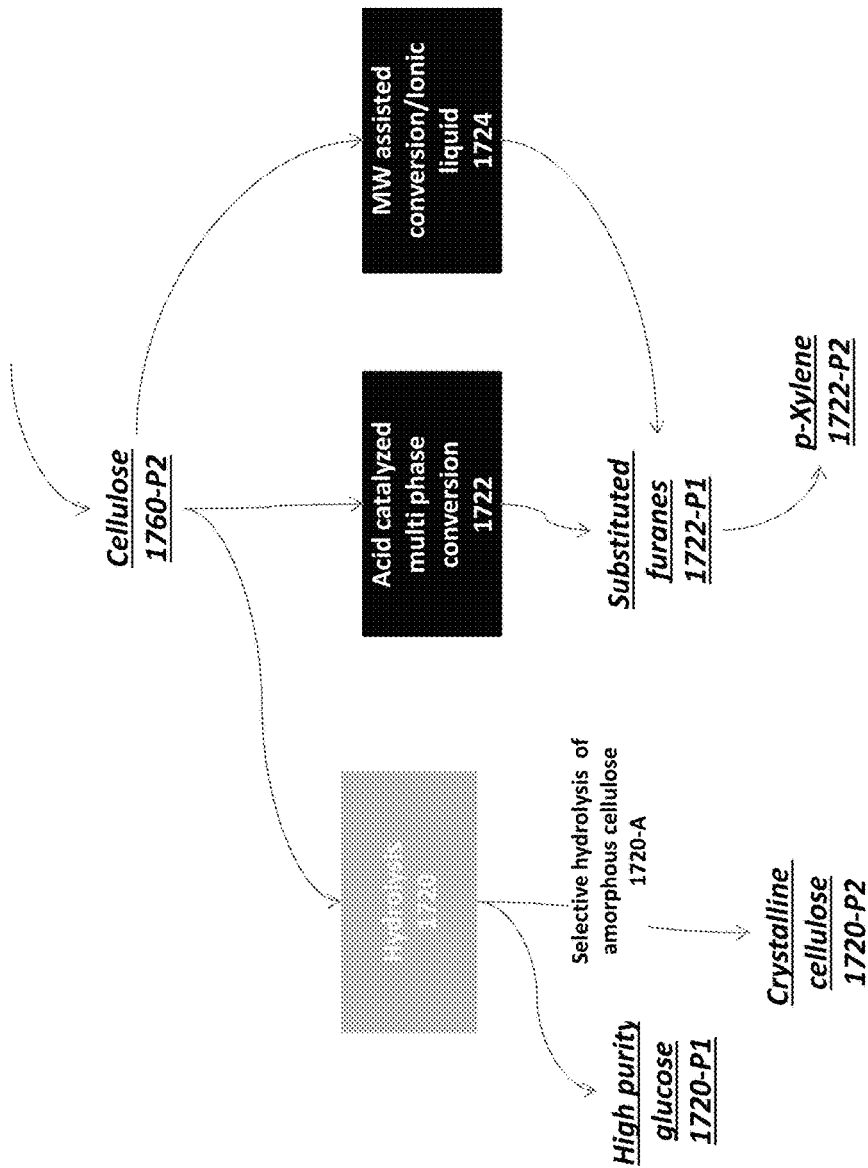

The cellulose product 1760-P2 can be used as starting material for several chemical or biochemical processes. Cellulose 1760-P2, which is principally cellulose pulp 1001 FIG. 8A, comprising residual amount of lignin is hydrolyzed by biochemical or chemical saccharification method 1002. It is then filtered, purified and fractionated to obtain high purity glucose product stream as schematically described in FIG. 8A to obtain refined $C_6$ sugar product, denoted as high purity glucose 1720-P1 in FIG. 10B.

In some methods, cellulose product 1760-P2 is converted to substituted furans. In some method, this conversion is carried out in a multiphase reactor where gaseous HCl is the catalyst. In other methods this conversion is carried out in an aqueous solution with magnesium, calcium, aluminum or zinc halide as catalyst. Other metal halides may also serve as catalysts. Alternatively boronic acid is employed as catalyst. In some methods, this conversion is carried out in ionic liquid or in aprotic polar solvent or in a mixture thereof. Conversion may be assisted by microwave irradiation or by ultrasonic irradiation.

The sections I-VI below illustrate lignocellulosic biomass processing and refining according to some embodiments disclosed herein. Section I discusses pretreatment 1770. Section II discusses hemicellulose sugar extraction 1700 and section III discusses conversion of hemicelluloses depleted lignocellulose remained to bio-oil and upgraded product. Section IV discusses direct lignin extraction 1760 and provides a lignin composition produced by the processes. Section V discusses uses of the disclosed lignin composition for making carbon fibers and as feed for conversion processes. VI discloses a method to produce remainder cellulose pulp and composition of remainder cellulose pulp. Section VII details conversion processes of the cellulose pulp.

I. Pretreatment

Prior to hemicellulose sugar extraction 1700, lignocellulosic biomass can be optionally pre-treated. Pretreatment refers to the reduction in biomass size (e.g., mechanical breakdown or evaporation), which does not substantially affect the lignin, cellulose and hemicellulose compositions of the biomass. Pretreatment facilitates more efficient and economical processing of a downstream process (e.g., hemicellulose sugar extraction). Preferably, lignocellulosic biomass is debarked, chipped, shredded and/or dried to obtain pre-treated lignocellulosic biomass. Pretreatment can also utilize, for example, ultrasonic energy or hydrothermal treatments including water, heat, steam or pressurized steam. Pretreatment can occur or be deployed in various types of containers, reactors, pipes, flow through cells and the like. In some methods, it is preferred to have the lignocellulosic biomass pre-treated before hemicellulose sugar extraction 1700. In some methods, no pre-treatment is required, i.e., lignocellulosic biomass can be used directly in the hemicellulose sugar extraction 1700.

In some cases the lignocellulosic biomass comprises up to 10%, up to 15% up to 20% inorganic particles, e.g. small soil particles that adhere to the growing plant and get encapsulated by the plant tissue such that these soil particle that are associated with the biomass and do not get washed if the biomass is not broken up. Typically sugar cane bagasse, corn stover, rice husks and other annual crops may have such high percentage of inorganic matter associated with the biomass. To allow utilization of such lignocellulose biomass it is essential to remove this access inorganic matter. Pretreatment may include initial grinding of the biomass and washing of the inorganic matter. The inorganic matter is mostly insoluble at neutral pH, therefore differences in densities between the small soil particles and the lignocellulosic biomass are utilized to separate between them.

Optionally, lignocellulosic biomass can be milled or grinded to reduce particle size. In some embodiments, the lignocellulosic biomass is ground such that the average size of the particles is in the range of 100-10,000 micron, preferably 400-5,000, e.g., 100-400, 400-1,000, 1,000-3,000, 3,000-5,000, or 5,000-10,000 microns. In some embodiments, the lignocellulosic biomass is ground such that the average size of the particles is less than 10,000, 9,000, 8,000, 7,000, 6,000, 5,000, 4,000, 3,000, 1,000, or 400.

II. Hemicellulose Sugar Extraction

The present invention provides an advantageous method of extracting hemicellulose sugars from lignocellulosic biomass (hemicellulose sugar extraction 1700). Preferably, an aqueous acidic solution is used to extract lignocellulose biomass. The aqueous acidic solution can contain any acids, inorganic or organic. Preferably, an inorganic acid is used. For example, the solution can be an acidic aqueous solution containing an inorganic or organic acid such as $H_2SO_4$, $H_2SO_3$ (which can be introduced as dissolved acid or as $SO_2$ gas), HCl, and acetic acid. The acidic aqueous solution can contain an acid in an amount of 0 to 2% acid or more, e.g., 0-0.2%, 0.2-0.4%, 0.4-0.6%, 0.6-0.8%, 0.8-1.0%, 1.0-1.2%, 1.2-1.4%, 1.4-1.6%, 1.6-1.8%, 1.8-2.0% or more weight/weight. Preferably, the aqueous solution for the extraction includes 0.2-0.7% $H_2SO_4$ and 0-3,000 ppm $SO_2$. The pH of the acidic aqueous solution can be, for example, in the range of 1-5, preferably 1-3.5.

In some embodiments, an elevated temperature or pressure is preferred in the extraction. For example, a temperature in the range of 100-200° C., or more than 50° C., 60° C., 70° C., 80° C., 90° C., 100° C., 110° C., 120° C., 130° C., 140° C., 150° C., 160° C., 170° C., 180° C., 190° C., or 200° C. can be used. Preferably, the temperature is in the range of 110-160° C., or 120-150° C. The pressure can be in the range of 1-10 mPa, preferably, 1-5 mPa. The solution can be heated for 0.5-5 hours, preferably 0.5-3 hours, 0.5-1 hour, 1-2 hours, or 2-3 hours, optionally with a cooling down period of one hour.

Impurities such as ash, acid soluble lignin, fatty acids, organic acids such as acetic acid and formic acid, methanol, proteins and/or amino acids, glycerol, sterols, rosin acid and waxy materials can be extracted together with the hemicellulose sugars under the same conditions. These impurities can be separated from the aqueous phase by solvent extraction (e.g., using a solvent containing amine and alcohol).

After the hemicellulose sugar extraction 1700, the lignocellulosic remainder stream 1700-B can be separated from the acidic hemicellulose sugar stream 1700-A by any relevant means, including, filtration, centrifugation or sedimentation to form a liquid stream and a solid stream. The acidic hemicellulose sugar stream 1700-A contains hemicellulose sugars and impurities. The lignocellulosic remainder stream 1700-B contains predominantly cellulose and lignin.

The lignocellulosic remainder stream 1700-B can be further washed to recover additional hemicellulose sugars and acidic catalyst trapped inside the biomass pores. The recovered solution can be recycled back to the acidic hemicellulose sugar stream 1700-A, or recycled back to the hemicellulose sugar extraction 1700 reactor. The remaining lignocellulosic remainder stream 1700-B can be pressed mechanically to increase solid contents (e.g., dry solid contents 40-60%). Filtrate from the pressing step can be recycled back to the acidic hemicellulose sugar stream 1700-A, or recycled back to the hemicellulose sugar extraction 1700 reactor. Optionally, the remaining lignocellulosic remainder 1700-B is ground to reduce particle sizes. Optionally, the pressed lignocellulosic remainder is then dried to lower the moisture content, e.g., less than 15%. The dried matter can be further processed to extract lignin and cellulose sugars (processes 1720 and 1760 in FIG. 5). Alternatively, the dried matter can be pelletized into pellets 1700-P, which can be burnt as energy source for heat and electricity production or can be used as feedstock for conversion to bio oil.

Alternatively, the lignocellulosic remainder stream 1700-B can be further processed to extract lignin (process 1760 in FIG. 5). Prior to the lignin extraction, the lignocellulosic remainder stream 1700-B can be separated, washed, and pressed as described above.

It was found that hemicellulose sugar extraction 1700 can produce, in one single extraction process, a hemicellulose sugar stream containing at least 80-95% monomeric sugars. For example, the hemicellulose sugar stream can contain more than 80%, 85%, 90%, 91%, 92%, 93%, 94%, 95%, 96%, 97%, 98%, or 99% monomeric sugars. In addition, the present method produces minimal amounts of lignocellulose degradation products such as furfural, levulinic acid, and formic acid. In addition, a xylose yield greater than 93% of theoretical value can be achieved. Overall, 18-27% of total sugars and at least 70%, 75%, or 80% or more of the hemicellulose sugars can be extracted using the present method.

The acidic hemicellulose sugar stream 1700-A is then subject to hemicellulose sugar purification 1710. Various hemicellulose sugar products can be obtained from the purification. Exemplary purified products include hemicellulose sugar mixture 1710-P1, xylose 1710-P2, and xylose-removed hemicellulose sugar mixture 1710-P3.

Further processing of the hemicelluloses sugar stream is detailed in PCT US2013/039585, the entire contents of which are incorporated by reference herein. Sections I-VIII of PCT US2013/039585 illustrate lignocellulosic biomass processing and refining according to some embodiments, section I discusses pretreatment 1770, sections II and III discuss hemicellulose sugar extraction 1700 and purification 1710, sections IV and V discuss cellulose hydrolysis 1720 and cellulose sugar refining 1730, section VI and VII discuss lignin processing 1740 and refining 1750, and section VIII discusses direct lignin extraction 1760, the contents of these sections are specifically incorporated by reference herein.

III. Applications of Lignocellulose Remainder

Different technologies to convert biomass are being developed. These include pyrolysis, fast pyrolysis, catalytic pyrolysis, hydrothermal pyrolysis, supercritical or sub-supercritical pyrolysis that convert biomass to bio-oil. Bio-oil is then upgraded to more stable, high energy content hydrocarbon compounds. In some technologies, both process steps are conducted in concert.

Fast pyrolysis, which can involve, for example, rapidly heating biomass (e.g., ~500° C./sec) to intermediate temperatures (e.g., ~400-600° C.) followed by rapid cooling (e.g., residence times 1-2 s). (See, A. V. Bridgwater, Review of fast pyrolysis of biomass and product upgrading, *Biomass and Bioenergy,* 38 (2012) 68-94.). Various designs of reactors and systems are described, particularly several types of fluidized bed reactor including but not limited to bubbling fluidized bed reactors, circulating fluidized bed reactors, rotary cone reactors, Auger reactors and ablative reactors. The main difference among these reactors is the applied heat transfer method which may be by gas, liquid or solid, and the heating rates which differs in the rang 700-1500 K/s.

The products of fast pyrolysis are char (solid), liquid and a gaseous fraction, control of the heating rate is the major factor controlling the relative part of the fractions.

Fast pyrolysis often produces a thermally unstable liquid product mixture called bio-oils, an acidic combustible liquid mixture of more than 300 compounds that degrades with time. The bio-oil mixture can be upgraded to a more stable mixture comprising benzene, toluene, xylene (BTX), along with numerous other chemicals that can be fractionated by distillation similar to petrochemical distillation and are therefore considered as drop in fuels. Chemically, the upgrading process typically involves hydrogenation to increase the energy content of the molecules and remove oxidized molecular moieties. These processes require a source of hydrogen, whether supplied or produced in situ in a tandem process, and catalyst(s).

Biomass can be pyrolyzed to one or more fluid hydrocarbon products from a solid hydrocarbonaceous material by reacting it over a solid catalyst in a fluidized bed reactor; feeding a solid hydrocarbonaceous material to the fluidized bed reactor at a mass-normalized space velocity of between about 0.01 hour$^{-1}$ and about 10 hour$^{-1}$; pyrolyzing within the fluidized bed reactor at least a portion of the hydrocarbonaceous material under reaction conditions sufficient to produce one or more pyrolysis products; and catalytically reacting at least a portion of the one or more pyrolysis products using the solid catalyst under reaction conditions sufficient to produce the one or more fluid hydrocarbon products. Preferred catalyst comprises zeolite catalyst. Preferred products of this process are aromatic compounds comprise benzene, toluene, xylenes, substituted benzenes, indanes and naphthalene, and the olefin compounds ethene, propene, and/or butene.

In another process to produce bio-oil from lignocellulose biomass the method comprising the steps of: (a) fractionating hemicellulose from the biomass with a solvent, (b) removing fractionated hemicellulose from biomass remaining after step (a); (c) fractionating either of: (i) lignin (ii) cellulose from the biomass remaining after step (a); and (d) solvating either or both of the lignin and cellulose of step (c), wherein the solvating in step (d) produces the bio-oil product. In one aspect, the fractionating in step (c) is performed using an alcohol, an aqueous alcohol, or water. The alcohol, aqueous alcohol, or water may be used to fractionate the lignin or cellulose under supercritical conditions.

The lignocellulose remainder of this invention is an advantageous feedstock material for the pyrolysis processes described briefly herein as well as any other biomass pyrolysis process over the native biomass for several reasons: (i) reduced ash fraction due to removal of inorganic compounds in the hemicelluloses sugar extraction step, thus reducing amounts of ash produces as byproduct in pyrolysis and reducing catalysts fouling by inorganic ions; (ii) the lignocellulose remainder is much more amenable to size reduction of compared to native biomass due to its brittleness, thus reduced energy demands of the size reduction step; and (iii) increased energy density of the lignocellulose remainder compared to native biomass due to removal of inorganic compounds and removal of hemicellulose component.

IV. Direct Lignin Extraction from Lignocellulosic Biomass

The present disclosure includes, in one aspect, a method of extracting lignin directly from lignocellulosic biomass after hemicellulose sugars are extracted. Such method utilizes a limited-solubility solvent. Such method may be utilized with biomass particles without the need to grind the particles prior to lignin extraction.

The extraction of hemicellulose sugars from the biomass results in a lignin-containing remainder. In some methods, the extraction of hemicellulose sugars does not remove a substantial amount of the cellulosic sugars. For example, the extraction of hemicellulose sugars does not remove more than 1, 2, 5, 10, 15, 20, 30, 40, 50, 60% weight/weight cellulose. In some embodiments, the lignin-containing remainder contains lignin and cellulose. In some embodiments, the lignin-containing remainder contains less than 50, 45, 40, 35, 30, 25, 20, 15, 10, 5, 2, 1% hemicellulose. In some embodiments, the lignin can be directly extracted from lignocellulosic biomass without removing hemicellulose sugars.

The lignin extraction solution preferably contains a limited-solubility solvent, an acid, and water. Examples of limited-solubility solvents suitable for the present invention include methylethylketone, diethylketone, methyl isopropyl ketone, methyl propyl ketone, mesityl oxide, diacetyl, 2,3-pentanedione, 2,4-pentanedione, 2,5-dimethylfuran, 2-methylfuran, 2-ethylfuran, 1-chloro-2-butanone, methyl tert-butyl ether, diisopropyl ether, anisol, ethyl acetate, methyl acetate, ethyl formate, isopropyl acetate, propyl acetate, propyl formate, isopropyl formate, 2-phenylethanol, toluene, 1-phenylethanol, phenol, m-cresol, 2-phenylethyl chloride, 2-methyl-2H-furan-3-one, γ-butyrolactone, acetal, methyl ethyl acetal, dimethyl acetal, morpholine, pyrrol, 2-picoline, 2,5-dimethylpyridine. Optionally, the limited-solubility solvent includes one or more of esters, ethers and ketones with 4 to 8 carbon atoms. For example, the limited-solubility solvent can include ethyl acetate. Optionally, the limited-solubility solvent consists essentially of, or consists of, ethyl acetate.

The ratio of the limited-solubility solvent to water suitable for carrying out the lignin extraction can vary depending on the biomass material and the particular limited-solubility solvent used. In general, the solvent to water ratio is in the range of 100:1 to 1:100, e.g., 50:1-1:50, 20:1 to 1:20, and preferably 1:1.

Various inorganic and organic acids can be used for lignin extraction. For example, the solution can contain an inorganic or organic acid such as $H_2SO_4$, HCl, acetic acid and formic acid. The acidic aqueous solution can contain 0 to 10% acid or more, e.g., 0-0.4%, 0.4-0.6%, 0.6-1.0%, 1.0-2.0%, 2.0-3.0%, 3.0-4.0%, 4.0-5.0% or more. Preferably, the aqueous solution for the extraction and hydrolysis includes 0.6-5%, preferably 1.2-1.5% acetic acid. The pH of the acidic aqueous solution can be, for example, in the range of 0-6.5.

Elevated temperatures and/or pressures are preferred in lignin extraction. For example, the temperature of lignin extraction can be in the range of 50-300° C., preferably 160 to 220° C., e.g., 170-200° C. The pressure can be in the range of 1-30 mPa, preferably, 12-26 mPa. The solution can be heated for 0.5-24 hours, preferably 1-3 hours.

Lignin is extracted in the limited-solubility solvent (organic phase), the remaining solid contains mostly cellulose. After the solid phase is washed to remove residual lignin, the cellulose can be used to produce pulp, or as starting material for hydrolysis (acidic or enzymatic). Cellulose may also be hydrolyzed by any acidolysis method known, using a mineral acid or an organic acid.

Optionally, the pH of the solvent is adjusted to 3.0 to 4.5 (e.g., 3.5-3.8). At this pH range, the lignin is protonated and is easily extracted into the organic phase. The organic phase comprising solvent and lignin is contacted with strong acid cation exchanger to remove residual metal cations. To obtain high purity solid lignin, the limited-solubility solvent is separated from lignin, e.g., evaporated. Preferably, the limited-solubility solvent can be separated from lignin by mixing the solvent solution containing acidic lignin with water at an elevated temperature, optionally under vacuum (e.g., 50-80° C.). The precipitated lignin can be recovered by, e.g., filtration or centrifugation. The solid lignin can be dissolved in any suitable solvents (e.g., phenylethyl alcohol) for making lignin solutions.

Alternatively, the limited-solubility solvent solution containing acidic lignin can be mixed with another solvent (e.g., toluene). The limited-solubility solvent can be evaporated whereas the replacement solvent (e.g., toluene) stays in the solution. A lignin solution in a desired solvent can be prepared.

Figure 9:
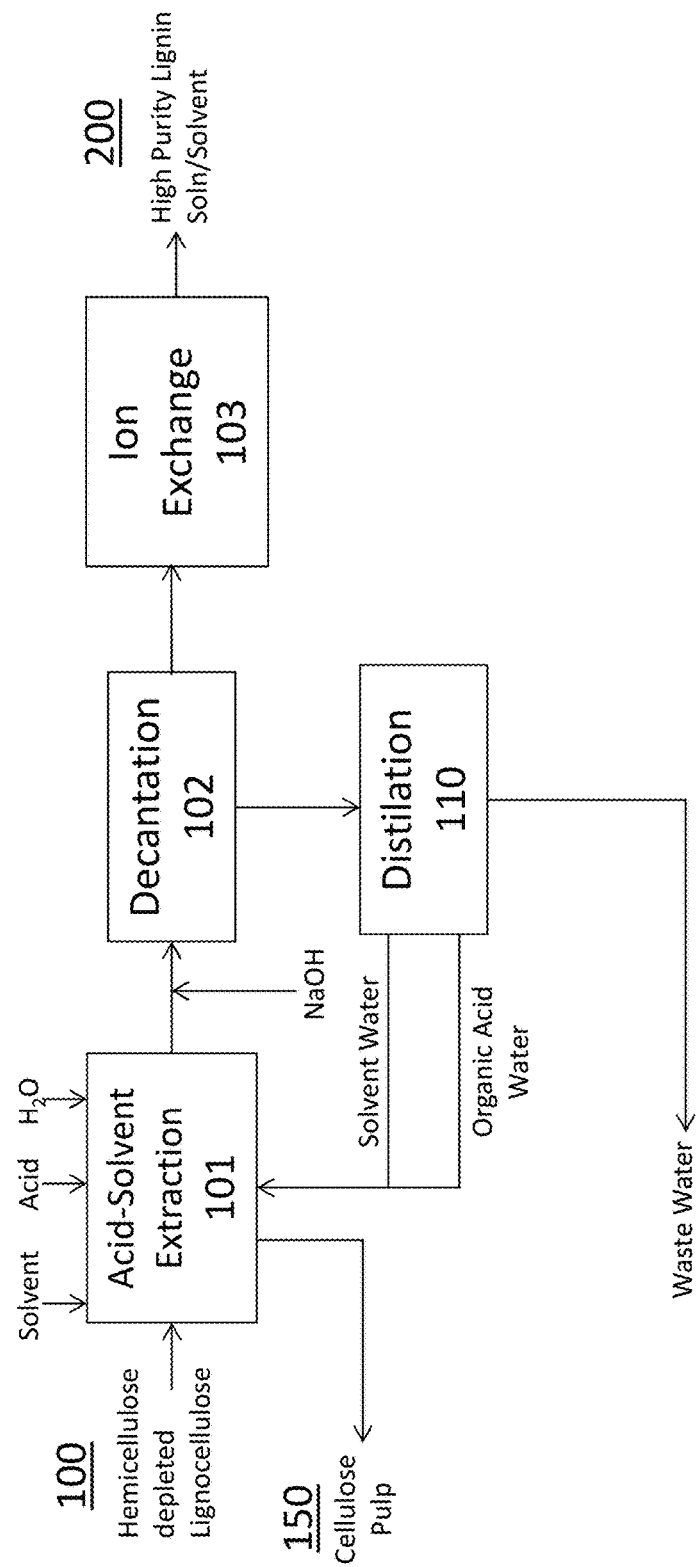
FIG. 9 is a simplified flow scheme of a method according to alternative lignin solubilization embodiments of the invention.

FIG. 9 is a schematic description of a process for acid-solvent extraction of lignin from hemicellulose depleted lignocellulose matter and for the refining of the solvent-soluble lignin according to certain embodiments of the invention. This process results in stream 200, comprising the solvent and dissolved lignin, where residual ash is less than 1000 ppm, preferably less than 500 ppm, wherein polyvalent cations are less than 500 ppm, preferably less than 200 ppm relative to lignin (on dry base) and residual carbohydrate is less than 500 ppm relative to lignin (on dry base). The solution is free of particulate matter.

The lignin composition derived from direct solvent extraction of lignocellulosic biomass can be further manipulated to furnish a lignin composition (1760-P1) with desirable traits, fewer impurities, and/or improved physical characteristics.

The process described herein may further comprise contacting the lignin extract with a strong acid cation exchanger to remove residual cations thereby obtaining a purified lignin extract. A lignin stream can be passed through a cation exchanger to further remove residual cations to produce a lignin product with a concentration of metal cations less than 1000, 900, 800, 700, 600, 500, 400, 300, 200, 100, 50, 10 ppm.

The process described herein may further comprise obtaining the lignin as a solid by removing the bulk of the limited-solubility solvent from the lignin extract. The bulk of the solvent can be removed by distillation. The distillation can be achieved by heating the lignin solution to a temperature near or above the boiling point of the solvent under standard atmospheric pressure. The distillation can be achieved by lowering the pressure for instance by applying a vacuum. The lignin can be obtained as high purity solid by flash evaporation of the solvent and acid by dripping the organic phase into a water solution heated to a temperature high enough to cause the immediate evaporation of the organic solvent, i.e. its boiling point and also partial solubility in the hot water at a low enough level that lignin precipitates. The temperature is maintained as low as possible to prevent the lignin from reacting while the solvent is evaporating. Solvent evaporation may be assisted by applying vacuum in addition to heat. Preferably, flash evaporation is conducted at a temperature of 80 to 95° C., 80-85° C., 50-60° C., or at approximately 55° C. for example.

The process described herein can further comprise a purification of the solid lignin. In some embodiments, the solid lignin can be further purified by removing trace volatile components from the solid lignin such as limited solubility solvent, water, and acid. The trace volatile components can be removed by applying a vacuum to the solid lignin, by heating the solid lignin or by heating the composition and applying a vacuum. In some embodiments, the solid lignin can be further purified by decreasing ash contents from the solid lignin. The ash contents can be decreased by washing the solid lignin with dilute HCl solution or water.

The process described herein can further comprise one or more additional solvent extraction steps. For example, the process can further comprise dissolving the solid lignin with an organic solvent (e.g., methanol or dichloromethane) to form a resulting solution and separating the resulting solution from insoluble remainder. The resulting solution can be used as pure lignin product stream. The resulting solution can then be further evaporated to yield a solid lignin composition lacking the insoluble remainder.

In some embodiments, the process to produce high purity lignin from a biomass described herein produces a lignin dissolved in the limited-solubility solvent and further comprises one or more, two or more, three or more, four or more, or five of the following steps: (i) contacting the lignin extract with a strong acid cation exchanger to remove residual cations thereby obtaining a purified lignin extract (ii) optionally distilling or flash evaporating the lignin extract thereby removing the bulk of the limited-solubility solvent from the lignin extract to obtain solid lignin; (iii) heating the solid lignin thereby removing trace limited-solubility solvent or water from the solid lignin; (iv) applying a vacuum to the solid lignin thereby removing trace limited-solubility solvent or water from the solid lignin; and (v) dissolving the solid lignin with an organic solvent to form a resulting solution and separating the resulting solution from insoluble remainder.

In some embodiments, the purified lignin extract in limited solubility solvent is used as feed for a chemical conversion, avoiding the cost associated with distillation or evaporation systems and operation. Such solution of highly purified lignin in solvent is fed into a conversion process to convert lignin to conversion products.

Downstream Processing

Exemplary Anti-Solvent Processing:

In some embodiments, an anti-solvent is used for desolventization. For example, methyl-ethyl ketone (MEK) has a solubility of 27.5 gram in 100 gram aqueous solution (the acidic lignin dissolved in a limited-solubility solvent which is MEK in this embodiment). In some embodiments, spraying lignin dissolved in MEK into water (e.g. at ambient temperature) dissolves the MEK in the water. The solubility of lignin in the MEK water mixture (at appropriate water:MEK ratio) is low so that lignin precipitates. In some embodiments, MEK is separated from the mixture by distilling its azeotrope (73.5° C., 89% MEK).

Each solvent/anti-solvent combination represents an additional embodiment of the invention. Exemplary solvent/anti-solvent combinations include MEK-water; MEK-decanol and MEK-decane.

Exemplary Processing by Distillation:

In some embodiments limited-solubility solvent (e.g. MEK; boiling point=79.6° C.) is distilled away from the lignin dissolved in it. In some embodiments, the distillation includes contacting the limited-solubility solvent with lignin dissolved in it with a hot gas (e.g. spray drying). Optionally contacting with a hot gas is conducted after a pre-evaporation which increases the lignin concentration in the limited-solubility solvent. In some embodiments, the distillation includes contacting the limited-solubility solvent with lignin dissolved in it with a hot liquid. In some embodiments, the contacting includes spraying the limited-solubility solvent with lignin dissolved in it into a hot liquid (optionally after some pre-concentration). In some embodiments, the hot liquid includes water and/or oil and/or Isopar K. In some embodiments, the hot liquid includes an anti-solvent. In some embodiments, the distillation includes contacting the limited-solubility solvent with lignin dissolved in it with a hot solid surface.

In some embodiments, a hot liquid is contacted with the limited-solubility solvent with lignin dissolved in it. Hydrophilic/hydrophobic properties of the hot liquid affect the surface properties of the separated solid lignin. In some embodiments, in those distillation embodiments which employ contacting the limited-solubility solvent with lignin dissolved in it with a hot liquid, the chemical nature of the lignin solvent affects the surface properties of the separated solid lignin. In some embodiments, the hot liquid influences the nature and availability of reactive functions on the separated solid lignin. In some embodiments, the nature and availability of reactive functions on the separated solid lignin contribute to efficiency of compounding, e.g. with other polymers. In some embodiments, a temperature of the hot liquid influences the molecular weight of the separated solid lignin.

The lignin composition of the invention can be identified by one or more of the characteristics describing the atomic composition of the material. The weight percent of the lignin composition derived from each element can be measured by elemental analysis, for instance the percent of carbon, hydrogen, nitrogen, oxygen, sulfur can be measured. For instance, some elemental analysis data are presented in example 7. The lignin of the invention can have up to 0.1, 0.2, 0.3, 0.4, 0.5, 0.6, 0.7, 0.8, 0.9, 1.0, 1.5, 2.0, 3.0, 4.0, 5.0% sulfur weight/weight. In some embodiments, the lignin has less than 0.2% sulfur weight/weight. In some embodiments, the lignin has less than 0.3, 0.2, 0.1 times the amount of sulfur found in Kraft softwood lignin. In some embodiments, the lignin has up to 0.1, 0.2, 0.3, 0.4, 0.5, 0.6, 0.7, 0.8, 0.9, 1.0, 1.5, 2.0, 3.0, 4.0, 5.0% nitrogen weight/weight. In some embodiments, the lignin has up to 0.5% nitrogen weight/weight. In some embodiments, the lignin has at least 35, 40, 45, 48, 49, 50, 55, 60, 62, 65, 67, 70% carbon weight/weight. In some embodiments, the lignin has between 48 and 75% carbon weight/weight. In some embodiments, the lignin has at least 1.1, 1.2, 1.3, 1.4 times the carbon weight/weight that Kraft softwood lignin has. In some embodiments, the lignin has up to 4.0, 4.5, 5.0, 5.5, 6.0, 6.5, 7.0, 7.5, 8.0% hydrogen weight/weight. In some embodiments, the lignin has between 5.0 and 7.5% hydrogen weight/weight. In some embodiments, the lignin has at least 1.1, 1.2, 1.3, 1.4 times the hydrogen weight/weight that Kraft softwood lignin has. In some embodiments, the lignin has up to 23, 24, 25, 26, 27, 28, 29, 30% oxygen weight/weight. In some embodiments, the lignin has less oxygen weight/weight than Kraft lignin does. The ratio of oxygen to carbon content weight/weight (O/C) can be a measure of the oxidation of the lignin. The ratio of oxygen to carbon content weight/weight for the lignin of the invention can be up to 0.5, 0.45, 0.4, 0.39, 0.38, 0.37, 0.36, 0.35, 0.34, 0.33, 0.32, 0.31, 0.3, 0.29, 0.28, 0.27, 0.26, 0.25, 0.24, 0.22, or 0.2, for instance. In some embodiments, the lignin has a ratio of oxygen to carbon content weight/weight (O/C) of less than 0.40. The lignin of the present invention can be less oxidized than Kraft softwood lignin. In some embodiments, the lignin can have an O/C weight ratio less than that of Kraft softwood lignin. In some embodiments, the lignin can have an O/C weight ratio that is less than 0.9, 0.8, 0.7 times the O/C ratio of Kraft softwood lignin. The empiric monomer formula can be calculated for a given lignin sample based on the elemental analysis. The resulting empiric formula can be of the form $C_aH_bO_c$, wherein a, b, and c are numbers corresponding to the relative stoichiometry of the carbon, hydrogen, and oxygen atoms, respectively. In some embodiments, when a is set to 9, b is less than 13, 12.5, 12, 11.5, 11, 10.5, 10. In some embodiments, when a is set to 9, b is less than 12. In some embodiments, when a is set to 9 b is between 8.0 and 11.0. In some embodiments, when a is set to 9, c is less than 3.5, 3.4, 3.3, 3.2, 3.1, 3.0, 2.9, 2.8, 2.7, 2.5. In some embodiments, when a is set to 9, c is less than 3.5. In some embodiments, when a is set to 9, c is between 2.0 and 3.5. In some embodiments, when a is set to 9, b is less than 12 and c is less than 3.5. In some embodiments, when a is set to 9 b is between 8.0 and 11.0, and c is between 2.0 and 3.5.

Some chemical functional groups and their amounts in a lignin composition can be measured by quantitative phosphorus nuclear magnetic resonance ($^{31}P$ NMR) spectroscopy. For instance, a method of treating the lignin, parameters of the NMR experiments, and some of these data for a variety of lignin compositions are disclosed herein (example 8). In some embodiments, the lignin comprises up to 2 mmol aliphatic hydroxyl group per gram lignin. In some embodiments, the lignin comprises up to 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.5, 3.0, 3.5, 4.0 mmol aliphatic hydroxyl group per gram lignin. In some embodiments, the lignin comprises fewer aliphatic hydroxyl groups per gram lignin than Kraft softwood lignin comprises. In some embodiments, the lignin comprises between 0.2 and 2.0 aliphatic hydroxyl groups (mmol/g lignin). In some embodiments, the lignin comprises at least 2.7, 2.8, 2.9, 3.0, 3.1, 3.2, 3.3, 3.4 mmol phenolic hydroxyl per gram lignin. In some embodiments, the lignin comprises at least 3.0 phenolic hydroxyl group (mmol/g lignin). In some embodiments, the lignin comprises less than 0.5, 0.45, 0.40, 0.39, 0.38, 0.37, 0.35, 0.30, 0.25, 0.20, 0.15, 0.1 carboxylic OH groups (mmol/g lignin). In some embodiments, the lignin comprises less than 0.40 mmole/g lignin carboxylic OH group. In some embodiments, the lignin comprises up to 2 mmol aliphatic hydroxyl group, at least 2.5 mmol phenolic hydroxyl groups, and less than 0.40 mmol carboxylic OH groups per gram lignin.

Some chemical functional groups and their amounts in a lignin composition can be measure by quantitative carbon nuclear magnetic resonance ($^{13}C$ NMR) spectroscopy. For instance, the parameters of the NMR experiments, and data for a variety of lignin compositions is disclosed herein (example 9). In some embodiments, the lignin has a degree of condensation less than 1.2, 1.1, 1.0, 0.9, 0.8, 0.7, 0.6, 0.5, 0.4. In some embodiments, the lignin of the invention has a degree of condensation of less than 0.9. In some embodiments, the lignin of the invention has a lower degree of condensation than that of lignin produced through Organosolv process or Kraft milling. In some embodiments, the ratio of methoxyl groups per aryl group is at least 0.7, 0.8, 0.9, 1.0, 1.1, 1.2, 1.3. In some embodiments, the methoxyl content per aryl group is at least 0.8. In some embodiments, the ratio of aliphatic linkages (β-O-4') per aryl groups is less than 0.3, 0.29, 0.28, 0.27, 0.25, 0.2. In some embodiments, the ratio of aromatic C—O bonds per aryl group is less than 2.2, 2.1, 2.0, 1.9, 1.8, 1.7, 1.6, 1.5, 1.4. In some embodiments, the ratio of aromatic C—C linkages per aryl group is over 1.9, 2.0, 2.1, 2.2, 2.3. In some embodiments, the ratio of aromatic C—H linkages per aryl group is between 1.5 and 2.2. In some embodiments, the ratio of aromatic C—H linkages per aryl group is between 1.5 and 2.0. In some embodiments, the ratio of aromatic C—H linkages per aryl group is less than 2.0.

The composition of a lignin composition can be examined by inductively couple plasma analysis (ICP) to ascertain the concentration of trace elements. Additionally, the content of ash and carbohydrate can be determined by previously disclosed methods (National Renewable Energy Laboratory (NREL) method TP-510-42622 and NREL method TP-510-42618, respectively). For instance, the experimental details and data for a variety of samples are disclosed herein (example 10). In some embodiments, the lignin of the invention comprises less than 1500, 1000, 900, 800, 700, 691, 661, 650, 600, 500, 400, 200, 100 ppm sulfur. In some embodiments, the lignin of the invention comprises less than 1000, 500, 200, 100, 90, 80, 70, 60, 50, 40, 30, 20, 15, 10, 5 ppm calcium. In some embodiments, the lignin of the invention comprises less than 1500, 1000, 900, 800, 700, 691, 661, 650, 600, 500, 400, 200, 100 ppm iron. In some embodiments, the lignin of the invention comprises less than 1000, 500, 200, 100, 90, 80, 70, 60, 50, 40, 30, 20, 15, 10, 5 ppm potassium. In some embodiments, the lignin of the invention comprises less than 1000, 500, 200, 100, 90, 80, 70, 60, 50, 40, 30, 20, 15, 10, 5 ppm magnesium. In some embodiments, the lignin of the invention comprises less than 1000, 500, 200, 100, 90, 80, 70, 60, 50, 40, 30, 20, 15, 10, 5 ppm sodium. In some embodiments, the lignin of the invention comprises less than 1000, 500, 200, 100, 90, 80, 70, 60, 50, 40, 30, 20, 15, 10, 5 ppm sulfur, calcium, iron, potassium, magnesium, and sodium. In some embodiments, the lignin of the invention comprises less than 5, 4, 3, 2, 1.0, 0.9, 0.8, 0.7, 0.6, 0.5, 0.4, 0.3, 0.2, 0.1% ash content. In some embodiments, the lignin comprises less than 0.1% ash. In some embodiments, the lignin comprises less than 1.0% ash. In some embodiments, the lignin comprises less than 5, 4, 3, 2, 1.0, 0.9, 0.8, 0.7, 0.6, 0.5, 0.4, 0.3, 0.2, 0.1% carbohydrate content. In some embodiments, the trace carbohydrate content is comprised of 100, 99, 98, 99, 95, 90, 85, 80, 70, 60, 50, 40, 30, 20, 10% glucose. In some embodiments, the carbohydrate content is less than 1% of the lignin content weight/weight, and the carbohydrates are comprised of over 90% glucose. In some embodiments, the lignin of the invention comprises less than 1000, 500, 200, 100, 90, 80, 70, 60, 50, 40, 30, 20, 15, 10, 5 ppm sulfur, calcium, iron, potassium, magnesium, and sodium, and comprises less than 1% ash and less than 1% carbohydrate.

The solubility of lignin in a variety of simple solvents at room temperature can be measured. For instance, the method and data are disclosed herein (example 11). In some embodiments, the high purity lignin of the invention is insoluble in toluene and methylethylketone. In some embodiments, the lignin of the invention is soluble at greater than 1000, 500, 300, 200, 150, 120, 100, 50, 10, 1 g lignin per liter of solvent in DMSO. In some embodiments, the lignin of the invention is soluble at greater than 1000, 500, 300, 200, 150, 120, 100, 50, 10, 1 g lignin per liter of solvent in THF. In some embodiments, the lignin of the invention is soluble at greater than 1000, 500, 300, 200, 150, 120, 100, 50, 10, 1 g lignin per liter of solvent in a 0.1 N aqueous NaOH solution. In some embodiments, the lignin has a solubility greater than 120 g/L DMSO, >40 g/L THF, and >10 g/L 0.1 N NaOH. In some embodiments, the lignin has a solubility greater than 100 g/L DMSO, >35 g/L THF, and >8 g/L 0.1 N NaOH.

Lignin compositions can be characterized by the changes in physical and chemical properties as function of increasing temperature as measured by Thermal Gravimetric Analysis (TGA). For instance, the TGA profiles of lignin samples are disclosed herein (example 12). In some embodiments, the lignin of the invention can have a moisture content of less than 15, 14, 13, 12, 11, 10, 9, 8, 7, 6, 5, 4, 3, 2, 1, 0.9, 0.7, 0.5, 0.3, 0.2, 0.1% weight/weight. In some embodiments, solid lignin can have less than 1% moisture content. In some embodiments, the lignin of the invention reach 5% degradation at 200, 210, 220, 230, 240, 250, 260, 270, 280, 290, 300° C. In some embodiments, the lignin of the invention reach 10% degradation at 200, 210, 220, 230, 240, 250, 260, 270, 280, 290, 300, 310, 320, 330, 340, 350, 360, 370, 380° C. In some embodiments, the lignin reaches 1, 2, 3, 4, 5, 6, 7, 8, 9, 10, 15, 20% degradation at 250° C. The char can be between 30 and 40% for example.

Lignin compositions can be characterized by differential scanning calorimetry (DSC). For example, DSC was used to find the glass-liquid transition, or glass transition, (Tg) of lignin of the invention and disclosed herein (example 12, table 7b). DSC can be performed according to DIN 53765: wherein the sample is first dried by a pre-heat cycle; 2 consecutive heat cycles are measured. Typically in the first cycle annealing processes can take place that affect the polymer structure, while in the second cycle the major transition Tg is ascribed to the glass transition of the polymer. The Tg value of the second cycle can be elevated by 4 to 30° C. In some embodiments, the lignin of the invention is characterized by a glass transition elevation between first and second heat cycle according to DIN 53765 of more than 8, 9, 10, 11, 12, 13, 14, 15, 16, 17, 18, 19, 20° C. In some embodiments, the lignin of the invention is characterized by a glass transition elevation between first and second heat cycle according to DIN 53765 of less than 8, 9, 10, 11, 12, 13, 14, 15, 16, 17, 18, 19, 20, 22, 24, 26, 28, 30, 32, 34° C. The term DIN and FINAT respectively refer to standardized test methods for the determination of specific properties and which are well-recognized and well-documented. In particular, DIN 53765 refers to DIN test method number 53765 for the testing of plastics and elastomers, especially thermal analysis by the DSC method (see U.S. Pat. No. 5,595,810).

In some embodiments, the lignin of the invention is characterized by a glass transition elevation between first and second heat cycle according to DIN 53765 in the range of 10 to 30° C. In some embodiments, the lignin of the invention is characterized by a glass transition elevation between first and second heat cycle according to DIN 53765 in the range of 13 to 20° C.

In some embodiments, the lignin composition of the invention is characterized by at least one, two, three, four, five, six, seven, eight, nine, ten, eleven, twelve, or thirteen characteristic(s) selected from the group consisting of: (i) lignin aliphatic hydroxyl group in an amount up to 2 mmole/g; (ii) at least 2.5 mmole/g lignin phenolic hydroxyl group; (iii) less than 0.40 mmole/g lignin carboxylic hydroxyl group; (iv) sulfur in an amount up to 1% weight/weight; (v) nitrogen in an amount up to 0.5% weight/weight; (vi) 5% degradation temperature higher than 220° C.; (vii) 10% degradation temperature higher than 260° C.; (viii) less than 1% ash weight/weight; (ix) a formula of CaHbOc; wherein a is 9, b is less than 12 and c is less than 3.5; (x) a degree of condensation of less than 0.9; (xi) a methoxyl content of at least 0.8; (xii) an O/C weight ratio of less than 0.4; and (xiii) a glass transition elevation between first and second heat cycle according to DIN 53765 in the range of 10 to 30° C. In some embodiments, the lignin composition is further characterized by one, two, three, four, five or six, seven, eight, nine, or ten of additional characteristic(s) selected from the group consisting of: (i) less than 1% carbohydrate weight/weight; (ii) solubility in DMSO is >100 g/L; (iii) solubility in THF is >35 g/L; (iv) solubility in 0.1 N NaOH aqueous solution is >8 g/L; (v) less than 1% water by weight; (vi) less than 1% volatile components by weight; (vii) a sulfur concentration of less than 0.1% weight/weight; (viii) soluble sugar content of less than 1% by weight/weight; (ix) a phosphorus concentration of less than 100 PPM; and (x) less than 0.1 times the amount of volatile sulfur compounds found in Kraft lignin.

The lignin compositions can be prepared from a substrate comprising wood. In some embodiments, the lignin is derived from soft wood. In some embodiments, the lignin is derived from soft wood. In some embodiments, the lignin is derived from bagasse. The lignin can be a solid. In some embodiments, the lignin can be dissolved at least partially in an organic solvent, such as an alcohol, a ketone, an aldehyde, an alkane, an organic acid and a furan of 6 carbons or less, for example. In some embodiments, lignin solution in methyl ethyl ketone is obtained by not removing the solvent after the purification process. The lignin composition can further comprise up to 20, 15, 10, 5, 4, 3, 2, 1, 0.5 0.4, 0.3, 0.2, or 0.1% cellulose weight/weight. Alternatively or additionally, the composition can comprise less than 3, 2, 1.5, 1.0, 0.9, 0.8, 0.7, 0.6, 0.5, 0.4, 0.3, 0.2, 0.1, 0.08, 0.05, 0.03, 0.01, or 0.005% ash weight/weight.

The lignin composition 1760-P1 can further comprise marker molecules. The marker molecules can be a small percentage of the total weight of the lignin composition. Marker molecules can be detected by gas chromatography mass spec (GCMS) as disclosed herein (examples 17-19), for example. In some embodiments, the lignin of the invention or products made from the lignin can be characterized by comprising one or more molecules selected from the group consisting of furfural and hydroxy-methyl furfural, 2,3,5 trimethyl furan, products of their condensation, color compounds, acetic acid, p-hydroxyphenoxyacetic acid, 4-hydroxy-3,5-dimethoxyphenyl) acetic acid, methylethyl ketone, Methylpropenyl ketone, 3-(2-furyl)-3-penten-2-one, 3-methyl-2-penten-4-one, 3,4-dimethyl-4-hexene-one, 5-ethyl-5-hexene-3-one, 5-methyl-4-heptene-3-one, o-hydroxyanisole, 3-ethyl-4-methyl-3-penten-2-one, 3,4,4-trimethyl-2-cyclohexene-1-one, 2'-hydroxy-4',5'-dimethylacetophenone, 1-(4-hydroxy-3-methoxyphenyl)propane methanol, galacturonic acid, dihydroabietic acid, glycerol, fatty acids and resin acids. In some embodiments, the lignin or products derived from the lignin comprise marker molecules derived from acetic acid or methylethyl ketone. In some embodiments, the lignin of the invention or products made from the lignin comprise one or more molecules selected from the group consisting of methylethyl ketone, 3,4-dimethyl-3-hexen-2-one, 5-methyl-4-hepten-3-one, 5-ethyl-5hexen-3-one, 5-methyl-4-hepten-3-one, 3-hydroxymethyl-2-butanone, 3,4-dimethyl-4-hexen-2one, 5-ethyl-5-hexen-3one, and 5-methyl-5-hepten-3-one.

In some embodiments, the lignin composition described herein is produced by the process or methods described herein. The lignin composition described herein can be the product of the process of producing high purity lignin from a biomass, comprising: (i) removing hemicellulose sugars from the biomass thereby obtaining a lignin-containing remainder; wherein the lignin-containing remainder comprises lignin and cellulose; (ii) contacting the lignin-containing remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; and (iii) separating the lignin extract from the cellulosic remainder; wherein the lignin extract comprises lignin dissolved in the limited-solubility solvent. In some embodiments, the lignin of the invention is produced by the process further comprising one, two, three, four, or five additional step(s): (iv) contacting the lignin extract with a strong acid cation exchanger to remove residual cations thereby obtaining a purified lignin extract (v) optionally distilling or flash evaporating the lignin extract thereby removing the bulk of the limited-solubility solvent from the lignin extract to obtain solid lignin; (vi) heating the solid lignin thereby removing trace limited-solubility solvent or water from the solid lignin; (vii) applying a vacuum to the solid lignin thereby removing trace limited-solubility solvent or water from the solid lignin; and (viii) optionally dissolving the solid lignin with an organic solvent to form a resulting solution and separating the resulting solution from insoluble remainder, as described herein. In some of the embodiments, the lignin composition of the invention is produced by the method or process described herein and the composition is characterized by at least one of the following characteristics: (i) lignin aliphatic hydroxyl group in an amount up to 2 mmole/g; (ii) at least 2.5 mmole/g lignin phenolic hydroxyl group; (iii) less than 0.40 mmole/g lignin carboxylic OH group; (iv) sulfur in an amount up to 1% weight/weight; (v) nitrogen in an amount up to 0.5% weight/weight; (vi) 5% degradation temperature higher than 220° C.; (vii) 10% degradation temperature higher than 260° C.; (viii) less than 1% ash weight/weight; (ix) a formula of $C_aH_bO_c$; wherein a is 9, b is less than 12 and c is less than 3.5; (x) a degree of condensation of less than 0.9; (xi) a methoxyl content of at least 0.8; (xii) an O/C weight ratio of less than 0.4; (xiii) a glass transition elevation between first and second heat cycle according to DIN 53765 in the range of 10 to 30° C.; (xiv) less than 1% carbohydrate weight/weight; (xv) solubility in DMSO is >100 g/L; (xvi) solubility in THF is >35 g/L; (xvii) solubility in 0.1 N NaOH aqueous solution is >8 g/L; (xviii) less than 1% water by weight; and (xix) less than 1% volatile components by weight. In some embodiments, the lignin composition of the invention is produced by the process described herein and the composition is characterized by at least 5 of the above characteristics. In some embodiments, the composition is further characterized by 10 of the above characteristics.

V. Carbon Fibers and Lignin Conversion Products

Exemplary Spinning Processes:

In some embodiments, purified lignin dissolved in limited solubility solvent is concentrated by evaporating part of the solvent, to obtain a high viscosity composition; this high viscosity composition is span in a spinnerate to form a fiber, the fiber is contacted with an anti solvent to remove the solvent and stabilize the fiber. These processes can be adapted to produce lignin fibers by wet spinning by adjusting various parameters such as, for example, absolute and/or relative temperatures of the two liquids and/or the concentration of lignin dissolved in the limited-solubility solvent. In some embodiments, the concentration of lignin dissolved in the limited-solubility solvent contributes to viscosity of the lignin/solvent solution. In some exemplary embodiments of the invention, there is provided a spinning method including, (a) providing a composition as described herein; (b) contacting the composition with an anti-solvent so that the lignin begins to solidify; (c) spinning the lignin to produce fibers. In some embodiments, the method includes removing the antisolvent from the fibers.

In some embodiment, soluble lignin may be mixed with a synthetic polymer prior to wet spinning, to produce a composite fiber. Such synthetic polymers may include but not limited to poly acrilonitrile, poly olefin.

In some exemplary embodiments of the invention, there is provided a spinning method including: (a) providing a solid lignin composition as described above; (b) melting lignin in the composition; and (c) spinning and cooling the lignin to produce fibers. In some embodiments, the melting is conducted in the presence of plasticizers. In some exemplary embodiments of the invention, there is provided a spinning method including: (a) providing a composition as described above; and (b) spinning the lignin to produce fibers. In some embodiments, one or more of the spinning methods described above includes stabilizing and carbonizing the fibers to produce carbon fibers. In some exemplary embodiments of the invention, a lignin fiber and/or carbon fiber produced by a method as described above is used to produce a product.

Alternatively or additionally, some embodiments of the invention relate to products (or components of products) including and/or produced from a fiber as described above (e.g. fabrics, sports equipment, automobiles, airplanes, boats, musical instruments and loudspeakers). Alternatively or additionally, some embodiments of the invention relate to an insulation material including a fiber as described above. Alternatively or additionally, some embodiments of the invention relate to a composite material including a polymer including one or more materials selected from the group consisting of epoxy, polyester, vinyl ester and nylon reinforced with fibers as described above. In some exemplary embodiments of the invention, there is provided lignin 1760-P1, and characterized as described herein.

Exemplary Modifying Reagents:

In some embodiments, lignin dissolved in limited-solubility solvent is contacted with a modifying reagent. Optionally, a second liquid is the modifying reagent. In some embodiments, upon contact with the hot liquid, lignin reacts with and/or is coated by the modifying reagent.

Exemplary Coating Processes:

Some exemplary embodiments in which distillation is accomplished by contacting the lignin dissolved in limited-solubility solvent with a hot solid surface result in coating of the solid surface with a lignin layer. According to some embodiments such coating serves to encapsulate the solid surface. Encapsulation of this type is useful, for example, in slow-release fertilizer formulation and/or in provision of a moisture barrier. In some embodiments, the solid to be coated is provided as fibers. The resultant coated fibers are useful, for example, in the manufacture of composite materials. In some embodiments, the lignin is dissolved in a volatile solvent (e.g. MEK). Use of a volatile limited-solubility solvent contributes to a capacity for coating of thermally sensitive solids. In some embodiments, a plasticizer is added to the lignin dissolved in limited-solubility solvent. Optionally, the plasticizer contributes to an improvement in the resultant coating.

Polymer Organization:

In some embodiments, the lignin dissolved in limited-solubility solvent is co-sprayed with a second polymer that has a linear arrangement to cause formation of rod like assemblies of lignin molecules. Resultant co-polymer arrangements with a high aspect ratio are useful in structural applications (e.g. carbon fibers). In some exemplary embodiments of the invention, the lignin composition is mixed with a synthetic polymeric material. According to various exemplary embodiments of the invention the synthetic polymeric material includes polyacrylonitrile (PAN) and/or polypropylene and/or ABS and/or mylon. In some exemplary embodiments of the invention, a ratio of lignin:synthetic polymer (e.g. PAN) is ≥1:10; ≥1.5:10; ≥2:10; ≥2.5:10; ≥3:10 or; ≥3.5:10. Alternatively or additionally, in some embodiments a ratio of lignin:synthetic polymer (e.g. PAN) is ≤10:1; ≤9:1; ≤9:1; ≤5:1; ≤6:1; ≤50:1.

In some exemplary embodiments of the invention, methods end with production of lignin fibers as described above.

In other exemplary embodiments of the invention, methods transform the lignin fibers to carbon fibers by carbonizing the lignin fibers. In some exemplary embodiments of the invention, carbonizing the lignin fibers is conducted concurrently on lignin and synthetic polymeric material (e.g. polyacrylonitrile). These embodiments produce carbon fibers which include a mixture of carbonized lignin and carbonized synthetic polymeric material.

According to various exemplary embodiments of the invention, the aspect ratio of a transverse cross-sectional dimension to length of the observed tubules is less than 0.1, less than 0.05, less than 0.025, less than 0.02, or less than 0.01. In some exemplary embodiments of the invention, lignin particles with a greatest dimension less than 100 μm have a length: width aspect ratio of ≥1.5; ≥2.5; ≥3.5 or ≥5.0. In some exemplary embodiments of the invention, there is provided a lignin particle characterized by lengthwise tubules with a transverse cross-sectional dimension of at least 5 microns. In some embodiments, the transverse cross-sectional dimension is less than 20 microns. Alternatively or additionally, in some embodiments the tubules are characterized by an aspect ratio of transverse cross-sectional dimension to length less than 0.1. Alternatively or additionally, in some embodiments the aspect ratio is less than 0.025. Alternatively or additionally, in some embodiments at least 0.1% of particles in the population are particles as described herein.

Further Lignin Products

In some exemplary embodiments of the invention, there is provided a processed product produced by a method as described above. In some exemplary embodiments of the invention, there is provided a method including: providing a processed product as described above; and subjecting the processed product to an industrial process to produce a downstream product.

Optionally, the downstream product is selected from the group consisting of a hygienic pad, a diaper and a wound dressing, sports equipment, a structural component, a paint and a dye. In some exemplary embodiments of the invention, there is provided a downstream product produced by a method as described above.

In some exemplary embodiments of the invention, there is provided a method including providing a processed product as described above; and using the processed product as an ingredient or component in a downstream product. Optionally, the downstream product is selected from the group consisting of a liquid fuel, a paint, a dye, a glue and a plastic. In some exemplary embodiments of the invention, there is provided a downstream product produced by a method as described above.

In some exemplary embodiments of the invention, a lignin composition as described herein is provided as part of a product comprising other ingredients. Alternatively or additionally, in some embodiments, a lignin composition as described herein is used in preparation of another material or product. Examples of such materials/products include, but are not limited to, carbon fibers, protective coatings, lignosulfonates, bio-oils, carboxylic and fatty acids, dicarboxylic acids, hydroxyl-carboxylic, hydroxyl di-carboxylic acids and hydroxyl-fatty acids, methylglyoxal, mono-, di- or poly-alcohols, alkanes, alkenes, aromatics, aldehydes, ketones, esters, biopolymers, proteins, peptides, amino acids, vitamins, antibiotics, paraxylene, pharmaceuticals, dispersants, emulsifiers, complexants, flocculants, agglomerants, pelletizing additives, resins, antioxidants, liquid fuels, aromatic chemicals, vanillin, adhesives, binders, absorbents, toxin binders, foams, films, rubbers, elastomers, sequestrants, solid fuels, expanders a liquid fuels, paints, dyes, glues, plastics, wet spun fibers, melt spun fibers, flame retardants, activated carbon, activated carbon fibers, absorbent materials (e.g. in hygienic pads, diapers or wound dressings), phenol resins, phenols, terephthalates, epoxies, BTX (Benzene/Toluene/Xylene), polyols and polyolefins, each of which represents an additional exemplary embodiment of the invention. In some embodiments, the product is selected from the group consisting of: carbon fibers, protective coatings, lignosulfonates, pharmaceuticals, dispersants, emulsifiers, complexants, flocculants, agglomerants, pelletizing additives, resins, adhesives, binders, absorbents, toxin binders, films, rubbers, elastomers, sequestrants, solid fuels, paints, dyes, plastics, wet spun fibers, melt spun fibers and flame retardants. In some embodiments, the product is selected from the group consisting of: a non woven fabric, a woven fabric, insulation material, sports equipment, automotive parts, airplane or helicopter parts, boat hulls or portions thereof and loudspeakers. In some embodiments, the product is a composite material comprising a polymer and one or more materials selected from the group consisting of epoxy resin, polyester, polyvinyl ester and nylon, wherein the polymer is reinforced with fibers characterized herein.

Lignin Applications

The high purity lignin composition according to embodiments disclosed herein has a low ash content, a low sulfur and/or phosphorous concentration. Such a high purity lignin composition is particularly suitable for use in catalytic reactions by contributing to a reduction in catalyst fouling and/or poisoning. A lignin composition having a low sulfur content is especially desired for use as fuel additives, for example in gasoline or diesel fuel.

Some other potential applications for high purity lignin include carbon-fiber production, asphalt production, and as a component in biopolymers. These uses include, for example, oil well drilling additives, concrete additives, dyestuffs dispersants, agriculture chemicals, animal feeds, industrial binders, specialty polymers for paper industry, precious metal recovery aids, wood preservation, sulfur-free lignin products, automotive brakes, wood panel products, bio-dispersants, polyurethane foams, epoxy resins, printed circuit boards, emulsifiers, sequestrants, water treatment formulations, strength additive for wallboard, adhesives, raw materials for vanillin, xylitol, and as a source for paracoumaryl, coniferyl, sinapyl alcohol. In some embodiments, the properties of an asphalt composition can be improved by using the lignin of the invention. The asphalt can be improved, for instance, by compounding the asphalt mixture with a least 2% wt/wt solid lignin made using the lignin of the invention. The improved properties of the asphalt can be selected from one or two or three of the following characteristics: (i) stability against oxidation; (ii) stability against UV radiation; (iii) having a renewable carbon component.

Exemplary Lignin Conversion Method

Figure 7:
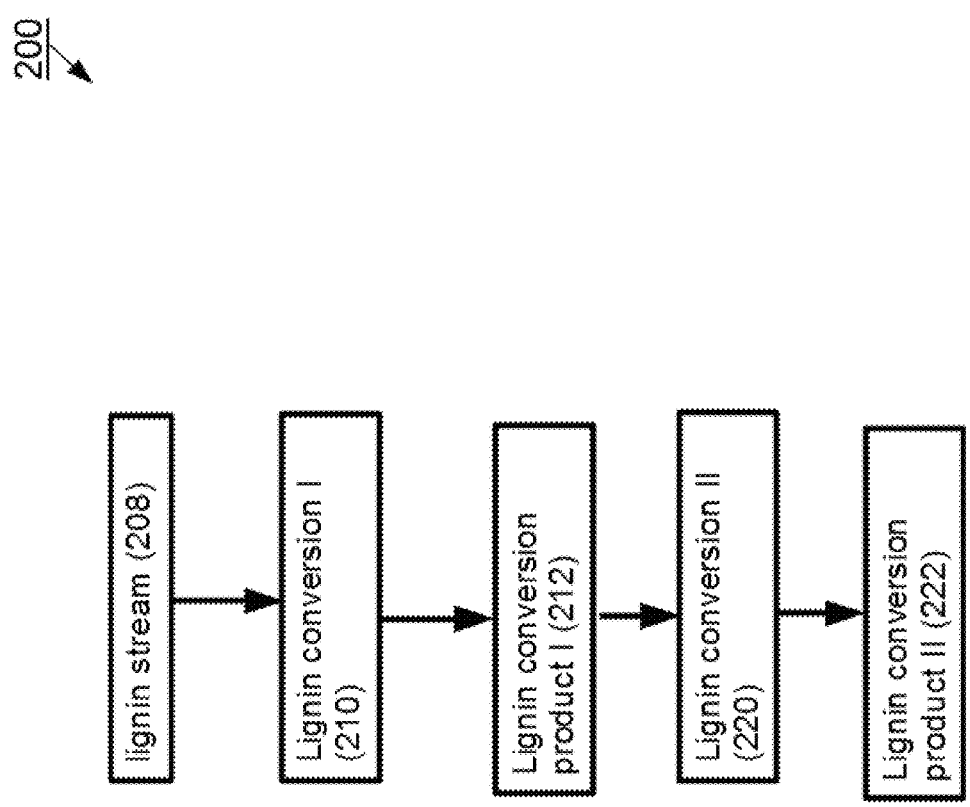
FIG. 7 is a simplified flow scheme of a method according to some exemplary lignin conversion processes.

Referring again to FIG. 7, in some embodiments, method 200 includes converting 210 at least a portion of lignin in lignin stream 208 to a conversion product 212. In some embodiments, converting 210 employs depolymerization, oxidation, reduction, precipitation (by neutralization of the solution and/or by solvent removal), pyrolysis, hydrogenolysis, gasification, or sulfonation. In some embodiments, conversion 210 is optionally conducted on lignin while in solution, or after precipitation. In some embodiments, converting 210 includes treating lignin with hydrogen. In some embodiments, converting 210 includes producing hydrogen from lignin.

In some embodiments, conversion product 212 includes at least one item selected from the group consisting of bio-oil, carboxylic and fatty acids, dicarboxylic acids, hydroxylcarboxylic, hydroxyldicarboxylic acids and hydroxyl-fatty acids, methylglyoxal, mono-, di- or poly-alcohols, alkanes, alkenes, aromatics, aldehydes, ketones, esters, phenols, toluenes, and xylenes. In some embodiments, the conversion product includes a fuel or a fuel ingredient. Optionally, the conversion product includes para-xylene.

In some embodiments, converting 210 includes aqueous phase reforming. In some embodiments, converting 210 includes at least one bioforming reaction. Exemplary bioforming reaction types include catalytic hydrotreating and catalytic condensation, zeolite (e.g. ZSM-5) acid condensation, base catalyzed condensation, hydrogenation, dehydration, alkene oligomerization and alkylation (alkene saturation). In some embodiments, the converting occurs in at least two stages (e.g. 210 and 220) which produce conversion products 212 and 222 respectively. Optionally, a first stage (210) includes aqueous phase reforming. In some embodiments, second stage 220 includes at least one of catalytic hydrotreating and catalytic condensation.

Optionally, method 200 is characterized by a hydrogen consumption of less than 0.07 ton per ton of product 212 and/or 222.

Exemplary Lignin Products

The present invention also provides a consumer product, a precursor of a consumer product or an ingredient of a consumer product produced from a lignin stream 208. In some embodiments, the consumer product is characterized by an ash content of less than 0.5% wt and/or by a carbohydrates content of less than 0.5% wt and/or by a sulfur content of less than 0.1% wt and/or by an extractives content of less than 0.5% wt. In some embodiments, the consumer product produced from lignin stream 208 includes one or more of bio-oil, carboxylic and fatty acids, dicarboxylic acids, hydroxylcarboxylic, hydroxyldicarboxylic acids and hydroxyl-fatty acids, methylglyoxal, mono-, di- or poly-alcohols, alkanes, alkenes, aromatics, aldehydes, ketones, esters, biopolymers, proteins, peptides, amino acids, vitamins, antibiotics, and pharmaceuticals. In some embodiments, the consumer product includes one or more of dispersants, emulsifiers, complexants, flocculants, agglomerants, pelletizing additives, resins, carbon fibers, active carbon, antioxidants, liquid fuel, aromatic chemicals, vanillin, adhesives, binders, absorbents, toxin binders, foams, coatings, films, rubbers and elastomers, sequestrants, fuels, and expanders. In some embodiments, the product is used in an area selected from the group consisting of food, feed, materials, agriculture, transportation and construction. Optionally, the consumer product has a ratio of carbon-14 to carbon-12 of about $2.0 \times 10^{-13}$ or greater.

Some embodiments relate to a consumer product containing an ingredient as described above and an ingredient produced from a raw material other than lignocellulosic material. In some embodiments, the ingredient and the ingredient produced from a raw material other than lignocellulosic material are essentially of the same chemical composition.

In some embodiments, the consumer product includes a marker molecule at a concentration of at least 100 ppb. In some embodiments, the marker molecule is selected from the group consisting of furfural and hydroxymethylfurfural, products of their condensation, color compounds, acetic acid, methanol, galacturonic acid, glycerol, fatty acids and resin acids.

In some embodiments, the product is selected from the group consisting of dispersants, emulsifiers, complexants, flocculants, agglomerants, pelletizing additives, resins, carbon fibers, active carbon, antioxidants, liquid fuel, aromatic chemicals, vanillin, adhesives, binders, absorbents, toxin binders, foams, coatings, films, rubbers and elastomers, sequestrants, fuels, and expanders.

VI. Method of Producing Cellulose Pulp Remainder from Direct Lignin Extraction Method.

The direct lignin extraction method described in section IV solubilizes lignin from lignocellulosic biomass leaving behind an insoluble material (FIGS. 5, 1760→1760-P1). The material that is insoluble in the extraction solvent can be deemed the cellulosic remainder pulp. In some embodiments, the present invention is a method of producing cellulose from a biomass, comprising: (i) removing hemicellulose sugars from the biomass thereby obtaining a lignocellulosic remainder; wherein the lignocellulosic remainder comprises lignin and cellulose; (ii) contacting the lignocellulosic remainder with a lignin extraction solution to produce a lignin extract and a cellulosic remainder; wherein the lignin extraction solution comprises a limited-solubility solvent, an organic acid, and water, wherein the limited-solubility solvent and water form an organic phase and an aqueous phase; (iii) separating the lignin extract from the cellulosic remainder; wherein the lignin extract comprises lignin dissolved in the limited-solubility solvent; and (iv) obtaining cellulosic remainder pulp.

Composition of Cellulosic Pulp Remainder

The cellulosic remainder pulp from the direct extraction of lignocellulosic can be characterized by the contents and properties of the composition. For instance, the remainder pulp is characterized according to NREL method TP-510-42618 and the data are disclosed herein (pulp from bagasse: Example 14, pulp from eucalyptus and pine: Example 15). Briefly, this test comprises hydrolysis of the cellulose and hemicellulose polymers in sulfuric acid; the dissolved sugars are determined, the amount of carbohydrates in the biomass are calculated, and lignin is determined as the remaining solids. In some embodiments, the cellulosic remainder pulp has a C6 sugars to solid ratio of more than 45, 50, 55, 60, 65, 70, 75, 80, 83, 85, 90, 95, 99% weight/weight. In some embodiments, the cellulosic remainder pulp has a glucose to solid ratio of 45, 50, 55, 60, 65, 70, 75, 80, 83, 85, 90, 95, 99% weight/weight. In some embodiments, the remainder pulp has a C5 sugars to solid ratio of less than 10, 5, 4, 3, 2, 1% weight/weight. In some embodiments, the cellulosic remainder pulp has a total sugars to solid ratio of more than 45, 50, 55, 60, 65, 70, 75, 80, 83, 85, 90, 95, 99% weight/weight. In some embodiments, the cellulosic remainder pulp comprises less than 15, 13, 12, 11, 10, 9, 8, 7, 6, 5, 4, 3% lignin weight/weight. In some embodiments, the cellulosic remainder pulp comprises less than 20, 15, 13, 10, 8, 7, 5, 4, 3, 2, 1% ash weight/weight. In some embodiments, the cellulosic remainder pulp is characterized by (i) C6 sugars to solid ratio of >70% weight/weight; (ii) glucose to solid ratio of >70% weight/weight; (iii) C5 sugars to solid ratio of <5% weight/weight; or (iv) total sugars to solid ratio of >75% weight/weight. In some embodiments, the cellulosic remainder pulp is characterized by (i) C6 sugars to solid ratio of >70% weight/weight; (ii) glucose to solid ratio of >70% weight/weight; (iii) C5 sugars to solid ratio of <5% weight/weight; and (iv) total sugars to solid ratio of >75% weight/weight.

The amount of inorganic impurities in a cellulosic remainder pulp sample can be measured by inductively coupled plasma atomic emission spectrometry (ICP-AES). For instance, the remainder pulp is characterized and the data are disclosed herein (from bagasse: Example 14, from eucalyptus and pine: Example 15). In some embodiments, the cellulosic remainder comprises an amount of trace sulfur less than 1000, 900, 800, 700, 600, 500, 400, 300, 200, 100 ppm. In some embodiments, the cellulosic remainder comprises an amount of trace calcium less than 1000, 900, 800, 700, 600, 500, 400, 300, 200, 100 ppm. In some embodiments, the cellulosic remainder comprises an amount of trace iron less than 1000, 900, 800, 700, 600, 500, 400, 300, 200, 100 ppm. In some embodiments, the cellulosic remainder comprises an amount of trace potassium less than 1000, 900, 800, 700, 600, 500, 400, 300, 200, 100, 50 ppm. In some embodiments, the cellulosic remainder comprises an amount of trace magnesium less than 500, 400, 300, 200, 100, 90, 80, 70, 60, 50, 40, 30, 20, 10 ppm. In some embodiments, the cellulosic remainder comprises an amount of trace sodium less than 500, 400, 300, 200, 100, 90, 80, 70, 60, 50, 40, 30, 20, 10 ppm. In some embodiments, the cellulosic remainder comprises an amount of trace chromium less than 500, 400, 300, 200, 100, 90, 80, 70, 60, 50, 40, 30, 20, 10 ppm. In some embodiments the cellulosic remainder comprises less than 10 ppm of Mg, Mn, Na, Zn; and the amount of trace Cu, Fe, K, Al, Cr, is less than 200 ppm.

The cellulosic remainder pulp from the direct extraction of lignocellulosic can be characterized according to the monograph of microcrystalline cellulose in the Food Chemical Codex (FCC), $5^{th}$ Ed. (2004) published by The Food and Nutrition Board of The National Academy, Institute of Medicine, Washington, by the solubility in a variety of solvents. Additionally, the cellulose composition can pass the microcrystalline cellulose identification tests A and B. Passing the identification tests A and B can mean: A) a white opaque, bubble-free dispersion which does not form a supernatant liquid at the surface is obtained after 100 mL of a dispersion 45 g of cellulose in 255 mL water is mixed for 5 minutes in a high-speed power blender (18,000 rpm) is left standing in a 100-mL graduate for 3 hours, and B) 20 mL of the dispersion is mixed with a few drops of iodine TS and no purplish to blue or blue color is produced. For instance, the solubility of a variety of cellulosic remainder pulps are measured and disclosed herein (Example 16). In some embodiments, the cellulosic remainder has a conductivity of less than 100, 95, 90, 85, 80, 75, 70, 65, 60, 55, 50, 45, 40, 35, 30 µS/cm. In some embodiments, the cellulosic remainder has a conductivity of more than 75, 70, 65, 60, 55, 50, 45, 40, 35, 30, 25, 20, 15, 10, 5 µS/cm. In some embodiments, the cellulosic remainder has a conductivity of between 10 and 70 µS/cm. In some embodiments, the cellulosic remainder contains less than 2, 1.5, 1.0, 0.8, 0.6, 0.4, 0.3, 0.25, 0.24, 0.23, 0.22, 0.20, 0.19, 0.15, 0.1% water soluble substances weight/weight. In some embodiments, the cellulosic remainder contains less than 0.25% water soluble substances weight/weight. In some embodiments, the cellulosic remainder comprises less than 50, 40, 30, 20, 15, 14, 13, 12, 11, 10, 9, 8, 7, 6, 5 mg water soluble substances per 5 gram cellulosic remainder. In some embodiments, the cellulosic remainder comprises less than 15 mg water soluble substances per 5 gram cellulosic remainder. In some embodiments, the cellulosic remainder comprises less than 50, 40, 30, 20, 15, 14, 13, 12, 11, 10, 9, 8, 7, 6, 5, 4, 3, 2, 1 mg ether soluble substances per 10 gram cellulosic remainder. In some embodiments, the cellulosic remainder comprises less than 30 mg ether soluble substances per 10 gram cellulosic remainder. In some embodiments, the cellulosic remainder has a pH less than 7, 6.8, 6.5, 6.3, 6, 5, or 4 in water. In some embodiments, the cellulosic remainder has a pH between about 4 and about 7 in water. In some embodiments, the cellulosic remainder has a conductivity of between 10 and 70 µS/cm; contains less than 0.25% water soluble substances weight/weight; comprises less than 15 mg water soluble substances per 5 gram cellulosic remainder; comprises less than 30 mg ether soluble substances per 10 gram cellulosic remainder; and has a pH between about 4 and about 7 in water. In some embodiments, the cellulosic remainder has similar properties to Avicell PH-200 cellulose and other Avicell grades.

The insoluble remainder pulp can be characterized by one or more two or more, three or more, or four or more of the following characteristics: (i) cellulose to solid ratio of >85% weight/weight; (ii) crystalline cellulose to solid ratio of >50% weight/weight; (iii) lignin to solid ratio of <10% weight/weight; and (iv) hemicellulose carbohydrate to solid ratio of <4% weight/weight. In some embodiments, the pulp is further characterized by being comprised of cellulose at more than 90% weight/weight. In some embodiments, the pulp is further characterized by comprising one or more, two or more, three or more, four or more, five or more, or six or more of the following characteristics: (i) C6 sugars to solid ratio of >70% weight/weight; (ii) glucose to solid ratio of >70% weight/weight; (iii) C5 sugars to solid ratio of <5% weight/weight; (iv) total sugars to solid ratio of >75% weight/weight; (v) trace Mg, Mn, Na, Zn <10 ppm; and (vi) trace Cu, Fe, K, Al, Cr, <200 ppm. In some embodiments, the pulp is further characterized by one or more, two or more, three or more, four or more, five or more, or six or more, seven or more, eight or more, nine or more, ten or more, eleven or more, or twelve or more of the following characteristics: (i) a loss of drying from 2.0-5.0%; (ii) bulk density of 0.29-0.36 g/cc; (iii) passes identification tests A and B; (iv) degree of polymerization is no more than 350 units; (v) pH is 5.5-7.0; (vi) conductivity is not more than 75 µS/cm; (vii) residue on ignition is not more than 0.05% weight/weight; (viii) water soluble substances are not more than 12.5 mg/5 g; (viii) ether soluble substances are not more than 5.0 mg/10 g; (ix) heavy metals are not more than 0.001% weight/weight; (x) soluble in copper tetramine hydroxide; (xi) particle size under 250 microns is not less than 10% weight/weight; and (xii) particle size under 150 microns is not less than 50% weight/weight. The cellulosic remainder can be further characterized by comprising cellulose at more than 80, 85, 90, 92, 94, 96, 98, 99%. The loss of drying can be % of material lost weight/weight when the sample is dried from a solid to dry solid. The sample can be heated for a period of time to dry. The sample can be heated to 200, 190, 180, 170, 160, 150, 140, 130, 120, 110, 100, 90, 80, 70, 60, 50, 40, 30° C. for the period of time to dry. The period of time the sample is heated to dry the sample can be 100, 90, 80, 70, 60, 50, 48, 40, 30, 24, 20, 16, 12, 10, 9, 8, 7, 6, 5, 4, 3, 2, 1, 0.5 hours.

In some embodiments, cellulose composition comprises one or more, two or more, three or more, four or more of the following characteristics: (i) cellulose to solid ratio of >90% weight/weight; (ii) crystalline cellulose to solid ratio of >50% weight/weight; (iii) lignin to solid ratio of <10% weight/weight; and (iv) hemicellulose carbohydrate to solid ratio of <4% weight/weight. In some embodiments, the cellulose compositions are characterized by a high cellulose to solid ratio, a low lignin to solid ratio, and a low hemicellulose carbohydrate to solid ratio. In some embodiments, the cellulose compositions are characterized by a high crystalline cellulose to solid ratio. In some embodiments, the cellulose compositions are characterized by a high cellulose to solid ratio, a low lignin to solid ratio, a high crystalline cellulose to solid ratio and a low hemicellulose carbohydrate to solid ratio. In some cellulose compositions, cellulose to solid ratio is larger than 90%, 92%, 94%, 96%, 98%, or 99% weight/weight. In some cellulose compositions, crystalline cellulose to solid ratio is larger than 50%, 60%, 70%, 80%, 90% weight/weight. In some cellulose compositions, lignin to solid ratio is less than 10%, 9%, 8%, 7%, 6%, 5%, 4%, 3%, 2%, or 1% weight/weight. In some cellulose compositions, hemicellulose carbohydrate to solid ratio is less than 4%, 3%, 2%, or 1%.

VII Conversion of Cellulosic Remainder Pulp

The cellulosic remainder pulp of the present invention can be converted to a conversion product using a chemical or a biological process. The chemical process can be catalysis, biochemical transformation, or a thermochemical transformation. The conversion product can be a chemical derivative of cellulose. The conversion product can be a value-added product. The conversion product can be a renewable chemical or material, a nutrition supplement, or a bioenergy product. The conversion product can comprise at least one member selected from the group consisting of halomethyl-furfural, hydroxymethylfurfural, furfural, para-xylene, or any combination thereof. The conversion product can be lactic acid, lysine, threonine, p-xylene, PHA, succinic acid, ethanol, jet fuel, diesel, xylitol, Bakers' yeast, butanol, feedstock for BTX, BTX, fermentable sugars, dimethyl furan, furan dicarboxylic acid (FDCA), adipic acid, or building block chemicals, for example.

The conversion product can be used to produce a consumer product. The consumer product can be any product produced from cellulose. The consumer product can be a texturizer, an anti-caking agent, a fat substitute, an emulsifier, an extender, thin layer chromatography stationary phase, filler in a drug tablet, a bulking agent in food production, plaque assay kit, or a surfactant, for example.

Exemplary Lignocellulosic Remainder Composition

Some embodiments relate to the remainder lignocellulosic 1700-P1 composition prepared by a method as described hereinabove. Such composition has less than 20%, less than 15%, less than 13%, less than 10% weight/weight hemicelluloses carbohydrates on a dry matter basis. In some embodiments, such composition is at least 40%, 50%, 60% weight/weight cellulose, and at least 20%, or at least 30% weight/weight lignin. In some embodiments, acid soluble lignin is less than 5%, less than 3% less than 2% weight/weight. In some embodiment the residual amount of calcium in 1700-P1 is less than 90%, less than 80%, less than 70%, less than 60%, less than 50% weight/weight that of the native lignocellulose matter. In some embodiment the residual amount of magnesium in 1700-P1 is less than 90%, less than 80%, than 70%, less than 60%, less than 50% weight/weight that of the native lignocellulose matter.

The change in composition of the remainder lignocellulosic 1700-P1 compared to the native lignocellulose matter used to generate it through treatment 1700 is reflected in its properties: while native lignocellulosic matter is hard to grind, the remainder 1700-P1 is brittle and can be easily ground or milled by common industrial equipment to produce powders that can be pumped as solid suspension in a liquid or in a solid flow.

Exemplary Solid Cellulose Composition Characteristics

In some embodiments, solid cellulose composition 150 includes at least 80%, 85%, 90%, 95%, or 98% cellulose on a dry matter basis. In some embodiments, the cellulose in solid cellulose composition 150 (FIG. 9) is at least 40%, 50%, 60%, 70% or 80% crystalline. In some embodiments, less than 50%, 40%, 30% or 20% of the cellulose in solid cellulose composition 150 (FIG. 9) is crystalline cellulose.

In some embodiments, solid cellulose composition 150 (FIG. 9) includes at least 85%, 90%, 95% or 98% of the cellulose in lignocellulose substrate 110. In some embodiments, solid cellulose composition 150 includes less than 50%, less than 60%, less 70% or less than 80% of the ash in lignocellulose substrate 110. In some embodiments, solid cellulose composition 150 includes less than 50%, less than 60%, less 70% or less than 80% of the calcium ions in lignocellulose substrate 110. In some embodiments, solid cellulose composition 150 includes less than 30% 20%, 10% or even less than 5% weight/weight of the lipophilic materials in lignocellulose substrate 110. In some embodiments, solid cellulose composition 150 includes in an amount up to 30% 20%, 10% or 5% weight/weight of the lignin in lignocellulose substrate 110. In some embodiments, solid cellulose composition 150 includes water-soluble carbohydrates at a concentration of less than 10% wt, 8% wt, 6% wt, 4% wt, 2% wt, or 1% wt. In some embodiments, solid cellulose composition 150 includes acetic acid in an amount ≤50%, ≤40%, ≤30 or even ≤20% weight/weight of the acetate function in 110.

In some embodiments, lignocellulose substrate 110 includes pectin. Optionally, solid cellulose composition 150 includes less than 50%, 40%, 30%, or 20% weight/weight of the pectin in substrate 110. In some embodiments, lignocellulose substrate 110 includes divalent cations. Optionally, solid cellulose composition 150 includes less than 50%, 40%, 30%, or 20% weight/weight of divalent cations present in substrate 110.

In some embodiments, cellulose 1760-P2 (FIG. 10A) includes at least 80%, 85%, 90%, 95%, or 98% cellulose weight/weight on a dry matter basis. In some embodiments, the cellulose in solid cellulose composition 1760-P2 is at least 40%, 50%, 60%, 70% or 80% crystalline weight/weight on a dry solid basis. In some embodiments, less than 50%, 40%, 30% or 20% weight/weight on a dry solid basis of the cellulose in solid cellulose composition 1760-P2 is crystalline cellulose.

In some embodiments, solid cellulose composition 1760-P2 includes at least 85%, 90%, 95% or 98% of the cellulose in lignocellulose substrate 1700-P1. In some embodiments, solid cellulose composition 1760-P2 includes less than 50%, less than 60%, less 70% or less than 80% of the ash in the native lignocellulose matter. In some embodiments, solid cellulose composition 1760-P2 includes less than 50%, less than 60%, less 70% or less than 80% of the calcium ions in native lignocellulose matter. In some embodiments, solid cellulose composition 1760-P2 includes in an amount up to 30% 20%, 10% or 5% weight/weight of the lignin in native lignocellulose matter. In some embodiments, solid cellulose composition 1760-P2 includes hemicellulose carbohydrates at a concentration of less than 10% wt, 8% wt, 6% wt, 4% wt, 2% wt, or 1% wt. In some embodiments, solid cellulose composition 1760-P2 includes acetic acid in an amount ≤50%, ≤40%, ≤30 or even ≤20% weight/weight of the acetate function in native lignocellulose matter.

In some embodiments, cellulose composition 1760-P2 includes pectin. Optionally, solid cellulose composition 1760-P2 includes less than 50%, 40%, 30%, or 20% weight/weight of the pectin in native lignocellulose matter. In some embodiments, native lignocellulose matter includes divalent cations. Optionally, solid cellulose composition 1760-P2 includes less than 50%, 40%, 30%, or 20% weight/weight of divalent cations present in substrate 110.

The cellulose product 1760-P2 comprises less than 20%, less than 10%, 9%, 8%, 7%, 6%, 5%, 4%, 3%, 2% lignin and less than 5%, 4%, 3%, 2%, less than 1% hemicelluloses weight/weight on a dry solid basis. Said cellulose product is separated from the acid solvent reaction mixture as white solid that is filtered or sedimented and washed with additional amounts of MEK and or water to remove additional dissolved lignin or sugars, the solid is then dried.

This cellulose product may be fully hydrolyzed to high purity glucose as disclosed in PCT/US2013/039585 (incorporated herein by reference for all purposes). Alternatively, the cellulose product may be fully hydrolyzed to high purity glucose by chemical methods, including low temperature HCl hydrolysis as disclosed in PCT/US2013/039585 (incorporated herein by reference for all purposes), or any other chemical hydrolysis including but not limited to hydrolysis with dilute acid at high temperature, acid catalyzed hydrolysis in ionic liquid, solid state catalyzed hydrolysis utilizing sulfonated polymer or sulfonated activated carbon as catalyst.

In one method, hydrolysis is carried out in mild conditions that hydrolyze only the remaining amorphous cellulose, leaving the crystalline cellulose as crystals. Mild hydrolysis can be conducted in dilute solution of any of the acids HCl, $H_2SO_4$, $HNO_3$ and other acids, as well as mixtures thereof. The resulting nano crystals can be precipitated from the aqueous solution by changing the ionic strength of the solution, for example by dilution with water, or by adding a non-solvent to cause precipitation by centrifuge. Nano crystalline cellulose may have various applications as a component in bio-composite materials, the crystalline cellulose serving as a nano-strengthening component in the composite.

In another embodiment, the cellulose product is used as feedstock for a chemical conversion to produce furans. Such conversion may be done by heating it in the presence of a phenyl boronic acid and optionally magnesium or calcium halide salt. The reaction is carried out in a polar aprotic solvent other than an ionic liquid, an ionic liquid. or a mixture thereof, optionally with addition of small amounts of water. Alternatively, cellulose can be converted to furans in concentrated $ZnCl_2$ solutions under microwave radiation. Such solution comprising greater than 50%, 60% 70% $ZnCl_2$ and cellulose is irradiated with MW radiation of 400-800 W for ca. 5 min to convert cellulose to a mixture of furan isomers.

In another method, ionic liquids having a sulfonic acid functionality, e.g. 1-(4-sulfonic acid) butyl-3-methylimidazolium hydrogen sulfate (IL-1) are used to convert under mild conditions microcrystalline cellulose to furans. The reaction is co-catalyzed by metal ions selected from $Cr^{3+}$, $Mn^{2+}$, $Fe^{3+}$, Fe—, $Co^{2+}$ as their chloride or sulfate salts. The process may be further catalyzed by MW irradiation.

Alternatively, cellulose product 1760-P1 is converted to substituted furans (e.g., halomethylfurfural, hydroxymemylfurfural, and furfural) by acid-catalyzed conversion of biomass containing glycans (e.g., cellulose) using a gaseous acid in a multiphase reactor. The process for producing a substituted furan in a multiphase reactor consists of: feeding biomass and a gaseous acid into a multiphase reactor; and mixing the biomass and the gaseous acid in the presence of a proton donor and a solvent to form a reaction mixture, under conditions suitable to produce a substituted furan, in which the reaction mixture has less than 10% by weight of water. The gaseous acid is separated from the solid in a gas-solid separator, and the gas is dried. The multi phase reactor may be a fluidized bed reactor. Suitable Lewis acids may include, for example, lithium chloride, sodium chloride, potassium chloride, magnesium chloride, calcium chloride, zinc chloride, aluminum chloride, boron chloride, or any combination thereof. In other embodiments, the proton donor has less than 10% by weight of water. Suitable solvent is selected from dichloromethane, ethylacetate, hexane, cyclohexane, benzene, toluene, diethyl ether, tetrahydrofuran, acetone, dimethyl formamide, dimethyl sulfoxide, acetonitrile, methanol, ethanol, isopropanol, n-propanol, n-butanol, chloroform, dichloroethane, trichloroethane, furfural, furfuryl alcohol, supercritical carbon dioxide, and any combination thereof. In some embodiments, the solvent is dry. In other embodiments, the solvent has less than 10% by weight of water.

Once these substituted furans are produced, they can serves as intermediates that can be converted into to furanic derivatives such as biofuels, diesel additives, and plastics. In one embodiment, substituted furan, i.e. 2,5-dimethylfuran (DMF) is converted into para-xylene by cycloaddition of ethylene. Specifically, DMF and ethylene may be reacted in the presence of activated carbon to produce para-xylene. Alternatively, DMF and ethylene may be reacted in the presence of an acid, a desiccant, or an acid and a desiccant to produce a reaction mixture comprising para-xylene wherein less than 10% of the reaction is 2,5-hexanedione. The method further includes oxidizing para-xylene to produce terephthalic acid. The method further includes producing one or more plastics or fuels from para-xylene.

EXAMPLES

It is understood that the examples and embodiments described herein are for illustrative purposes only and are not intended to limit the scope of the claimed invention. It is also understood that various modifications or changes in light the examples and embodiments described herein will be suggested to persons skilled in the art and are to be included within the spirit and purview of this application and scope of the appended claims. All publications, patents, and patent applications cited herein are hereby incorporated by reference in their entirety for all purposes.

Example 1—Small Scale Hemicellulose Sugar Extraction

Table 1 provides a summary of chemical analysis of the liquor resulting from hemicellulose sugar extraction of various biomass types. The % monomeric sugar is expressed as % weight out of total sugars weight. All other results are expressed as % weight relative to dry biomass.

All treatments were carried out in a 0.5 L pressure reactor equipped with a stirrer and heating-cooling system. The reactor was charged with the biomass and the liquid at amounts given in the table. The reactor was heated to the temperature indicated in the table, time count was started once the reactor reached 5° C. below the designated temperature. Once the time elapsed, the reactor was cooled down. Solid and liquid were separated, and the content of the obtained liquor was analyzed, all data was back calculated relative to dry biomass weight. HPLC methods were applied to evaluate % Total Sugars in the liquor, % monomeric sugars and % Acetic Acid. The % Degradation product is the sum of % Furfurals (GC or HPLC analysis), % Formic acid (HPLC) and % Levullinic acid (HPLC). Acid Soluble Lignin was analyzed according to NREL TP-510-42627 method.

TABLE 1

Treatment conditions and chemical analysis of the resulting liquor

| Ref # | Biomass Type | Biomass Dry wt, g | Soln. wt. | Acid (s) con. % wt | T ° C. | Time, min | % TS[1]/ DB[2] | % DP1[3]/ % TS | % AcOH[4]/ DB | % Degradation Products[5]/ DB | % ASL/ DB |
|---|---|---|---|---|---|---|---|---|---|---|---|
| 9114 | Eucalyptus | 45.2 | 198.2 | 0.7[6] | 140 | 40 | 22.4 | NA | 1.7 | NA | NA |
| 5a | Eucalyptus | 33.2 | 199.5 | 0.7[6] | 135 | | | | | | |
| 90 | 60 | | | | | | | | | | |
| 60 | 21.8 | 91 | 3.6 | 1.3 | 3.5 | | | | | | |
| 9004 | Acacia | 33.7 | 201.8 | 0.7[6] | 145 | 40 | 21.2 | 79 | 3.3 | 0.9 | 2.6 |
| 9012 | Leucaena | 34.1 | 201.3 | 0.7[6] | 145 | 60 | 22.0 | 96 | 3.4 | 1.3 | 2.0 |
| 9018 | EFB | 34.6 | 203.8 | 0.7[6] | 145 | 40 | 25.2 | 79 | 1.3 | 0.7 | 1.2 |
| 9019 | Bagasse | 13.3 | 194.8 | 0.7[6] | 145 | 40 | 29.8 | 96 | 2.5 | 0.7 | 2.5 |
| YHTp83/15 | Pine | 18.1 | 190.5 | 0.7[7] | 160 | 15 | 22.9 | 95 | 0.07 | 1.5 | 0.9 |

[1]% Total Sugars (% TS) measured by HPLC in the liquor
[2]DB—Dry Biomass
[3]% Monomers out of total dissolved sugars measured by HPLC in the liquor
[4]% Acetic Acid measured by HPLC in the liquor
[5]% Degradation Products = % Furfurals + % Formic Acid + % Levullinic Acid. % Furfurals measured by GC or HPLC, % Formic acid and % Levullinic acid measured by HPLC
[6]0.5% $H_2SO_4$ + 0.2% $SO_2$
[7]0.7% $H_2SO_4$ + 0.03% Acetic acid Example 2—Large Scale Chemical Analysis of Lignocellulose Matter after Hemicellulose Sugar Extraction Table 2 provides a summary of chemical analysis of various types of biomass after hemicellulose sugar extraction.

Pine (ref A1202102-5): Fresh Loblloly pine chips (145.9 Lb dry wood) were fed into a Rapid Cycle Digester (RDC, Andritz, Springfield, Ohio. An acid aqueous solution (500 Lb) was prepared by adding 0.3% $H_2SO_4$ and 0.2% $SO_2$ to water in a separate tank. The solution was heated to 135 C and then added to the digester to cover the wood. The solution was circulated through the wood for 40 minutes while maintaining the temperature. After 60 minutes, the resulting liquor was drained to a liquor tank and using steam the wood was blown to a cyclone to collect the wood (128.3 Lb dry wood) and vent the vapor. The extracted wood was analyzed for sugar content, carbohydrate composition, ash, elements (by ICP), and DCM extractives. The analyses of the hemi depleted lignocellulose material show extraction of 42.4% Arabinan, 10.5% Galactan, 9.6% Xylan, 14.3% Manan, and 11.8% Glucan, indicating that mostly hemicellulose is extracted. Analyses also show 11.6% of "others", including ASL, extractives and ash. The overall fraction of carbohydrates in the remaining solid is not different within the error of the measurement to that of the starting biomass due to this removal of "others". It is however easily notices that the extracted woodchips are darker in color and are more brittle than the fresh biomass.

Pine (ref A1204131-14(K1)): Fresh Loblloly pine chips (145.9 Lb dry wood) were fed into a Rapid Cycle Digester (RDC, Andritz, Springfield, Ohio. An acid aqueous solution (500 Lb) was prepared by adding 0.3% $H_2SO_4$ and 0.2% $SO_2$ to water in a separate tank. The solution was heated to 135 C and then added to digester to cover the wood. The solution was circulated through the wood for 180 minutes while maintaining the temperature. After 180 minutes, the resulting liquor was drained to a liquor tank and using steam the wood was blown to a cyclone to collect the wood (121.6 Lb dry wood) and vent the vapor. The material was analyzed as described above. The analyses of the hemi depleted lignocellulose material show extraction of 83.9% Arabinan, 84.3% Galactan, 50.1% Xylan, 59.8% Manan and no extraction of glucan, indicating effective extraction of hemicellulose. Analyses also show extraction of 21.8% of "others" including lignin, extractives and ash.

Eucalyptus (ref A120702K6-9): Fresh Eucalyptus Globulus chips (79.1 Kg dry wood) were fed into a Rapid Cycle Digester (RDC, Andritz, Springfield, Ohio). An acid aqueous solution was prepared by adding 0.5% $H_2SO_4$ and 0.2% $SO_2$ to water in a separate tank. The solution was heated to 145° C. and then added to digester to cover the wood. The solution was circulated through the wood for 60 minutes while maintaining the temperature, then heating was stopped while circulation continued for another 60 minute, allowing the solution to cool. After 120 minutes, the resulting liquor was drained to a liquor tank and using steam the wood was blown to a cyclone to collect the wood (58.8 Kg dry wood) and vent the vapor. The material was analyzed as described above. Analyses showed that 20.1% of the carbohydrates were extracted from the wood (dry wood base) xylose containing 70% of these sugars, 91% of the sugars in the liquor present as monomers. Under these conditions acetic acid concentration in the liquor was 3.6% (dry wood base) showing maximal removal of acetate groups from hemicellulose sugars; 4.2% (dry wood base) of acid soluble lignin. These results indicate effective extraction of hemicellulose and in particularly xylose, along with hydrolysis of the acetate groups from substituted xylosans. At the same time a significant amount of acid soluble lignin, extractives and ash are also extracted into the liquor.

TABLE 2

Chemical analysis of lignocellulose matter after hemicellulose sugar extraction

| Ref | Biomass Type | Ash % wt | Ca ppm | Na ppm | Mg ppm | K ppm | % Arabinan | % Galactan | % Glucan | % Xylan | % Mannan | % Total Carbohydrate | DCM Extractives |
|---|---|---|---|---|---|---|---|---|---|---|---|---|---|
| A1202102-5[1] | Pine | 0.59 | 248 | NA | 123 | 92 | 0.25 | 1.33 | 48.13 | 4.75 | 8.48 | 62.94 | NA |
| A1204131-14(K1)[2] | Pine | 0.31 | 113 | 388 | 44 | 23 | 0.21 | 0.38 | 51.68 | 3.14 | 4.89 | 60.30 | 1.07 |
| A120702K6-9[3] | Eucalyptus | 0.35 | 95 | 109 | 30 | 72 | <0.01 | 0.03 | 67.48 | 2.13 | 0.20 | 69.54 | 0.26 |

[1] Hemicellulose sugar extraction: 135° C. for 60 minutes, 0.3% $H_2SO_4$, 0.2% $SO_2$.
[2] Hemicellulose sugar extraction: 135° C. for 180 minutes, 0.3% $H_2SO_4$, 0.2% $SO_2$.
[3] Hemicellulose sugar extraction: 145° C. for 60 minutes + cool down 60 minutes, 0.3% $H_2SO_4$, 0.2% $SO_2$.

Example 3—Direct Lignin Extraction

After hemicellulose sugars were extracted from eucalyptus chips, the remainder was mainly cellulose and lignin. The remainder was delignified using an aqueous organic solution containing acetic acid according to the process described below.

Eucalyptus wood chips (20.0 g) were mixed with a solution of 50/50 v/v of methylethylketone (MEK) and water that contains 1.2% acetic acid w/w of solution at a ratio of 1:10 (100 mL water, 100 mL MEK, and 2.2 g acetic acid). The mixture was treated at 175° C. for 4 hours in an agitated reactor. Then the system was allowed to cool to 30° C. before the reactor is opened. The slurry was decanted and the solid is collected for further analysis.

After the reaction, there was 127 g free liquid, of which 47.2 g organic and 79.8 g aqueous. The organic phase contained 1.1 g acetic acid, 10.4 g water, and 5.5 g dissolved solids (0.1 g sugars and 5.4 g others, which is mainly lignin). The aqueous phase contained 1.4 g acetic acid, 2.1 g dissolved solids (1.5 g sugars and 0.6 g other).

After decanting of the liquid, black slurry and white precipitate were at the bottom of the bottle. This material was vacuum-filtered and washed thoroughly with 50/50 v/v MEK/water (119.3 g MEK 148.4 g water) at room temperature until the color of the liquid became very pale yellow. Three phases were collected; organic 19.7 g, aqueous 215 g, and white solid 7 g dry. The organic phase contained 0.08 g acetic acid and 0.37 g dissolved solids. The aqueous phase contained 0.56 g acetic acid and 0.6 g dissolved solids.

All organic phases were consolidated. The pH of the solution is adjusted to pH 3.8. The solution was then allowed to separate into an aqueous phase (containing salts) and an organic phase (containing lignin). The lignin-containing organic phase was recovered and purified using a strong acid cation column. The organic solution was then added dropwise into an 80° C. water bath to precipitate the lignin.

$^{13}C$ Solids State NMR analysis of the white precipitate indicates that it comprises mostly cellulose (pulp). The amount of lignin is not detectable. The reaction is successful in delignifying the eucalyptus wood chips.

Example 4—Analyses of Ash of Louisiana Bagasse Feedstock Before and after Soil and Ash Removal The ash fraction of a sample of bagasse taken from a pile at a sugar mill in Louisiana was evaluated by ashing of samples in a microwave furnace (3.1. CEM Phoenix™ Microwave Muffle Furnace), and was found to contain 13.4% ash.

TABLE 3A

Ash results after different treatments to remove soil and ash

| Sample | % Ash |
|---|---|
| Louisiana Sample R1 | 13.12 |
| Louisiana Sample A | 17.81 |
| Louisiana Sample R2 | 13.38 |
| Sample R1 washed with water | 12.78 |
| Sample A washed with water | 17.16 |
| Sample R2, 1 shear treatment, 1 pressure wash | 6.67 |
| Sample A, 2 shear treatments, 2 pressure wash | 2.52 |
| Sample R2, 6 shear treatments, 6 pressure wash | 2.68 |
| Sample R2, 8 shear treatments, 8 pressure wash | 2.26 |

The results summarized in the table demonstrate the high ash present in Louisiana bagasse obtained from different sugar mills and different sampling times. The results also show that to achieve effective removal of soil and ash it is essential to apply several cycles of shear treatment and washing with high pressure to cause the removal of stones, sand and sols of ash compound. The remaining bagasse still holds 2-3% of "true" ash, that is related to metal cations and other elements associated at molecular level in the cell structure.

B) Bagasse was milled and de-ashed, samples before and after de-ashing was sieved through a series of screens:

TABLE 3B

De ashing of bagasse

| | | Ground Raw Bagasse | | De-Ashed Bagasse | |
|---|---|---|---|---|---|
| Screen Size | Screen Size, mm | % | Fiber Length, mm | % | Fiber Length, mm |
| on 6 mesh | 340 | 0.3 | 1.0-15.0 | 0 | |
| on 12 mesh | 170 | 5 | 2.0-15.0 | 1 | 5.0-10.0 |
| on 16 mesh | 120 | 9.5 | 1.0-10.0 | 5.4 | 2.0-10.0 |
| on 20 mesh | 80 | 12.7 | 1.0-10.0 | 6 | 1.0-5.0 |
| on 30 mesh | 60 | 57.3 | <1.0-5.0 | 71.1 | 1.0-5.0 |
| thru 30 mesh | <60 | 15.4 | <1.0 | 16.5 | <1.0 |

The table demonstrates that ability to remove by industrial means most of the soil and ash from bagasse feedstock by shear treatment and high pressure wash, while still maintaining ~85% of the original feedstock at size greater than 30 mesh, that allows further handling of the washed material.

Example 5—Hydrolysis of Cellulose by Cellulase

Figure 8B:
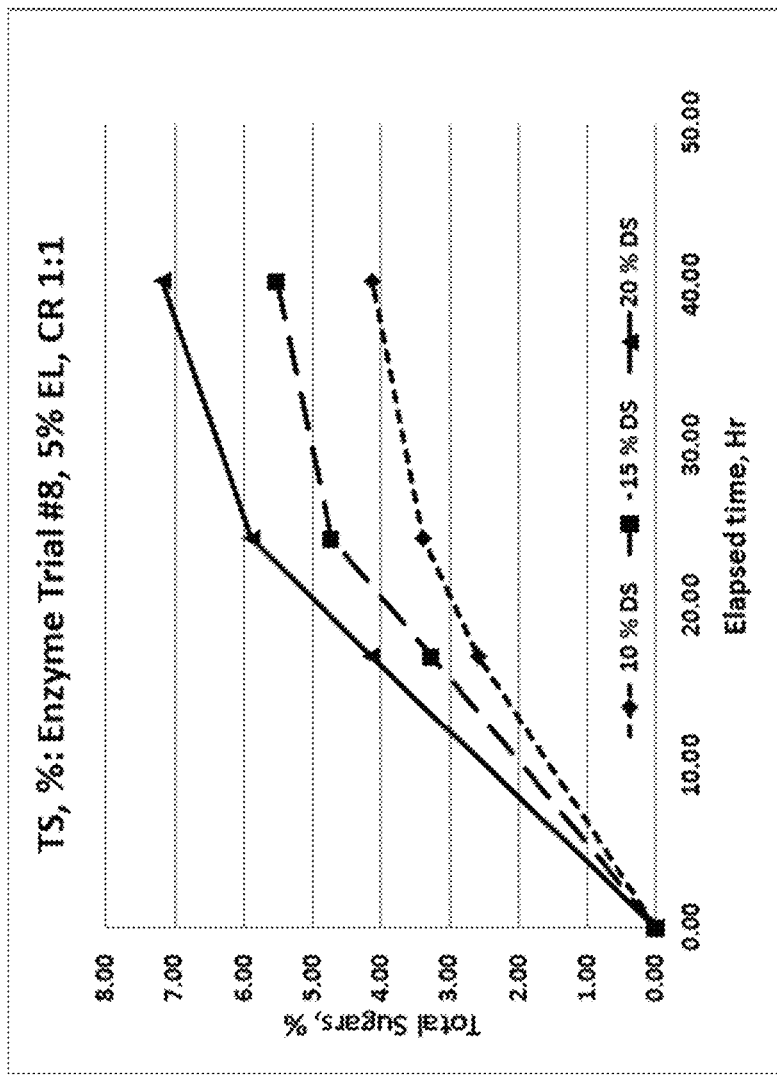
FIG. 8B shows glucose concentration in the solution at different starting cellulose pulp load in the reactor (10-20% wt dry solid)
Figure 8C:
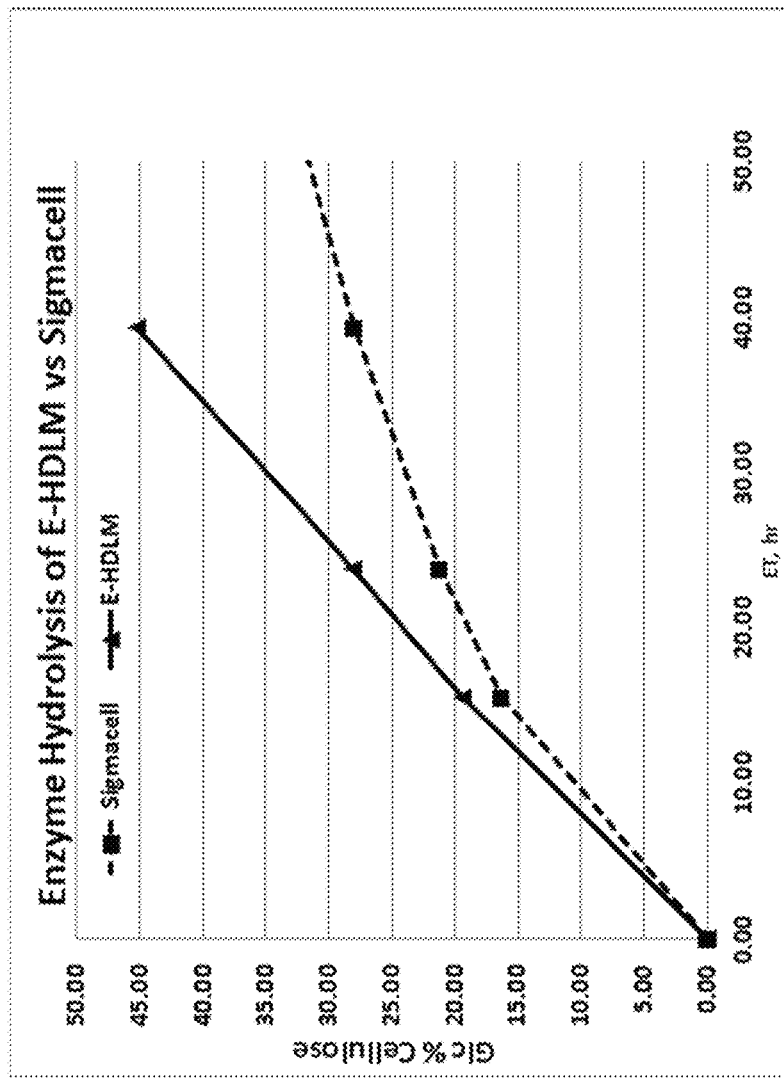
FIG. 8C illustrates comparative saccharification of cellulose pulp obtained by hemicelluloses extraction followed by acid/solvent lignin extraction (E-HDLM), and a commercial Sigmacell cotton linters.

Cellulose pulp (eucalyptus pulp) was obtained as the remainder after the hemicellulose and lignin extraction. Cellulose pulp suspension having 10-20% solids in 0.05M acetate buffer, pH 4.55, 5%/cellulose, cellulase:cellobiase 1:1 was prepared. The suspension was stirred at 55° C. Samples of the liquor were taken periodically for analysis of the dissolved sugars. The dissolving sugars were mostly glucose, but can also include some residual hemicellulose sugars remaining in the pulp. The dissolved sugar contained 7.78% lignin and 94.22% holocellulose, (89.66% glucose). As % solids increased, overall yield decreased (so long as the enzyme loading is the same). However the yield was higher compared to a reference sample hydrolyzed under the same conditions using Sigmacell (Sigma # S5504 from cotton linters, type 50, 50 um), as seen in FIG. 8B. the cellulose pulp is well saccharified by the cellulase mix enzyme (although it still contains some residual lignin). the reaction rate of E-HDLM is higher than the reference material Example 6—Characterization of Remainder Cellulose Eucalyptus feedstock was treated to extract hemicellulose sugars, ash and acid soluble lignin as described in example 2. The lignocellulosic remainder was milled to produce powder of ca. 1400 micron. The milled powder (~20 g, 5% moisture) was loaded in a pressure reactor. 100 g water and 80 g methylethyl ketone were added to the reactor, and acetic acid 0.5% to 2.5% wt/wt to total liquids. The reactor was heated to 160-190° C. for 1-3 hours. The reactor was cooled down, solid and liquid separated. The solid was washed with additional amount of water saturated MEK solution, and dried under vacuum.

The amount of cellulose and lignin in the remainder solid was measured according to NREL/TP-510-42618.

| Time (h) | Temperature (° C.) | % AcOH | Remainder Solid (g/100 g initial solid) | % Lignin | % Cellulose |
|---|---|---|---|---|---|
| 2 | 175 | 2.5 | 54.7 | 2.1 | 96.2 |
| 1 | 190 | 0.5 | 54.2 | 10.6 | 80.4 |
| 3 | 160 | 0.5 | 60.5 | 7.5 | 87.6 |

The results indicate high efficiency of the reaction conditions in extracting lignin, leaving behind down to less than 5% lignin weight/weight solid under optimal conditions, with as low as 2% achievable.

Example 7—Elemental Analysis of Lignin Compositions

The Elemental analysis of carbon, nitrogen, hydrogen and sulfur content of organic material is determined by the FLASH EA 111 CHNS Analyzer. Samples were incinerated under 900° C. using He and $O_2$ atmosphere with flow rates of 140 ml/min and 250 ml/min respectively.

Based on elemental analysis the empiric monomer formula is calculated, assuming 9 carbon atoms in each monomer. The results for eucalyptus, pine and bagasse produced according to the method of this invention are shown in the table below.

Compared to Kraft softwood lignin, both ASE lignin and HP lignin (exemplary HP can be produced according to Section VII of PCT US2013/039585) are significantly more pure, particularly the level of sulfur is below detection level while Kraft has 1.6%, which is well noticed by is malodor in production processes involving lignin or even in final products incorporating Kraft lignin; the ratio of O/C is significantly lower in ASE and HP lignin compared to Kraft, i.e. it is less oxidized, therefore ASE and HP lignin are preferred starting material for chemical conversions that require de-oxygenation, for example conversion to non-oxygenated aromatic molecules.

Elemental Analysis Measurements of Lignin

| | % | | | | | |
|---|---|---|---|---|---|---|
| | ASE lignin - direct extraction | | | HP lignin - after HCl hydrolysis | | Kraft |
| Elements | *Eucalyptus* | Pine | Bagasse | *Eucalyptus* | Pine | SW |
| C | 62.1 | 67.1 | 66.2 | 65.9 | 67.0 | 47.8 |
| H | 5.91 | 6.68 | 6.71 | 5.32 | 5.23 | 4.93 |
| N | 0.12 | 0.12 | 0.35 | <0.05 | <0.05 | 0.1 |
| O | 27.5 | 23.4 | 23.6 | 28.1 | 22.4 | 25.6 |
| S | <0.2 | <0.2 | <0.2 | <0.2 | <0.2 | 1.56 |
| Formula | $C_9H_{10.28}O_{2.99}$ | $C_9H_{10.75}O_{2.35}$ | $C_9H_{10.94}O_{2.40}$ | $C_9H_{8.65}O_{2.88}$ | $C_9H_{8.37}O_{2.26}$ | $C_9H_{11.02}O_{3.6}$ |
| O/C | 0.33 | 0.26 | 0.27 | 0.32 | 0.25 | 0.40 |
| H/C | 1.14 | 1.19 | 1.22 | 0.96 | 0.93 | 1.2 |

Example 8—Determination of Lignin Functional Groups by $^{31}P$ NMR

Figure 11:
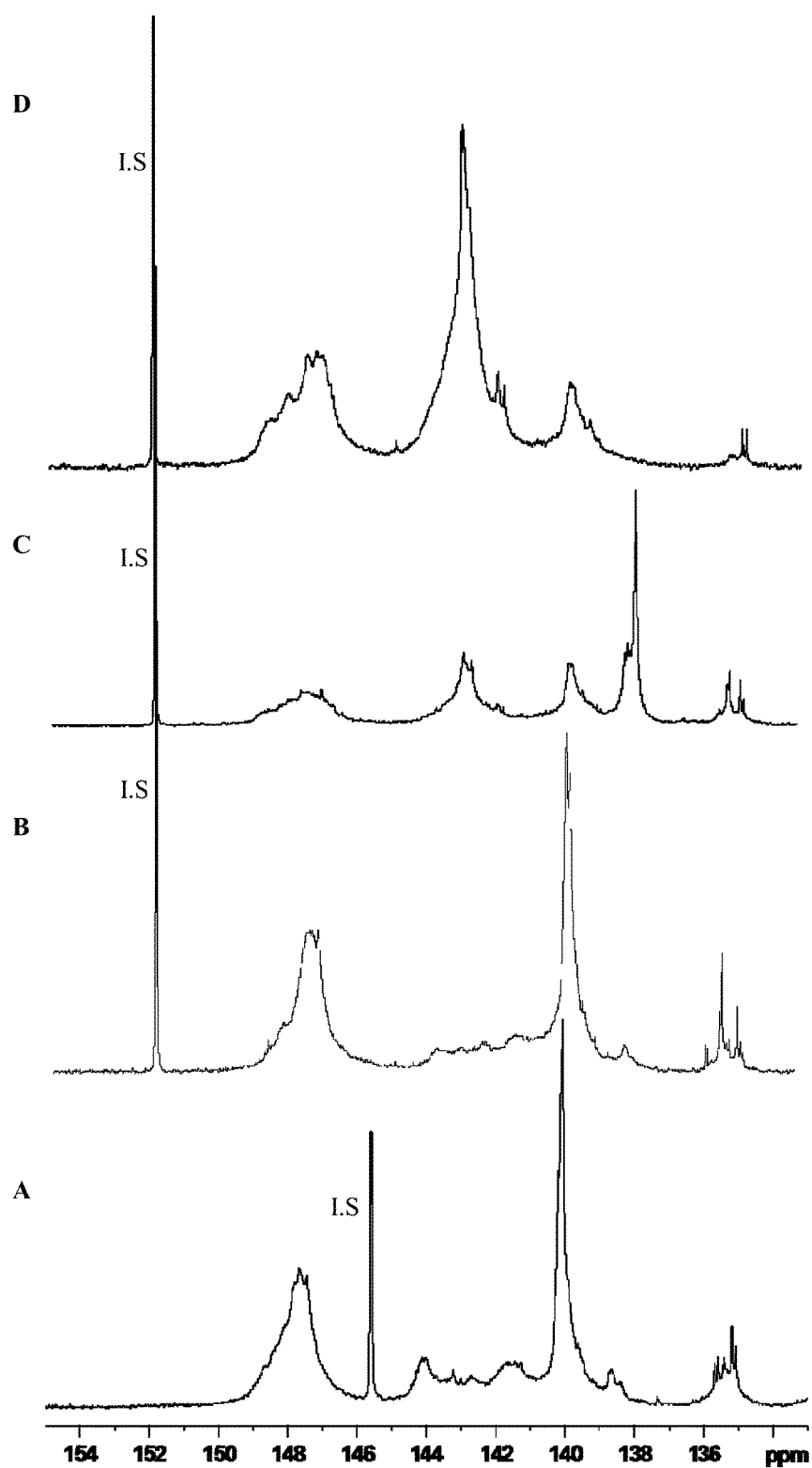
FIG. 11 is a series of $^{31}$P NMR spectra of derivatized lignin compositions: A—comparative sample Kraft lignin; B—lignin made from pine; C—lignin made from bagasse; D—lignin made from eucalyptus

Quantitative $^{31}P$ NMR were acquired on dry lignin (~40 mg) dissolved in 500 μL of a mixture consisting of 1.6:1 (v/v) deuterated pyridine (Py-$D_5$)/deuterated chloroform (CDCl$_3$). Endo-N-Hydroxy-5-norbornene-2,3-dicarboximide (e-HNDI) is used as an internal standard, where 200 μL of 50.0 mmol/L in Py-$D_5$/CDCl$_3$ (1.6/1, v/v) is added. Also, 50 μL of chromium (III) acetylacetonate solution (11.4 mg/mL in Py-$D_5$/CDCl$_3$ (1.6/1, v/v)) is added as a relaxation agent. The dissolved lignin is then derivatized with 100 μL of 2-chloro-4,4,5,5-tetramethyl-1,3,2-dioxaphospholane (TMDP). The spectrum was acquired using an inverse gated decoupling pulse sequence, 75° pulse angle, 10 s pulse delay, 150 scans, zero filling, 1.0 Hz line broadening, and at 25° C. Spectra collected according to this method for the 3 feedstocks and the reference Kraft sample are presented in FIG. 11. FIG. 11A is lignin derived from the Kraft process, FIG. 11B is lignin derived from pine, FIG. 11C is lignin derived from bagasse, and FIG. 11D is lignin derived from eucalyptus. The integrations of the peaks are listed in the table below.

| Species | Aliphatic OH (mmol/g lignin) | Phenolic OH (mmol/g lignin) | | | Carboxylic OH (mmol/g lignin) |
|---|---|---|---|---|---|
| | | Syringyl and Condensed Phenolic OH (mmol/g lignin) | Guaiacyl and/or p-hydroxyphenyl Phenolic OH (mmol/g lignin) | Total | |
| ASE Eucalyptus | 1.73 | 3.04 | 0.68 | 3.72 | 0.08 |
| ASE Pine | 1.99 | 1.14 | 1.88 | 3.02 | 0.30 |
| ASE Bagasse | 1.00 | 1.29 | 1.70 | 2.99 | 0.35 |
| HP Eucalyptus | 0.31 | 1.72 | 1.52 | 3.24 | 0.46 |
| HP Pine | 0.35 | | 2.9 | 2.9 | 0.91 |
| Kraft SW | 2.03 | 1.43 | 1.92 | 3.35 | 0.46 |
| Kraft Black Liquor Lignin SW | 1.87 | 1.28 | 1.72 | 3.0 | 0.41 |

Example 9—Determination of Lignin Functional Groups by $^{13}$C NMR

Quantitative $^{13}$C NMR spectrum is acquired using DMSO-D6 (500 µL) as solvent for lignin (80 mg), with an inverse gated decoupling sequence, 90° pulse angle, 12 s pulse delay, and about 10000 scans.

| | ASE Lignin (direct extraction) | | | HP lignin (after HCl hydrolysis) | | Reference[#] | |
|---|---|---|---|---|---|---|---|
| | | | | | | Pine | Residual Kraft |
| | Eucalyptus | Pine | Bagasse | Eucalyptus | Pine | EOL | Softwood |
| Degree of condensation | 0.6 | 0.8 | 0.4 | 0.9 | 0.9 | 1.1 | 1 |
| Methoxyl content (#/aryl group) | 1.3 | 0.8 | 0.9 | 0.8 | 0.7 | 0.9 | 0.8 |
| Aliphatic linkages (β-O-4') (#/aryl group) | 0.5 | 0.1 | 0.2 | 0.2 | 0.1 | 0.3 | 0.3 |
| Aromatic C—O (#/aryl group) | 2.0 | 1.9 | 1.7 | 1.9 | 1.8 | 2.1 | 2.1 |
| Aromatic C—C (#/aryl group) | 2.1 | 2.0 | 2.2 | 2.3 | 2.2 | 2.1 | 1.9 |
| Aromatic C—H (#/aryl group) | 1.9 | 2.2 | 2.1 | 1.7 | 2.1 | 2 | 2.0 |

[#]"Lignin structural modifications resulting from ethanol organosolv treatment of loblolly pine". Ragauskas A J, Energ Fuel 2010; 24 (1): 683-689.

The data in the table shows that lignin of the current invention has lower degree of condensation than lignins produces through other processes such as the Organosolv process or Kraft milling.

Example 10—ICP, Ash and Carbohydrate Measurements of Lignin Samples

Inductively coupled plasma (ICP) analysis of bagasse lignin, ash analysis according to NREL method TP-510-42622 and carbohydrate analysis according to NREL method TP-510-42618 are provided below:

| | Concentration (ppm) | | |
|---|---|---|---|
| Element | Bagasse (ref: 18740) | Eucalyptus (ref: 16028) | Pine (ref: 16032) |
| S | 660 | 690 | 538 |
| Ca | <10 | 14 | 4 |
| Fe | 50 | 343 | 264 |
| K | <10 | 33 | 43 |
| Mg | <10 | 9 | 10 |
| Na | <10 | <2 | <2 |
| Ash | 0.1% | NA | NA |
| Carbohydrate | 0.1% | NA | NA |

Notably, the small amount of carbohydrate found comprise glucose only. Also, the analysis of lignocellulose composition by TP 510-42618 shows that >90% of the lignin to be Klason lignin.

Example 11—Solubility of Lignin in Various Solvents

Solubility of various types of high purity lignins in simple solvents at room temperature is provided below:

|  | DMSO | THF | Toluene | Methylethyl ketone | 0.1N NaOH |
|---|---|---|---|---|---|
| Pine | >120 g/L | >40 g/L | Insoluble | Insoluble | >10 g/L |
| Eucalyptus | >120 g/L | >40 g/L | Insoluble | Insoluble | >10 g/L |
| Bagasse | >120 g/L | >40 g/L | Insoluble | Insoluble | >10 g/L |

Example 12—Evaluation of Thermal Properties of Lignin by TGA and DSC

The table below provides weight loss values of pine, eucalyptus and bagasse lignin samples as measured by Thermal Gravimetric Analysis. A pre-heating cycle was applied to remove moisture.

TGA Profiles of Lignin Samples

|  | Eucalyptus | Bagasse | Pine |
|---|---|---|---|
| Moisture | 0 (Wt/%) | 0 (Wt/%) | 0.2 (Wt/%) |
| 5% Degradation | 250 (° C.) | 230 (° C.) | 230 (° C.) |
| 10% Degradation | 300 (° C.) | 280 (° C.) | 270 (° C.) |
| Char | 36.2 (Wt/%) | 33.4 (Wt/%) | 33.6 (Wt/%) |

DSC was performed according to DIN 53765: the sample is first dried by a pre-heat cycle. Then, 2 consecutive heat cycles are measured, typically in the first cycle annealing processes take place that affect the polymer structure, while in the second cycle the major transition Tg is ascribed to the glass transition of the polymer. Typically, Tg value of the second cycle is elevated by 4 to 30° C. Table 7b provides values of $1^{st}$ and $2^{nd}$ cycle measurements of Tg and the difference between the two cycles.

TABLE 7b

Tg values of lignin samples

|  | Tg (1) ° C. | Tg (2) ° C. | ΔTg ° C. |
|---|---|---|---|
| ASE Pine | 91 | 105 | 14 |
| ASE Eucalyptus | 131 | 150 | 19 |
| ASE Bagasse | 110 | 129 | 19 |

Example 13—High Purity of Lignin Solution as Feed for Lignin Conversion Processes A high purity lignin solution in water saturated MEK is made according to example 3. This composition of water saturated MEK comprises 1-8, 2-6, 2, 2.5-5% wt/wt dissolved lignin, less than 1, 0.5, 0.2, 0.1% acetic acid, less than 1000, 500, 250, 200 ppm other organic acid, less than 500, 250, 100 ppm ash, less than 500, 250, 100, 50, 25 ppm carbohydrate oligomers, less than 50, 25, 10, 5, 2 ppm furfurals, less than 50, 25, 10, 5, 1, 0.5 ppm sulfuric acid.

This composition is used as feed for lignin conversion processes. This composition of highly refined lignin soluble in low boiling point solvent is particularly suitable as feed for conversion processes that break the lignin polymer to small molecules, including phenols, guaiacols, syringols, eugenol, catechols, vanillin, vanillic acid, syringaldehyde, benzene, toluene, xylene, styrene, biphenyls and cyclohexane.

Example 14—Characterization of Remainder Cellulose Prepared from Louisiana Bagasse Bagasse was washed and extracted according to example 1 to extract hemicellulose. The remaining lignocellulose matter was then heated to 210° C. for 2.5-3 hours in a solution comprising 1:1 MEK: water, further comprising 0.3% wt/wt acetic acid. The remaining pulp was collected, washed with water-saturated MEK and dried.

The composition of resulting cellulose pulp obtained was characterized according NREL method TP-510-42618. Ash was determined according to NREL method TP-510-42622. Sigmacell cellulose and Whatman No. 1 paper are used as reference cellulose material. The composition of the bagasse feed was analyzed by the same methods. The results are summarized in the table below.

Composition of the Remaining Cellulose Pulp, Feedstock Bagasse and Comparative Cellulose Samples

| Sample (ref) | C6 sugars (glucose) % wt/wt (% wt/wt) | C5 sugars % wt/wt | Total sugars % wt/wt | Lignin % wt/wt | Ash % wt/wt |
|---|---|---|---|---|---|
| Remaining pulp (13650) | 85.4 (84.2) | 1.6 | 97.0 | 4.6 | NA |
| Remaining pulp (13844) | 83.3 (80.7) | 1.5 | 84.8 | 7.8 | NA |
| Remaining pulp (J01) | 75.7 | 1.0 | 76.7 | 10.9 | 12.4 |
| Bagasse (13633) | 30.6 (29.1) | 18.9 | 49.5 | 19.1 | 22.8 |
| Bagasse (13634) | 39.2 (4235.2) | 6.8 | 46.0 | 23.7 | 24.3 |
| Sigmacell | 84.5 (80.2) | 3.0 | 87.5 | NA | NA |
| Whatman paper No 1 | 86.8 (84.6) | 1.6 | 88.4 | NA | NA |

The remaining cellulose pulp was also analyzed for inorganic impurities by ICP-AES, the results are provided below.

ICP results of remaining cellulose pulp

|  | Ppm | |
|---|---|---|
| Element | Sample 13633 | Sample 13644 |
| Ca | 270 | 401 |
| Cu | 5 | 48 |
| Fe | 143 | 66 |
| K | 72 | 98 |
| Mg | 6 | <2 |
| Mn | 2 | <2 |
| Na | 6 | <2 |
| Al | 82 | 16 |
| Zn | 2 | 3 |
| Cr | 32 | 192 |

Example 15: Composition of the Remaining Cellulose Pulp Made from Pine and Eucalyptus Pine and eucalyptus feedstocks were treated to extract hemicelluloses sugars according to the procedure of example 1. The remaining lignocellulose matter was then heated to 160-210° C. for 1-3 hours in a solution comprising 1:1 MEK: water, further comprising 0.5-1.5% wt/wt acetic acid. The remaining pulp was collected, washed with water-saturated MEK and dried. The composition of resulting cellulose pulp obtained was characterized according NREL method TP-510-42618. Ash was determined according to NREL method TP-510-42622.

Composition of the Remaining Cellulose Pulp

| Sample (ref) | C6 sugars (glucose) % wt/wt (% wt/wt) | C5 sugars % wt/wt | Total sugars % wt/wt | Lignin % wt/wt | Ash % wt/wt |
|---|---|---|---|---|---|
| Eucalyptus (60 min@ 160 C., 0.5% acid) (18789) | 57.0 (53.2) | 3.8 | 60.8 | 18.23 | 0.11 |
| Eucalyptus (180 min@ 160 C., 0.5% acid) (18790) | 70.7 (66.8) | 3.8 | 73.8 | 11.35 | 0.1 |
| Pine (60 min@ 170 C., 0.5% acid) (18791) | 52.6 (47.3) | 4.1 | 56.7 | 37.43 | 0.39 |
| Pine (120 min@ 200 C., 1.5% acid) | 63.4 (60.5) | 1.5 | 64.9 | 23.8 | 0.52 |

Remaining Cellulose Pulps Obtained Through this Process were Analyzed by ICP

| Sample reference | Species | S | Ca | Fe | K | Mg | Na |
|---|---|---|---|---|---|---|---|
| 16995 | Eucalyptus | 400 | 150 | 160 | 40 | 20 | 30 |
| 16998 | Eucalyptus | 430 | 110 | 100 | 30 | 6 | 10 |
| 18104 | Pine | 530 | 40 | 130 | 150 | 80 | 10 |
| 18116 | Pine | 400 | 40 | 200 | 70 | 20 | 2 |

Example 16—Solubility Properties of Remainder Cellulose Pulps

The pulps were characterized for their solubility in water and ether, in comparison to Avicel PH-200, the results are summarized in the table below.

| | LIMS | PH | Conductivity µS/cm | Water soluble substances % | Water soluble substances mg/5 gr | Ether soluble substances mg/10 gr |
|---|---|---|---|---|---|---|
| Avicel PH-200 | Literature* | 5.5-7 | 75 | 0.25 | 12.5 | 5 |
| Bagasse | 17558 | 5.7-6.4 | 15-30 | 0.21 | 10.7 | 19.6 |
| Pine | 18578 | 4.4-4.6 | 35-50 | 0.19 | 9.7 | 19.8 |
| Eucalyptus | 16995 | 4.2-4.5 | 45-65 | 0.25 | 12.7 | 2.2 |

Figure 12A:
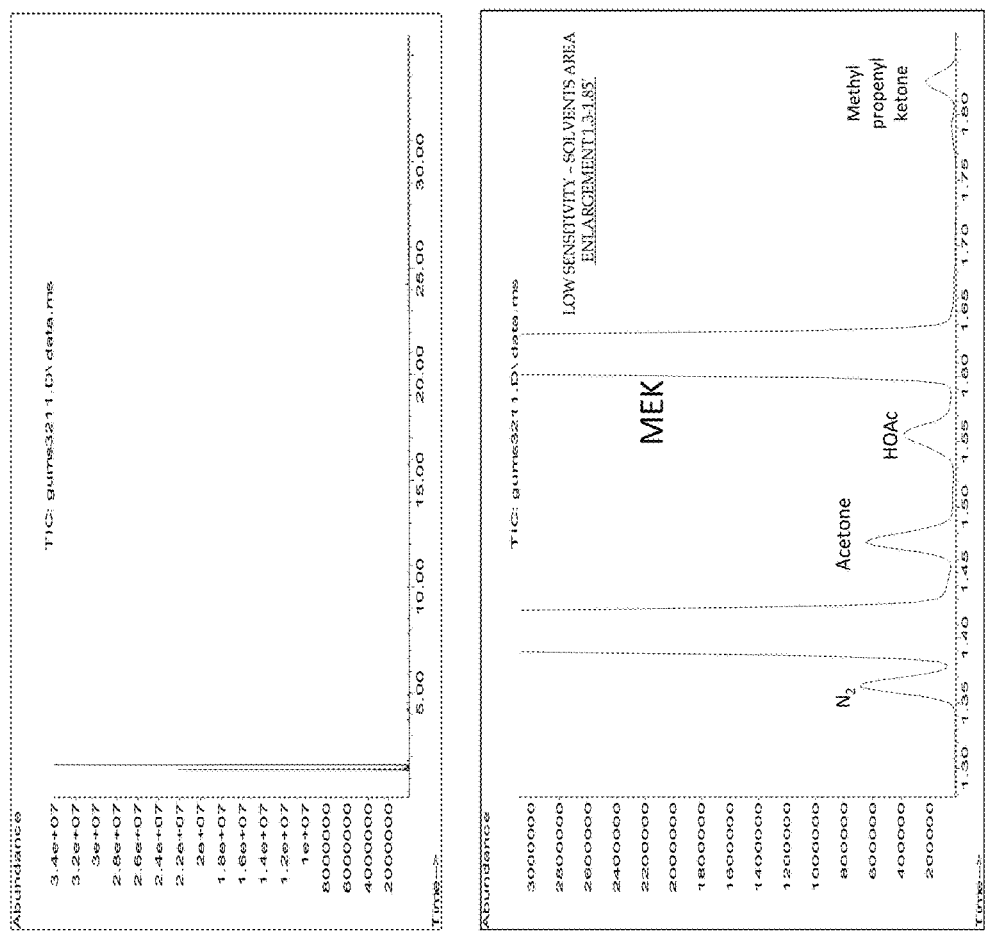
FIG. 12A is a low sensitivity GCMS chromatogram of lignin derived from pine wood.
Figure 12B:
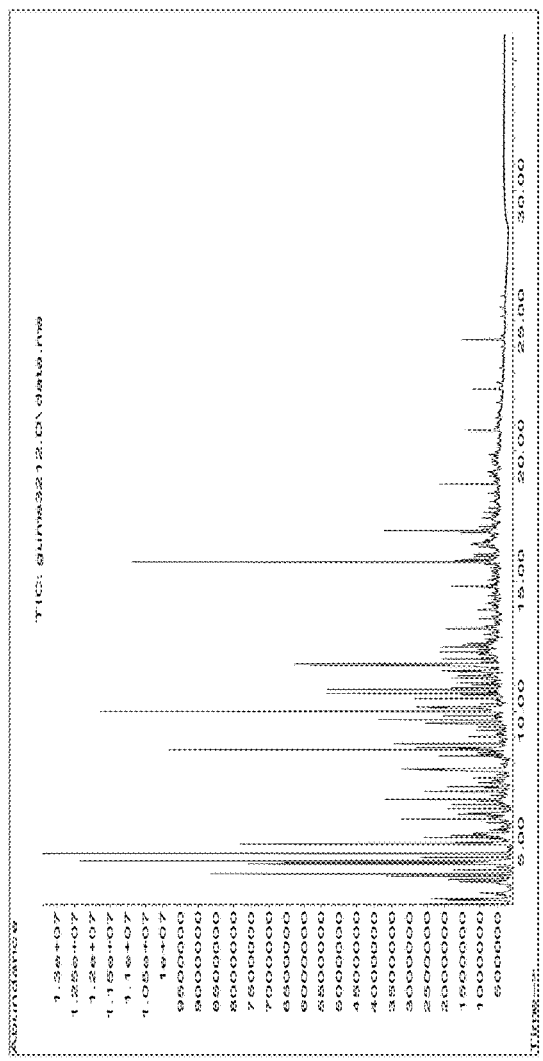
FIG. 12B is a high sensitivity GCMS chromatogram of lignin derived from pine wood.

*Published online: http://www.signetchem.com/downloads/datasheets/Fmc-biopolymer/Avicel-Ph-200-Specifications.pdf Example 17—Determination of Marker Molecules of Pine Derived Lignin Sample by GCMS A sample of pine derived lignin was preparation according to example 3. The conditions used for this sample was 230° C., 3 h, 0.5% acetic acid. The refined MEK solution comprising lignin (i.e. just before flash evaporation) was injected into the gas chromatogram (GC). GC-MS conditions were as follows: Column (HP-5MS 30 m); Temp. program (2.5, 70, 1, 10, 320, 10); Split (14:1), and the identification of peaks was done with the help of NIST Mass Spectral Search Program Version 2.0d. The samples were injected twice—first time with low sensitivity (chromatogram shown in FIG. 12A), to locate the retention time of the solvents. The second injection was done at high sensitivity (chromatogram shown in FIG. 12B), and the solvent peaks were not observed by MS to avoid an overload of the instrument. The syringe was washed with methanol, and some or all of the methanol in the chromatogram could be an artifact from cleaning of the syringe. The marker molecules and volatile contents of the lignin composition are shown in the table below.

Pine 230° C./3 h/0.5%

| Peak | R.T. | Pct Total | Substance |
|---|---|---|---|
| 1 | 1.364 | 0.925 | Nitrogen |
| 2 | 1.402 | 36.611 | Methanol (artifact of column cleaning) |
| 3 | 1.475 | 1.033 | Acetone |
| 4 | 1.556 | 0.765 | Acetic acid |
| 5 | 1.615 | 51.164 | Methylethyl ketone (MEK) |
| 7 | 1.826 | 0.335 | Methylpropenyl ketone |

| Peak | R.T. | Pct Area (excl. solvents) | Substance |
|---|---|---|---|
| 1 | 2.605 | 0.805 | 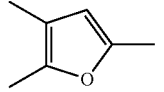 .2,3,5-Trimethylfuran |
| 2 | 2.763 | 0.871 | 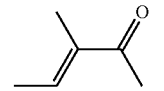 3-Methyl-2-penten-4-one |
| 7 | 3.676 | 1.5 | |
| 8 | 3.761 | 3.166 | 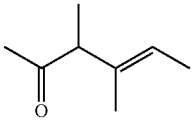 .(4E)-3,4-Dimethyl-4-hexen-2-one |
| 10 | 4.148 | 2.927 | 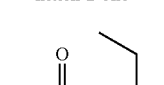 5-Ethyl-5-hexen-3-one |
| 11 | 4.192 | 2.804 | 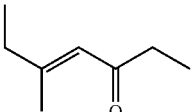 .(4E)-5-Methyl-4-hepten-3-one |

-continued

| Peak | R.T. | Pct Area (excl. solvents) | Substance |
|---|---|---|---|
| 12 | 4.259 | 5.06 | 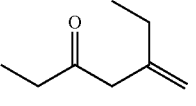 .5-Ethyl-5-hexen-3-one |
| 14 | 4.548 | 4.917 | 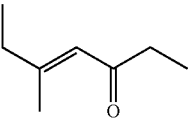 .(4E)-5-Methyl-4-hepten-3-one |
| 21 | 5.865 | 1.391 | 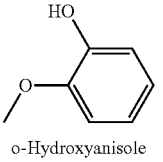 o-Hydroxyanisole |
| 27 | 6.618 | 1.46 | 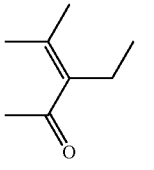 3-Ethyl-4-methyl-3-penten-2-one |
| 28 | 6.295 | 1.083 | 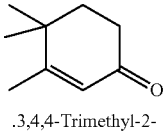 .3,4,4-Trimethyl-2-cyclohexen-1-one |
| 39 | 8.522 | 3.843 | 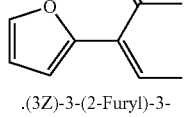 .(3Z)-3-(2-Furyl)-3-penten-2-one |
| | | | 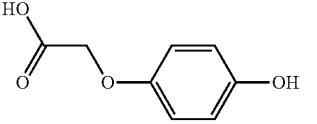 2-Methoxy-4-vinylphenol Similar probability |
| 46 | 9.537 | 1.673 | 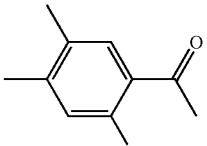 p-Hydroxyphenoxyacetic acid |

-continued

| Peak | R.T. | Pct Area (excl. solvents) | Substance |
|---|---|---|---|
| 49 | 10.018 | 5.06 | 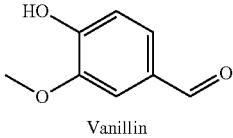 2'-Hydroxy-4',5'-dimethyl-acetophenone |
| 51 | 10.154 | 0.89 | 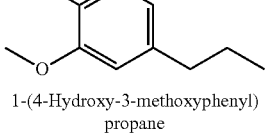 Vanillin |
| 58 | 10.916 | 0.601 | 1-(4-Hydroxy-3-methoxyphenyl) propane |
| 86 | 20.793 | 0.431 | 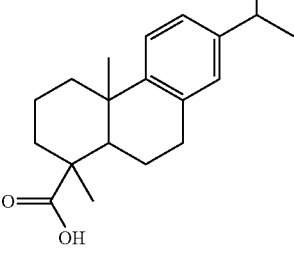 Dihydroabietic acid (marker for pine tall oils) (relative low matching/ characteristic to pine Tall Oils) |

Figure 13A:
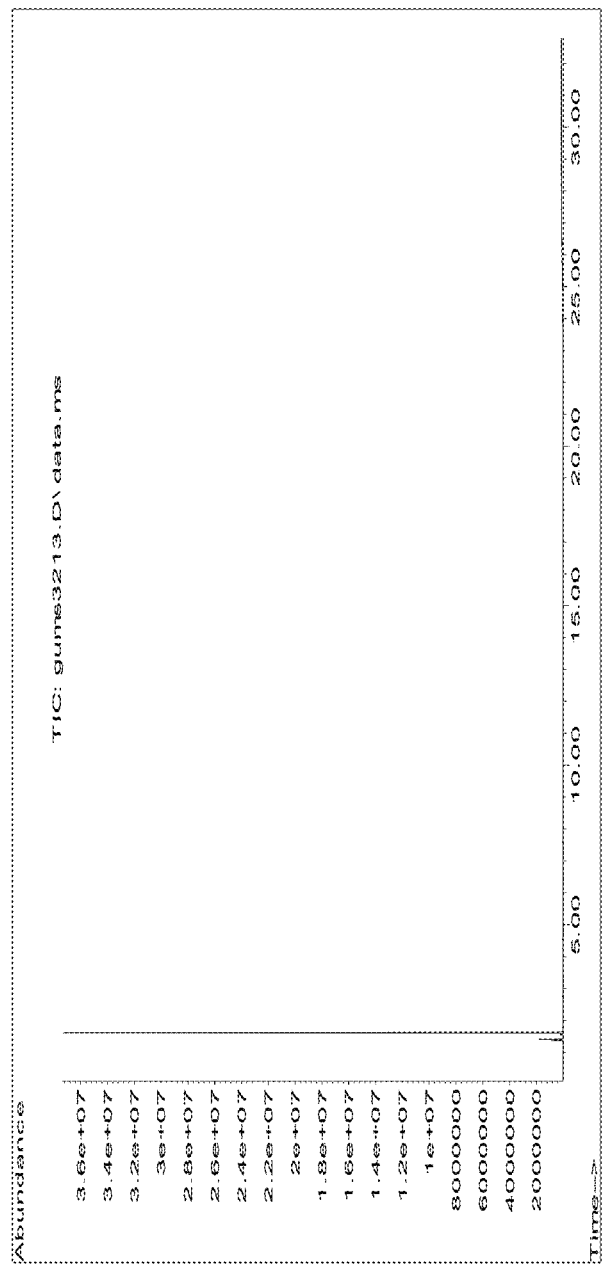
FIG. 13A is a low sensitivity GCMS chromatogram of lignin derived from Bagasse.
Figure 13B:
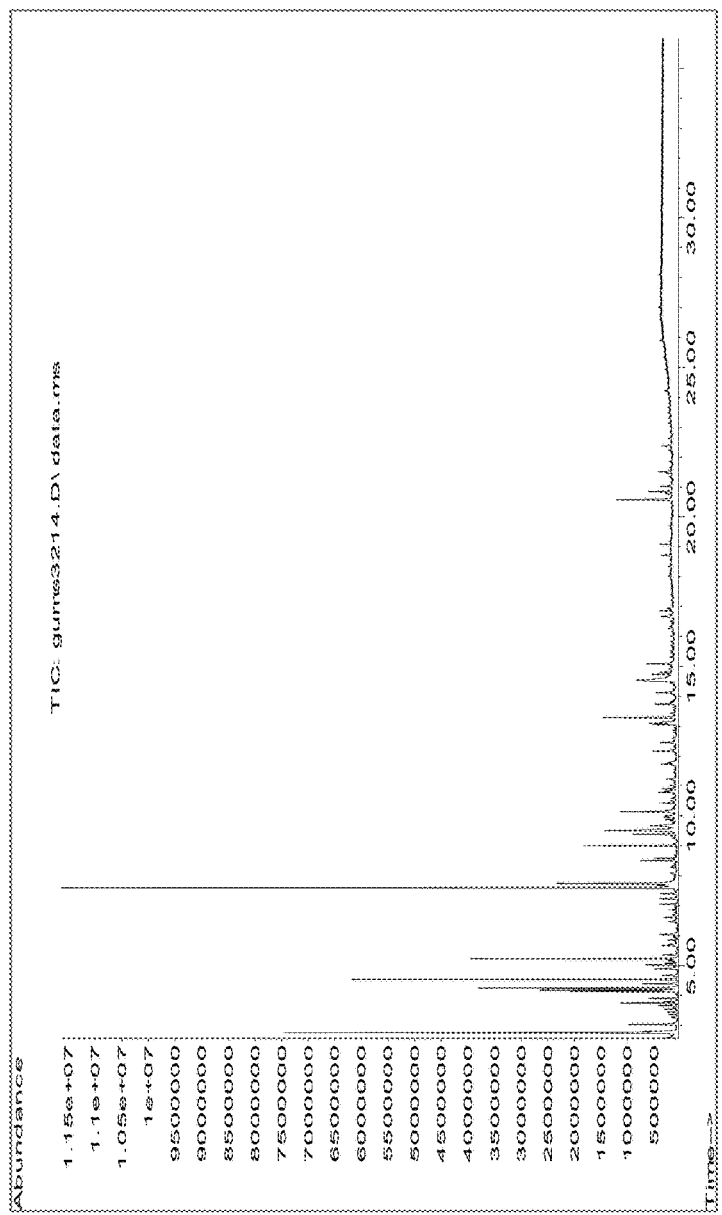
FIG. 13B is a high sensitivity GCMS chromatogram of lignin derived from Bagasse.

Example 18—Determination of Marker Molecules of Bagasse Derived Lignin Sample by GCMS A sample of Bagasse derived lignin was preparation according to example 3 and 4. The conditions used for this sample was 200° C., 2.6 h, 0.3% acetic acid. The refined MEK solution comprising lignin (i.e. just before flash evaporation) was injected into the gas chromatogram (GC). GC-MS conditions were as follows: Column (HP-5MS 30 m); Temp. program (2.5, 70, 1, 10, 320, 10); Split (14:1), and the identification of peaks was done with the help of NIST Mass Spectral Search Program Version 2.0d. The samples were injected twice—first time with low sensitivity (chromatogram shown in FIG. 13A), to locate the retention time of the solvents. The second injection was done at high sensitivity (chromatogram shown in FIG. 13B), and the solvent peaks were not observed by MS to avoid an overload of the instrument. The syringe was washed with methanol, and some or all of the methanol in the chromatogram could be an artifact from cleaning of the syringe. The marker molecules and volatile contents of the lignin composition are shown in the table below.

| Peak | R.T. | Pct Area (excl. solvents) | Substance |
|---|---|---|---|
| 1 | 2.764 | 12.322 | 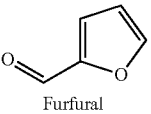 Furfural |
| 3 | 3.041 | 1.72 | 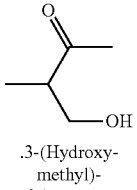 3-(Hydroxymethyl)-2-butanone |
| 4 | 3.757 | 1.597 | 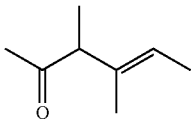 (4E)-3,4-Dimethyl-4-hexen-2-one |
| 5 | 3.914 | 0.883 | 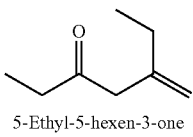 5-Ethyl-5-hexen-3-one |
| 6 | 4.144 | 3.246 | 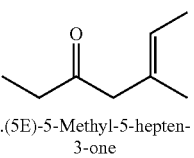 (5E)-5-Methyl-5-hepten-3-one |
| 7 | 4.188 | 4.117 | 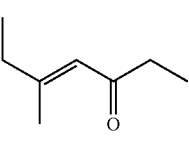 (4E)-5-Methyl-4-hepten-3-one |
| 8 | 4.254 | 6.487 | 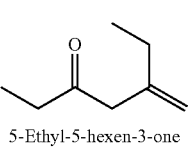 5-Ethyl-5-hexen-3-one |
| 9 | 4.398 | 1.173 | 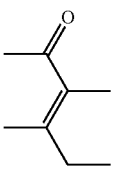 3-Hexen-2-one, 3,4-dimethyl- |
| 10 | 4.543 | 9.498 | 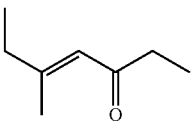 (4E)-5-Methyl-4-hepten-3-one |
| 14 | 7.6 | 21.551 | 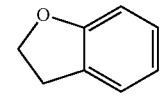 Dihydrobenzofuran |
| 15 | 7.741 | 5.208 | 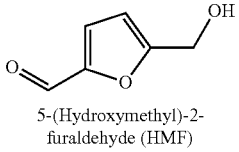 5-(Hydroxymethyl)-2-furaldehyde (HMF) |
| 17 | 9.006 | 2.847 | 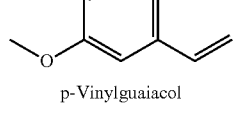 p-Vinylguaiacol |
| 21 | 10.141 | 1.595 | 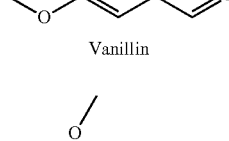 Vanillin |
| 25 | 13.299 | 2.578 | 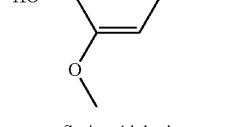 Syringaldehyde |
| 26 | 14.548 | 1.669 | 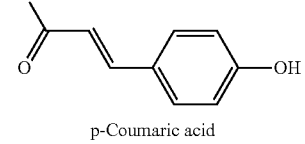 p-Coumaric acid |
| 28 | 20.566 | 2.181 | 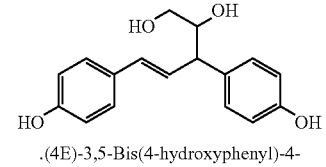 (4E)-3,5-Bis(4-hydroxyphenyl)-4-pentene-1,2-diol |

Figure 14A:
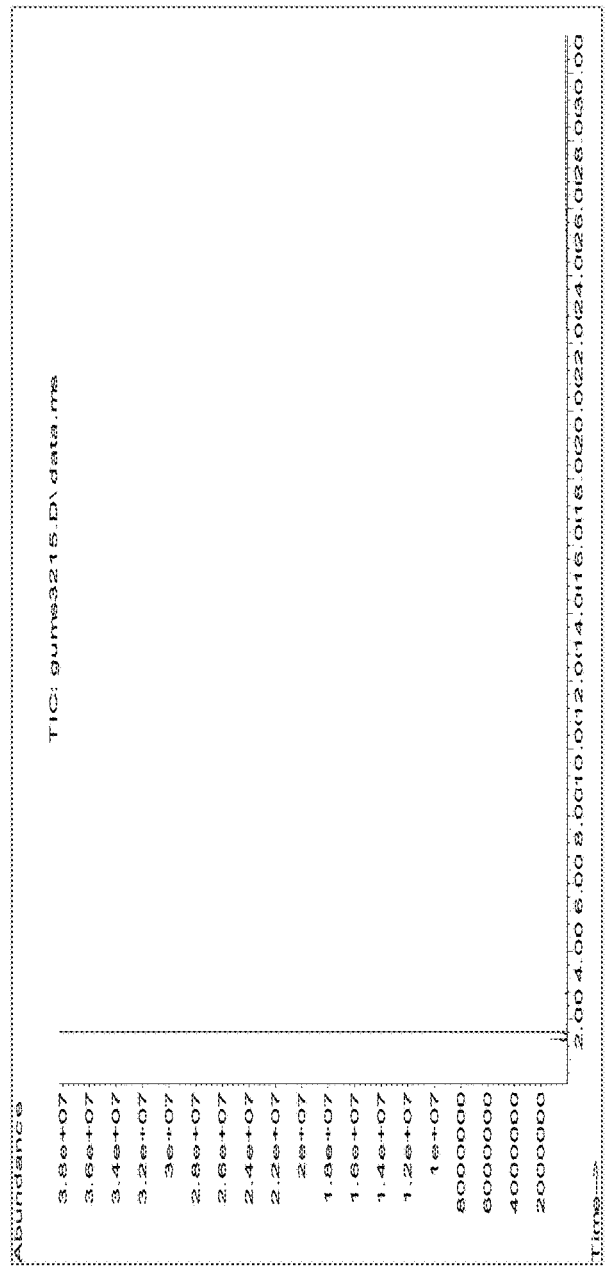
FIG. 14A is a low sensitivity GCMS chromatogram of lignin derived from Eucalyptus.
Figure 14B:
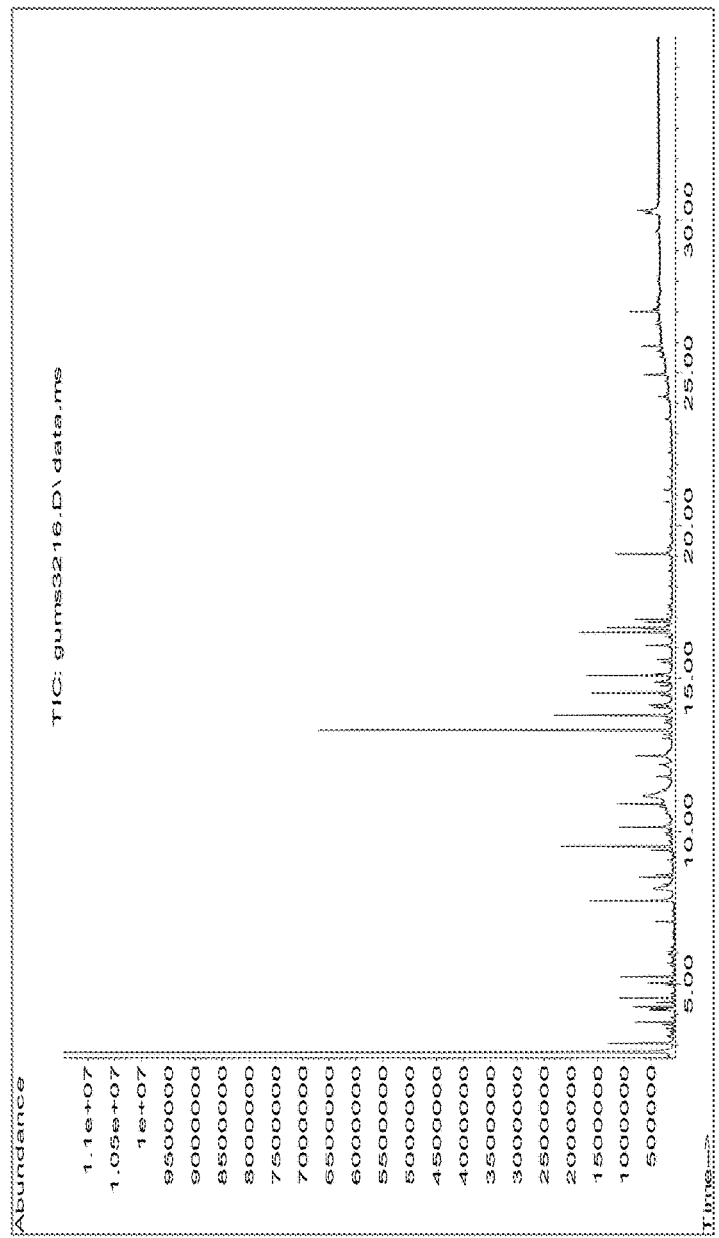
FIG. 14B is a high sensitivity GCMS chromatogram of lignin derived from Eucalyptus.

Example 19—Determination of Marker Molecules of Eucalyptus Derived Lignin Sample by GCMS A sample of Eucalyptus derived lignin was preparation according to example 3. The conditions used for this sample was 170° C., 1.0 h, 0.5% acetic acid. The refined MEK solution comprising lignin (i.e. just before flash evaporation) was injected into the gas chromatogram (GC). GC-MS conditions were as follows: Column (HP-5MS 30 m); Temp. program (2.5, 70, 1, 10, 320, 10); Split (14:1), and the identification of peaks was done with the help of NIST Mass Spectral Search Program Version 2.0d. The samples were injected twice—first time with low sensitivity (chromatogram shown in FIG. 14A), to locate the retention time of the solvents. The second injection was done at high sensitivity (chromatogram shown in FIG. 14B), and the solvent peaks were not observed by MS to avoid an overload of the instrument. The syringe was washed with methanol, and some or all of the methanol in the chromatogram could be an artifact from cleaning of the syringe. The marker molecules and volatile contents of the lignin composition are shown in the table below.

| Peak | R.T. | Pct Area (excl. solvents) | Substance |
|---|---|---|---|
| 1 | 2.77 | 25.186 | 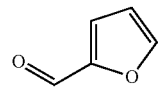 Furfural |
| 2 | 3.06 | 2.231 | 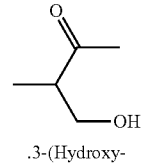 3-(Hydroxymethyl)-2-butanone |
| 4 | 3.757 | 1.187 | 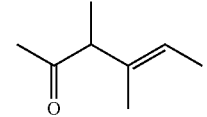 4-Hexen-2-one, 3,4-dimethyl- |
| 9 | 4.542 | 1.673 | 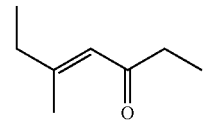 4-Hepten-3-one, 5-methyl- |
| 13 | 7.735 | 3.488 | 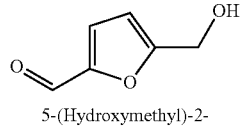 5-(Hydroxymethyl)-2-furaldehyde (HMF) |
| 14 | 8.123 | 2.154 | 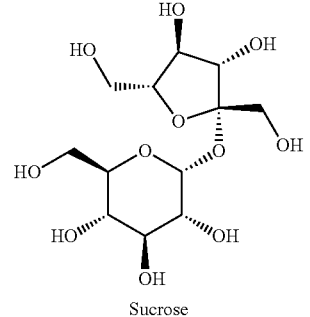 [SMILES: OC[C@H]1O[C@@](CO)(O[C@H]2O[C@H](CO)[C@@H](O)[C@H](O)[C@H]2O)[C@@H](O)[C@@H]1O] Sucrose |

-continued
| Peak | R.T. | Pct Area (excl. solvents) | Substance |
|---|---|---|---|
| 18 | 9.512 | 3.736 | 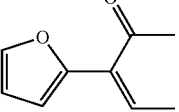<br>.(3Z)-3-(2-Furyl)-3-penten-2-one |
| 19 | 10.139 | 1.445 | 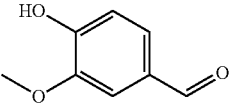<br>Vanillin |
| 20 | 10.901 | 1.638 | 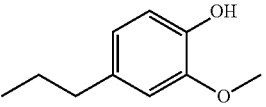<br>Phenol, 2-methoxy-4-propyl- |
| 25 | 13.313 | 12.219 | 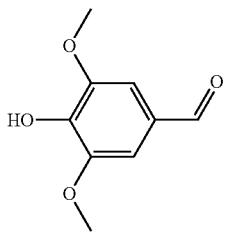<br>Syringaldehyde |
| 26 | 13.794 | 3.873 | 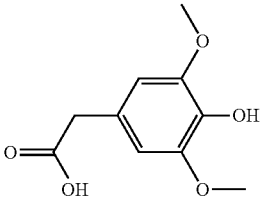<br>(4-Hydroxy-3,5-dimethoxyphenyl) acetic acid |
| 27 | 14.046 | 0.587 | 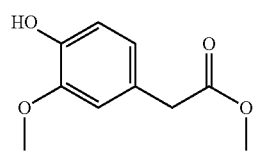<br>Benezeneacetic acid, 4-hydroxy-3-metoxy-, methyl ester |
| 32 | 15.094 | 2.761 | 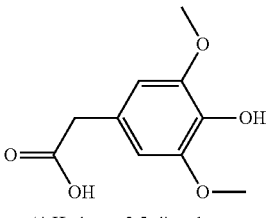<br>(4-Hydroxy-3,5-dimethoxy-phenyl)acetic acid |

-continued

| Peak | R.T. | Pct Area (excl. solvents) | Substance |
|---|---|---|---|
| 36 | 16.521 | 3.343 | 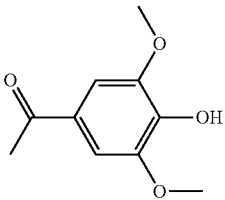<br>1-(4-Hydroxy-3,5-dimethoxy-phenyl)ethanone |
| 38 | 16.673 | 2.125 | 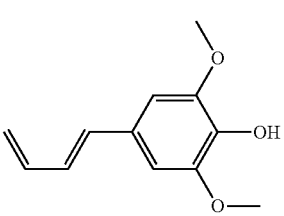<br>3,5-Dimethoxy-4-4hydroxy-cinnamaldehyde |
| 44 | 27.009 | 1.275 | 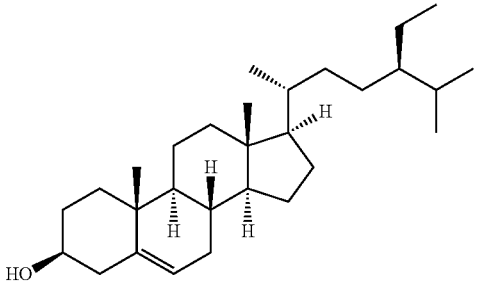<br>β-Sitosterol (present in *Eucalyptus* sp.)[1] |

[1]Lipid and lignin composition of woods from different *eucalypt* species; Jorge Rencoret, Ana Gutie' rrez and Jose' C. del Rl'o; Holzforschung, Vol. 61, pp. 165-174, 2007

What is claimed is:

1. A product comprising or derived from a lignin composition having a degree of condensation of less than 0.9 and characterized by at least two characteristics selected from the group consisting of:
  (i) lignin aliphatic hydroxyl group in an amount up to 2 mmole/g;
  (ii) at least 2.5 mmole/g lignin phenolic hydroxyl group;
  (iii) less than 0.40 mmole/g lignin carboxylic hydroxyl group;
  (iv) sulfur in an amount up to 1% weight/weight;
  (v) nitrogen in an amount up to 0.5% weight/weight;
  (vi) 5% degradation temperature higher than 220° C.;
  (vii) 10% degradation temperature higher than 260° C.;
  (viii) less than 1% ash weight/weight;
  (ix) a formula of $C_aH_bO_c$; wherein a is 9, b is less than 12 and c is less than 3.5;
  (x) a methoxyl content of at least 0.8;
  (xi) an O/C weight ratio of less than 0.4; and
  (xii) a glass transition elevation between a first and a second heat cycle as measured by differential scanning calorimetry according to DIN 53765 in the range of 10 to 30° C.;
wherein the product is selected from the group consisting of: carbon fibers, protective coatings, lignosulfonates, dispersants, emulsifiers, complexants, flocculants, agglomerants, pelletizing additives, resins, adhesives, binders, absorbents, toxin binders, films, rubbers, elastomers, sequestrants, solid fuels, paints, dyes, plastics, wet spun fibers, melt spun fibers, flame retardants, a non-woven fabric, a woven fabric, insulation material, sports equipment, automotive parts, airplane or helicopter parts, boat hulls or portions thereof, and loudspeakers.

2. The product of claim 1, comprising one or more other ingredients.

3. The product of claim 1, wherein the product is provided as fibers.

4. The product of claim 3, wherein a composite material comprises a polymer reinforced with the fibers and one or more materials selected from the group consisting of epoxy resin, polyester, polyvinyl ester and nylon.

5. The product of claim 1, wherein the product comprises a fiber.

6. The product according to claim 5, characterized by lengthwise tubules with a transverse cross-sectional dimension of at least 5 microns.

7. The product according to claim 6, wherein said transverse cross-sectional dimension is less than 20 microns.

8. The product according to claim 6, wherein said tubules are characterized by an aspect ratio of transverse cross-sectional dimension to length less than 0.1.

9. The product according to claim 7, wherein said tubules are characterized by an aspect ratio of transverse cross-sectional dimension to length less than 0.1.

10. The product according to claim 8, wherein said aspect ratio is less than 0.025.

11. The product according to claim 9, wherein said aspect ratio is less than 0.025.

12. The product of claim 1, wherein the product comprises a fuel or a fuel ingredient.

13. The product of claim 2, wherein the product comprises at least one chemical selected from the group consisting of: lignosulfonates, bio-oil, carboxylic and fatty acids, dicarboxylic acids, hydroxyl-carboxylic, hydroxyl di-dicarboxylic acids and hydroxyl-fatty acids, methylglyoxal, mono-, di- or poly-alcohols, alkanes, alkenes, aromatics, aldehydes, ketones, esters, biopolymers, proteins, peptides, amino acids, and para-xylene.

14. The product according to claim 13, comprising para-xylene.

15. The product according to claim 13, wherein the product is used in an area selected from the group consisting of food, feed, materials, agriculture, transportation and construction.

16. The product according to claim 13, wherein the product has a ratio of carbon-14 to carbon-12 of about $2.0 \times 10^{-13}$ or greater.

17. The product comprising the ingredient according to claim 2 and an ingredient product from a raw material other than lignocellulosic material.

18. The product according to claim 2, wherein the ingredient according to claim 17 and the ingredient produced from a raw material other than lignocellulosic material are essentially of the same chemical composition.

19. The product according to claim 18, comprising a marker molecule at a concentration of at least 100 ppb.

20. The product according to claim 19, wherein the marker molecule is selected from the group consisting of furfural and hydroxyl-methyl furfural, 2,3,5 trimethyl furan, products of their condensation, color compounds, acetic acid, p-hydroxyphenoxyacetic acid, (4-hydroxy-3,5-dimethoxyphenyl) acetic acid, methylethyl ketone, methylpropenyl ketone, 3-(2-furyl)-3-penten-2-one, 3-methyl-2-penten-4-one, 3,4-dimethyl-4-hexene-one, 5-ethyl-5-hexene-3-one, 5-methyl-4-heptene-3-one, o-hydroxyanisole, 3-ethyl-4-methyl-3-penten-2-one, 3,4,4-trimethyl-2-cyclohexene-1-one, 2'-hydroxy-4'-5'-dimethyl acetophenone, 1-(4-hydroxy-3-methoxyphenyl)propane, methanol, galcturonic acid, dehydroabietic acid, glycerol, fatty acids and resin acids.

* * * * *

UNITED STATES PATENT AND TRADEMARK OFFICE
CERTIFICATE OF CORRECTION

PATENT NO. : 10,138,332 B2
APPLICATION NO. : 15/487271
DATED : November 27, 2018
INVENTOR(S) : Robert Jansen et al.

Page 1 of 1

It is certified that error appears in the above-identified patent and that said Letters Patent is hereby corrected as shown below:

On the Title Page

Item (71), delete "Susan Lawson, Bethel, ME (US)".

Signed and Sealed this
Second Day of July, 2019

Andrei Iancu
*Director of the United States Patent and Trademark Office*